United States Patent
Sarnoff

(10) Patent No.: US 11,269,475 B2
(45) Date of Patent: *Mar. 8, 2022

(54) SYSTEMS, METHODS, AND COMPUTER-READABLE MEDIA FOR MANAGING COLLABORATION ON A VIRTUAL WORK OF ART

(71) Applicant: Apple Inc., Cupertino, CA (US)

(72) Inventor: Matthew Jacob Sarnoff, Seattle, WA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,319

(22) Filed: Oct. 16, 2018

(65) Prior Publication Data

US 2019/0235692 A1    Aug. 1, 2019

Related U.S. Application Data

(63) Continuation of application No. 14/793,654, filed on Jul. 7, 2015, now Pat. No. 10,101,846, which is a
(Continued)

(51) Int. Cl.
*G06F 3/048* (2013.01)
*G06F 3/0488* (2013.01)
(Continued)

(52) U.S. Cl.
CPC .......... *G06F 3/048* (2013.01); *G06F 3/04883* (2013.01); *G06F 3/1454* (2013.01);
(Continued)

(58) Field of Classification Search
CPC .... G06F 3/0416; G06F 3/04883; G06F 3/048; G06F 3/1423; G06F 3/1454; G06F 3/14;
(Continued)

(56) References Cited

U.S. PATENT DOCUMENTS 7,348,968 B2    3/2008 Dawson
7,373,590 B2    5/2008 Woolf et al.
(Continued)

FOREIGN PATENT DOCUMENTS

WO    WO 03/071420 A1    8/2003

OTHER PUBLICATIONS

A&A Computer Services, "PPC Tablet Remote Control Suite—What Is It?," http://www.aacompserv.com/AACompWeb/Modules/PPCTablet/WhatIsIt.aspx, Aug. 23, 2010, 2 pages.
(Continued)

*Primary Examiner* — Ting Z Lee
(74) *Attorney, Agent, or Firm* — Morgan, Lewis & Bockius LLP

(57) ABSTRACT

Systems, methods, and computer-readable media for managing collaboration on a virtual work of art between multiple electronic devices are provided. A first graphical display system of a first device may generate an input command in response to receiving user information through a user interface of the first device, and may then share this input command with a second graphical display system of a second device. The first graphical display system may process the shared input command to generate pixel array data in a canvas of the first device while the second graphical display system may process the shared input command to generate pixel array data in a canvas of the second device. By sharing input commands rather than pixel array data, system latency may be reduced. Despite operating on the same artwork, the user interfaces and graphical processing capabilities of each device may vary, thereby providing the user greater expressiveness.

30 Claims, 18 Drawing Sheets

Related U.S. Application Data continuation of application No. 13/194,400, filed on Jul. 29, 2011, now Pat. No. 9,075,561.

(51) Int. Cl.

| | |
|---|---|
| *G06F 3/14* | (2006.01) |
| *G06F 3/04883* | (2022.01) |
| *G06Q 10/10* | (2012.01) |
| *G06F 3/0487* | (2013.01) |
| *G06T 1/20* | (2006.01) |
| *G09G 5/00* | (2006.01) |
| *G09G 5/14* | (2006.01) |
| *G06T 11/20* | (2006.01) |

(52) U.S. Cl.
CPC .............. *G06F 3/0487* (2013.01); *G06F 3/14* (2013.01); *G06F 3/1423* (2013.01); *G06Q 10/10* (2013.01); *G06Q 10/101* (2013.01); *G06T 1/20* (2013.01); *G06T 11/203* (2013.01); *G09G 5/006* (2013.01); *G09G 5/14* (2013.01); *G09G 2340/045* (2013.01); *G09G 2340/14* (2013.01); *G09G 2360/02* (2013.01); *G09G 2360/18* (2013.01); *G09G 2370/022* (2013.01); *G09G 2370/042* (2013.01); *G09G 2370/06* (2013.01); *G09G 2370/10* (2013.01)

(58) Field of Classification Search
CPC ...... G06F 3/0418; G06F 3/0487; G06F 17/24; G06F 17/241; G09G 5/006; G09G 5/14; G09G 2340/045; G09G 2340/14; G09G 2360/02; G09G 2360/18; G09G 2370/022; G09G 2370/06; G09G 2370/10; G09G 2370/042; G06T 1/20; G06T 11/203; G06Q 10/10; G06Q 10/101
See application file for complete search history.

(56) References Cited

U.S. PATENT DOCUMENTS

| | | | |
|---|---|---|---|
| 7,685,538 B2 | 3/2010 | Fleck et al. | |
| 7,747,086 B1 | 6/2010 | Hobbs et al. | |
| 7,930,642 B1 | 4/2011 | Gerde et al. | |
| 8,825,758 B2 * | 9/2014 | Bailor ...................... | H04L 63/08 709/204 |
| 9,990,129 B2 | 6/2018 | Yang et al. | |
| 2004/0109021 A1* | 6/2004 | Price ...................... | G06F 9/451 715/753 |
| 2006/0192768 A1 | 8/2006 | Lee | |
| 2007/0130476 A1 | 6/2007 | Mohanty | |
| 2012/0176328 A1 | 7/2012 | Brown et al. | |
| 2012/0188147 A1* | 7/2012 | Hosein .............. | H04M 1/72519 345/2.2 |
| 2012/0284635 A1 | 11/2012 | Sitrick et al. | |
| 2013/0124978 A1 | 5/2013 | Horns et al. | |

OTHER PUBLICATIONS

Ally, "Adobe Considers Possibilities for iPhone and iPad Integration With Photoshop—Mac Rumors," http://www.macrumors.com/2010/11/05/adobe-considers-possibilities-for-iphone-and-ipad-integration-with-photoshop/, Nov. 12, 2010, 6 pages.

AppAdvice LLC, "Review: Air Display—iPad As An External Monitor?," http://appadvice.com/appn/2010/08/review-air-display, Aug. 11, 2010, 4 pages.

Autodesk Design Review on the Apple iPad, "It Is Alive In The Lab," http://www.tabs.blogs.com/its_alive_in_the_lab/2010/06/autodesk-design-review-on-the-apple-ipad.html, Jun. 3, 2010, 8 pages.

Cintiq Product Overview, "Cintiq—Two Choices for Working Directly On Screen," Http://www.wacmo.com/cintiq, Aug. 24, 2010, 1 page.

Intellislate™, "The Portable Presentation Device with RF Technology," Numonics Corporation, Jun. 7, 2009, 5 pages.

ITunes Preview, JumiMouse+ Desktop/Keyboard/Mouse remote for PC, itunes.apple.com/us/app/jumimouse-desktop-keyboard/id325837947?mt=8, Aug. 23, 2010, 3 pages.

Shapeservices, "iDisplay for iPad and iPhone," http://www.shapeservices.com/en/products/details.php?product=display&platform=iphone, Aug. 27, 2010, 2 pages.

Ten One Design, Inklet Trackpat Tablet, Macworld Best of Show 2010, http://www.tenonedesign.com/inklet.php, Nov. 12, 2010, 5 pages.

Office Action, dated Jul. 3, 2014, received in U.S. Appl. No. 13/194,400, 20 pages.

Notice of Allowance, dated Mar. 5, 2015, received in U.S. Appl. No. 13/194,400, 20 pages.

Office Action, dated Sep. 7, 2017, received in U.S. Appl. No. 14/793,654 (7304), 15 pages.

Notice of Allowance, dated May 16, 2018, received in U.S. Appl. No. 14/793,654 (7304), 14 pages.

\* cited by examiner

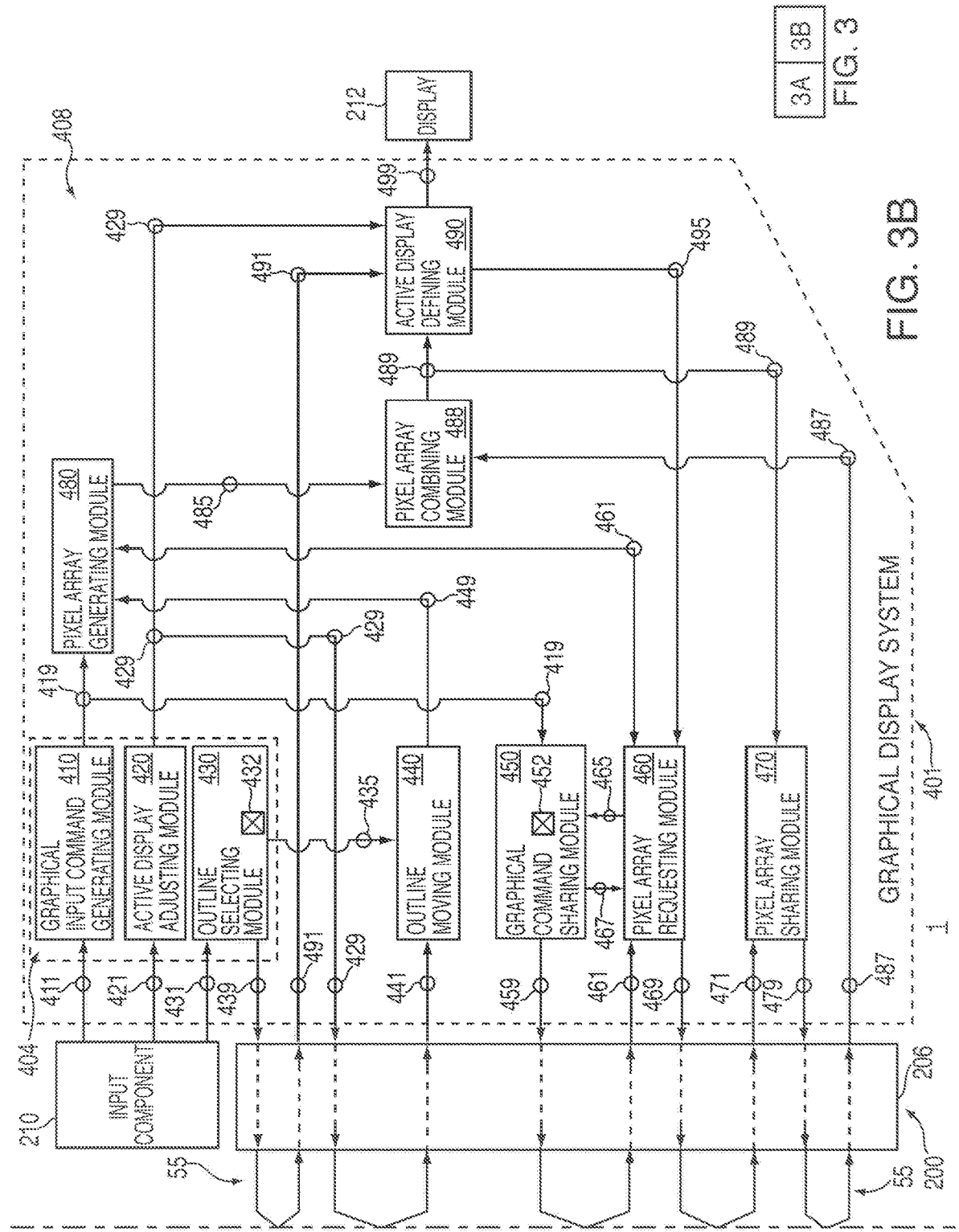

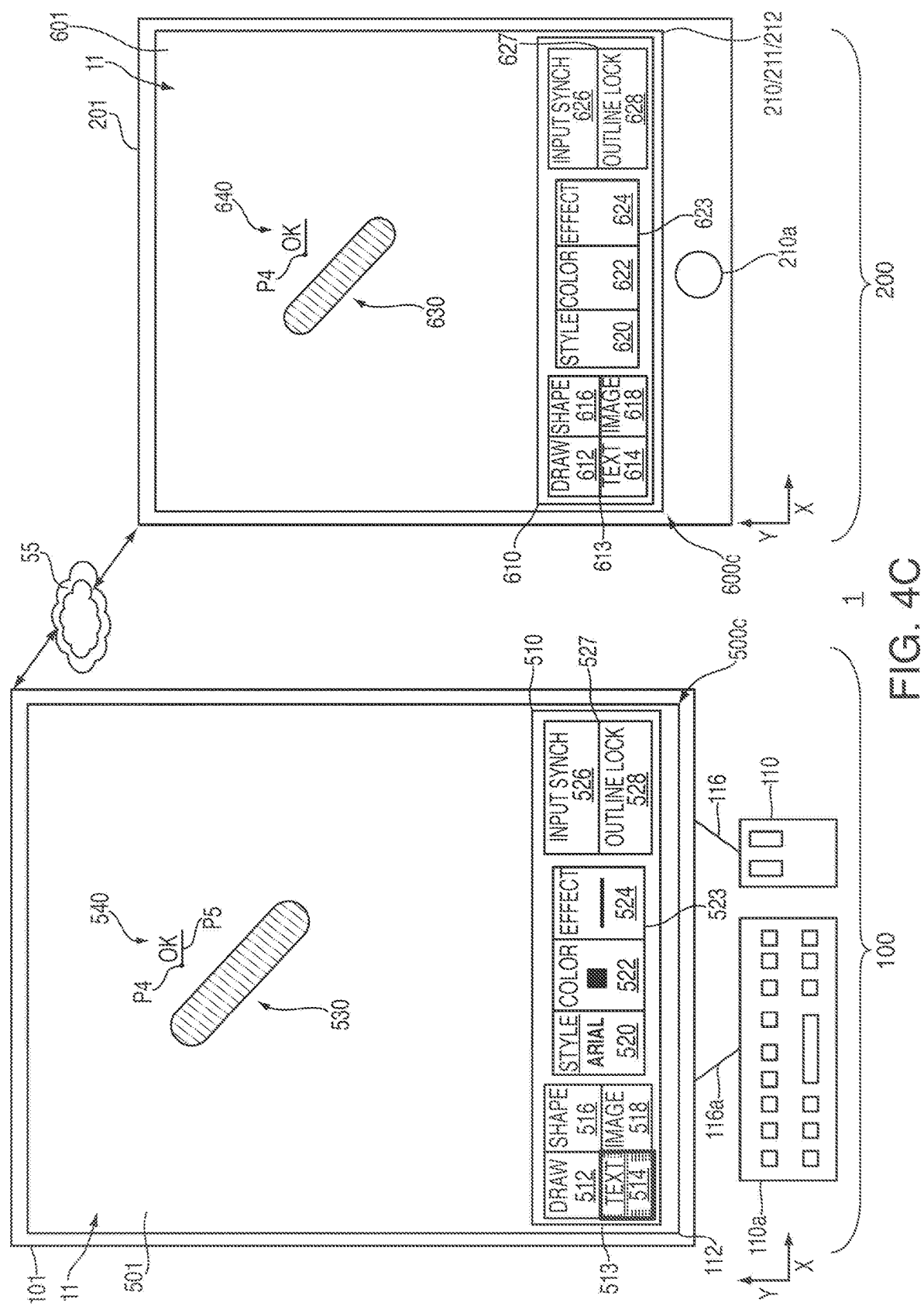

SYSTEMS, METHODS, AND COMPUTER-READABLE MEDIA FOR MANAGING COLLABORATION ON A VIRTUAL WORK OF ART

RELATED APPLICATIONS

This application is a continuation of U.S. application Ser. No. 14/793,654, filed Jul. 7, 2015, now U.S. Pat. No. 10,101,846, which is a continuation of U.S. application Ser. No. 13/194,400, filed Jul. 29, 2011, now U.S. Pat. No. 9,075,561, each of which is incorporated herein by reference in its entirety.

FIELD OF THE INVENTION

This can relate to systems, methods, and computer-readable media for sharing graphical object data and, more particularly, to systems, methods, and computer-readable media for managing collaboration on a virtual work of art between multiple electronic devices.

BACKGROUND OF THE DISCLOSURE

Some electronic devices include a graphical display system for generating and presenting graphical objects, such as free-form drawing strokes, images, strings of text, and drawing shapes, on a display to create a virtual work of art. The processing capabilities and interfaces provided to a user for creating such works of art often vary between different types of electronic devices. However, the ways in which two or more electronic devices may allow one or more users to collaborate on a single virtual work of art may be confusing or inefficient.

SUMMARY OF THE DISCLOSURE

Systems, methods, and computer-readable media for managing collaboration on a virtual work of art are provided.

In some embodiments, there is provided a method for sharing graphical data. The method may include receiving first user instructions with a first user interface of a first electronic device, generating a first input command based on the received first user instructions with a first graphics application on the first electronic device, and transmitting the first input command from the first electronic device to a second electronic device. The method may also include processing the first input command with the first graphics application on the first electronic device to generate first pixel array data in a first canvas of the first electronic device. Moreover, in some embodiments, the method may also include processing the first input command with a second graphics application on the second electronic device to generate second pixel array data in a second canvas of the second electronic device.

In other embodiments, there is provided a method for sharing graphical data that includes loading a first graphics application on a first electronic device, loading an artwork into the first graphics application on the first electronic device, and sending first information from the first electronic device to a second electronic device. The first information may be configured to instruct the second electronic device to load at least a first portion of the artwork into a second graphics application on the second electronic device.

In yet other embodiments, there is provided an electronic device that includes a display, a user input component, communications circuitry, and a processor. The processor may be configured to receive a first user instruction from the user input component, generate a first input command based on the received first user instruction, provide the first input command to the communications circuitry for transmission of the first input command to another electronic device, process first pixel array data from the first input command, and present at least a portion of the first pixel array data on the display.

In still yet other embodiments, there is provided computer-readable media for controlling an electronic device. The media includes computer-readable code recorded thereon for receiving first user instructions with a first user interface of the electronic device, generating a first input command based on the received first user instructions, transmitting the first input command from the electronic device to another electronic device, and processing the first input command on the electronic device to generate first pixel array data.

In still yet other embodiments, there is provided a data processing system that includes a processor to execute instructions and a memory coupled with the processor to store instructions. When executed by the processor, the instructions may cause the processor to perform operations to generate an application programming interface ("API") that may allow an API-calling component to perform the following operations: receive first user instructions with a first user interface of a first electronic device, generate a first input command based on the received first user instructions, transmit the first input command from the first electronic device to another electronic device, and process the first input command on the first electronic device to generate first pixel array data.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which:

FIGS. 3A and 3B are additional schematic views of the illustrative portions of the system of FIGS. 1 and 2, in accordance with some embodiments of the invention;

FIGS. 4A-4K are front views of the electronic devices of the system of FIGS. 1-3B, presenting exemplary screens of displayed graphical data, in accordance with some embodiments of the invention;

DETAILED DESCRIPTION OF THE DISCLOSURE

Systems, methods, and computer-readable media for managing collaboration on a virtual work of art are provided and described with reference to FIGS. 1-7.

A virtual work of art may be simultaneously loaded by and presented on two or more electronic devices in a communications network, such that any change made to the artwork by a user interaction with any one of the devices may be reflected in the artwork on all of the devices. Each device may have different user interfaces and processing capabilities, such that the strengths of each device may be leveraged by one or more users to collaborate on the artwork in an efficient and intuitive manner.

A user's interaction with a virtual drawing application running on each device may be utilized to generate one or more input commands for editing the artwork. Each input command may be processed to generate pixel array data that can present the graphical object content of the artwork. Each device may receive each input command generated by each of the other devices in the communications network, and each device may be similarly configured to process each received input command in a consistent manner, such that the artwork may be updated with the same pixel array data on each of the devices.

For example, a first graphical display system of a first electronic device may be able to generate a first input command in response to receiving first user information through a user interface of the first device. The first graphical display system may then share this first input command with a second graphical display system of a second electronic device in a communications network. The first graphical display system may be configured to process the shared input command to generate pixel array data in a first canvas of the first device, while the second graphical display system may be configured to process the shared input command to generate the same pixel array data in a second canvas of the second device. By sharing input commands rather than pixel array data, the two devices may reduce latency in the communications network. The first canvas and the second canvas may each include the same pixel array data such that the same artwork may be available on each device. However, different portions of the artwork may be presented on different devices. For example, at least a first portion of the first canvas may be presented on a display of the first device, and at least a second portion of the second canvas may be presented on a display of the second device. In other embodiments, the entirety of the first canvas may be presented on the display of the first device, and the entirety of the second canvas may be presented on the display of the second device, such that the entirety of the shared artwork is presented on each device.

Figure 1:
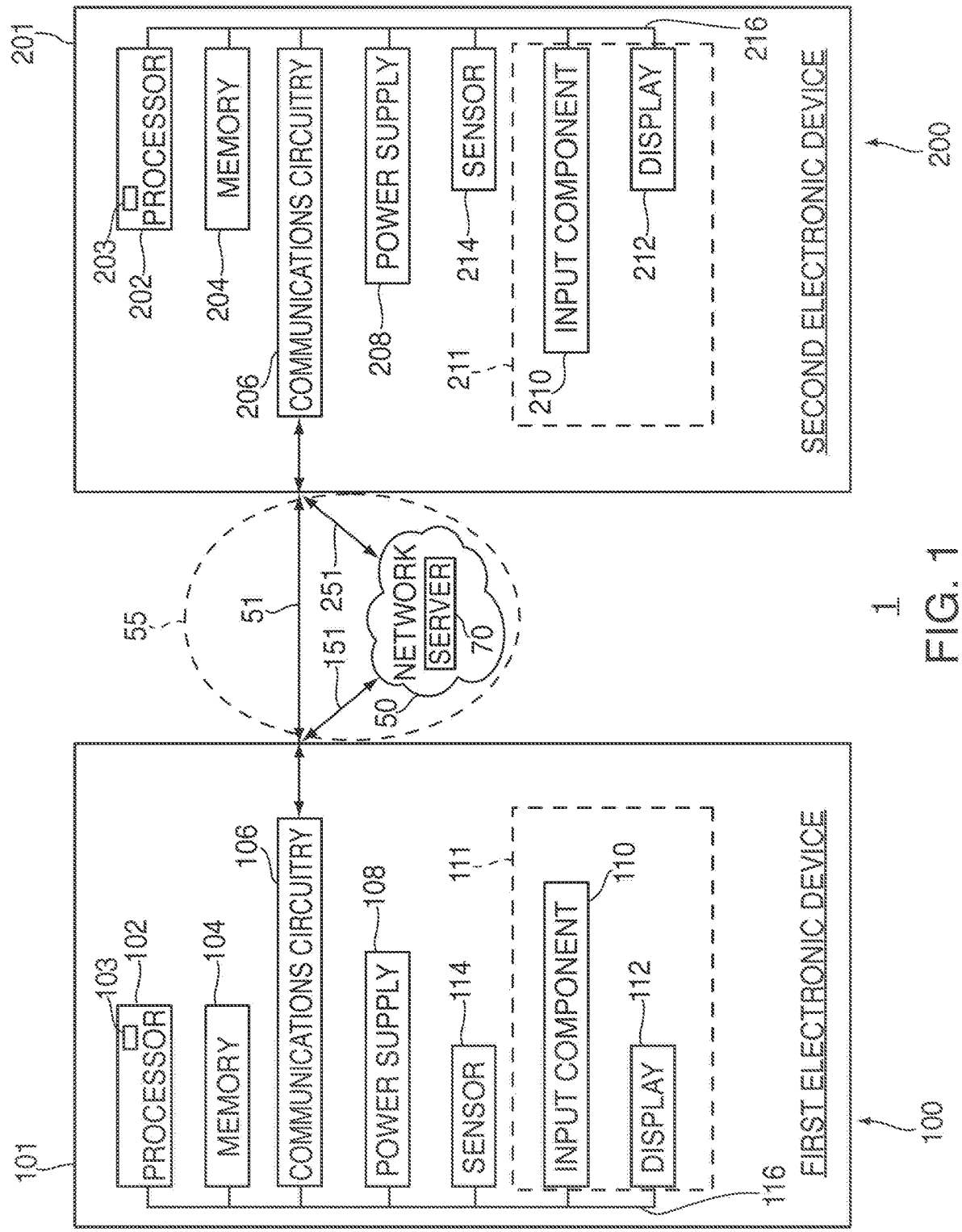
FIG. 1 is a schematic view of an illustrative system for managing collaboration on a virtual work of art, in accordance with some embodiments of the invention.

FIG. 1 is a schematic view of an illustrative system 1 for managing collaboration on a virtual work of art in accordance with some embodiments of the invention. System 1 may include a first electronic device 100 and a second electronic device 200. System 1 may also include a communications network 50, through which first electronic device 100 and second electronic device 200 may communicate with one another. Alternatively or additionally, first electronic device 100 and second electronic device 200 may communicate directly with one another via a shared communications link 51.

Either one or both of first electronic device 100 and second electronic device 200 may be any portable, mobile, or hand-held electronic device configured to create a virtual work of art wherever the user travels. Alternatively, either one or both of first electronic device 100 and second electronic device 200 may not be portable at all, but may instead be generally stationary. Either one or both of first electronic device 100 and second electronic device 200 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, either one or both of first electronic device 100 and second electronic device 200 may perform a single function (e.g., a device dedicated to creating a virtual work of art) and, in other embodiments, either one or both of first electronic device 100 and second electronic device 200 may perform multiple functions (e.g., a device that creates virtual artwork, plays music, and receives and transmits telephone calls).

First electronic device 100 of system 1 may include a processor or control circuitry 102, memory 104, communications circuitry 106, power supply 108, input component 110, display 112, and sensor 114. First electronic device 100 may also include a bus 116 that may provide one or more wired or wireless communications links or paths for transferring data and/or power to, from, or between various other components of first electronic device 100. In some embodiments, one or more components of first electronic device 100 may be combined or omitted. Moreover, first electronic device 100 may include other components not combined or included in FIG. 1 and/or several instances of the components shown in FIG. 1. For the sake of simplicity, only one of each of the components of first electronic device 100 is shown in FIG. 1.

Memory 104 of first electronic device 100 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on first electronic device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable first electronic device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 of first electronic device 100 may be provided to allow first electronic device 100 to communicate with one or more other electronic devices or servers (e.g., second electronic device 200 and/or a server 70 of communications network 50) using any suitable communications protocol. For example, communications circuitry 106 may support Wi-Fi (e.g., an 802.11 protocol), Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any other communications protocol, or any combination thereof. Communications circuitry 106 may also include circuitry that can enable first electronic device 100 to be electrically coupled to another device (e.g., a host computer or an accessory device) and communicate with that other device, either wirelessly or via a wired connection.

Power supply 108 of first electronic device 100 may provide power to one or more of the components of first electronic device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 of first electronic device 100 may be provided to permit a user to interact or interface with first electronic device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, proximity sensor, light detector, and combinations thereof. Each input component 110 can be configured to provide one or more dedicated control functions for making selections or issuing commands associated with operating first electronic device 100.

First electronic device 100 may also include one or more output components that may present information (e.g., graphical, audible, and/or tactile information) to a user of first electronic device 100. An output component of first electronic device 100 may take various forms, including, but not limited to, audio speakers, headphones, audio line-outs, visual displays, antennas, infrared ports, rumblers, vibrators, or combinations thereof.

For example, as shown in FIG. 1, first electronic device 100 may include display 112 as an output component. Display 112 may include any suitable type of display or interface for presenting visual data to a user. In some embodiments, display 112 may include a display embedded in first electronic device 100 or coupled to first electronic device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from first electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera.

In some embodiments, display 112 may include display driver circuitry, circuitry for driving display drivers, or both. Display 112 can be operative to display content (e.g., media playback information, application screens for applications implemented on first electronic device 100, information regarding ongoing communications operations, information regarding incoming communications requests, device operation screens, etc.) that may be under the direction of processor 102. Display 112 can be associated with any suitable characteristic dimensions defining the size and shape of the display. For example, the display can be rectangular or have any other polygonal shape, or alternatively can be defined by a curved or other non-polygonal shape (e.g., a circular display). Display 112 can have one or more primary orientations for which an interface can be displayed, or can instead or in addition be operative to display an interface along any orientation selected by a user.

It should be noted that one or more input components and one or more output components may sometimes be referred to collectively herein as an input/output ("I/O") component or I/O interface (e.g., input component 110 and display 112 as I/O component or I/O interface 111). For example, input component 110 and display 112 may sometimes be a single I/O component 111, such as a touch screen, that may receive input information through a user's touch of a display screen and that may also provide visual information to a user via that same display screen.

Sensor 114 of first electronic device 100 may include any suitable motion sensor operative to detect movements of first electronic device 100. For example, sensor 114 may be a motion-sensing component operative to detect movement of first electronic device 100. In some embodiments, sensor 114 may include one or more three-axis acceleration motion sensors (e.g., an accelerometer) operative to detect linear acceleration in three directions (i.e., the x- or left/right direction, the y- or up/down direction, and the z- or forward/backward direction). As another example, sensor 114 may include one or more single-axis or two-axis acceleration motion sensors which may be operative to detect linear acceleration only along each of the x- or left/right direction and the y- or up/down direction, or along any other pair of directions. In some embodiments, sensor 114 may include an electrostatic capacitance (e.g., capacitance-coupling) accelerometer that is based on silicon micro-machined micro electro-mechanical systems ("MEMS") technology, including a heat-based MEMS type accelerometer, a piezoelectric type accelerometer, a piezo-resistance type accelerometer, or any other suitable accelerometer.

In some embodiments, sensor 114 may be operative to directly or indirectly detect rotation, rotational movement, angular displacement, tilt, position, orientation, motion along a non-linear (e.g., arcuate) path, or any other non-linear motions. In some embodiments, sensor 114 may alternatively or additionally include one or more gyro-motion sensors or gyroscopes for detecting rotational movement. For example, sensor 114 may include a rotating or vibrating element. Using sensor 114, first electronic device 100 can determine an orientation of display 112, for example.

Processor 102 of first electronic device 100 may include any processing circuitry operative to control the operations and performance of one or more components of first electronic device 100. For example, processor 102 may receive input signals from input component 110 and/or drive output signals through display 112. In some embodiments, as shown in FIG. 1, processor 102 may be used to run an application 103. Application 103 may include, but is not limited to, one or more operating system applications, firmware applications, media playback applications, media editing applications, or any other suitable applications. For example, processor 102 may load application 103 as a user interface program to determine how instructions or data received via an input component 110 or other component of device 100 may manipulate the way in which information is stored and/or provided to the user via an output component (e.g., display 112). Application 103 may be accessed by processor 102 from any suitable source, such as from memory 104 (e.g., via bus 116), from second electronic device 200 or from server 70 of communications network 50 (e.g., via communications circuitry 106), or from any other suitable source. First electronic device 100 (e.g., processor 102, memory 104, or any other components available to device 100) may be configured to process graphical data at various resolutions, frequencies, intensities, and various other characteristics as may be appropriate for the capabilities and resources of first electronic device 100.

First electronic device 100 may also be provided with a housing 101 that may at least partially enclose one or more of the components of first electronic device 100 for protection from debris and other degrading forces external to device 100. In some embodiments, one or more of the components of first electronic device 100 may be provided within its own housing (e.g., input component 110 may be an independent keyboard or mouse within its own housing that may wirelessly or through a wire communicate with processor 102, which may be provided within its own housing).

Second electronic device 200 of system 1 may include a processor or control circuitry 202, memory 204, communications circuitry 206, power supply 208, input component 210, display 212, and sensor 214. In some embodiments, input component 210 and display 212 of second electronic device 200 may sometimes be a single I/O interface or I/O component 211. Second electronic device 200 may also include a housing 201 as well as a bus 216 that may provide one or more wired or wireless communications links or paths for transferring data and/or power to, from, or between various other components of second electronic device 200. As also shown in FIG. 1, processor 202 may be used to run an application 203 that may include, but is not limited to, one or more operating system applications, firmware applications, media playback applications, media editing applications, or any other suitable applications. Application 203 may be accessed by processor 202 from any suitable source, such as from memory 204 (e.g., via bus 216), from first electronic device 100 or from server 70 of communications network 50 (e.g., via communications circuitry 206), or from any other suitable source. In some embodiments, one or more components of second electronic device 200 may be combined or omitted. Moreover, second electronic device 200 may include other components not combined or included in FIG. 1 and/or several instances of the components shown in FIG. 1. For the sake of simplicity, only one of each of the components of second electronic device 200 is shown in FIG. 1.

Each one of housing 201, processor 202, application 203, memory 204, communications circuitry 206, power supply 208, input component 210, I/O component 211, display 212, sensor 214, and bus 216 of second electronic device 200 may be the same as or substantially similar to a respective one of housing 101, processor 102, application 103, memory 104, communications circuitry 106, power supply 108, input component 110, I/O component 111, display 112, sensor 114, and bus 116 of first electronic device 100 and, therefore, may not be independently described in greater detail. While, in some embodiments, first electronic device 100 and second electronic device 200 may be the same or substantially similar devices, in other embodiments, first electronic device 100 may have one or more different and/or additional components that second electronic device 200 does not have, and vice versa.

In some embodiments, communications circuitry 106 of first electronic device 100 and communications circuitry 206 of second electronic device 200 may communicate with one another directly, such as, for example, via shared communications link 51 of system 1. Shared communications link 51 may include one or more wired and/or wireless communications links or paths for transferring any suitable data and/or power between first electronic device 100 and second electronic device 200. Alternatively or additionally, in some embodiments, system 1 may include communications network 50, with which one or both of first electronic device 100 and second electronic device 200 may communicate. For example, a first electronic device communications link 151 of system 1 may include one or more wired and/or wireless communications links or paths for transferring any suitable data and/or power between communications circuitry 106 of first electronic device 100 and communications network 50. Similarly, a second electronic device communications link 251 of system 1 may include one or more wired and/or wireless communications links or paths for transferring any suitable data and/or power between communications circuitry 206 of second electronic device 200 and communications network 50. In some embodiments, as an alternative or in addition to communicating with one another via shared communications link 51, first electronic device 100 and second electronic device 200 may communicate with one another via communications network 50 and communications links 151 and 251.

Any suitable circuitry, device, system or combination of these (e.g., a wireless communications infrastructure including one or more communications towers, telecommunications servers, or the like) operative to create a communications network may be used to provide communications network 50. Communications network 50 may be capable of providing communications using any suitable communications protocol. For example, communications network 50 may support Wi-Fi, Ethernet, Bluetooth™, BLE, high frequency systems (e.g., 900 MHz, 2.4 GHz, and 5.6 GHz communication systems), infrared, TCP/IP, HTTP, BitTorrent™, FTP, RTP, RTSP, SSH, any communications protocol that may be used by wireless and cellular telephones and personal e-mail devices (e.g., GSM, GSM plus EDGE, CDMA, OFDMA, HSPA, multi-band, etc.), any other communications protocol, or any combination thereof.

Moreover, in some embodiments, communications network 50 may include one or more servers 70 or any other suitable components (e.g., any suitable cloud computing components) that may communicate with first electronic device 100 and/or second electronic device 200 via communications network 50. In some embodiments, server 70 may be a source of one or more files, applications, or any other suitable resource that may be provided to and utilized by first electronic device 100 and/or second electronic device 200 (e.g., application 103 and/or application 203). For example, server 70 may be configured as a media store that may provide first electronic device 100 and/or second electronic device 200 with various resources or media items including, but not limited to, audio files, video files, text files, graphical object files, various other multimedia files, various applications (e.g., a virtual drawing space application), and the like. An example of such a media store that may be provided by server 70 may be the iTunes™ Store and/or the App Store™, each of which is made available by Apple Inc. of Cupertino, Calif.

It should be noted that any mechanism or combination of mechanisms for enabling communication between communications circuitry 106 of first electronic device 100 and communications circuitry 206 of second electronic device 200 may sometimes be referred to collectively herein as communications media. For example, as shown in FIG. 1, shared communications link 51, first electronic device communications link 151, second electronic device communications link 251, communications network 50, and/or server 70 may be referred to individually and/or collectively as communications media 55.

Figure 2:
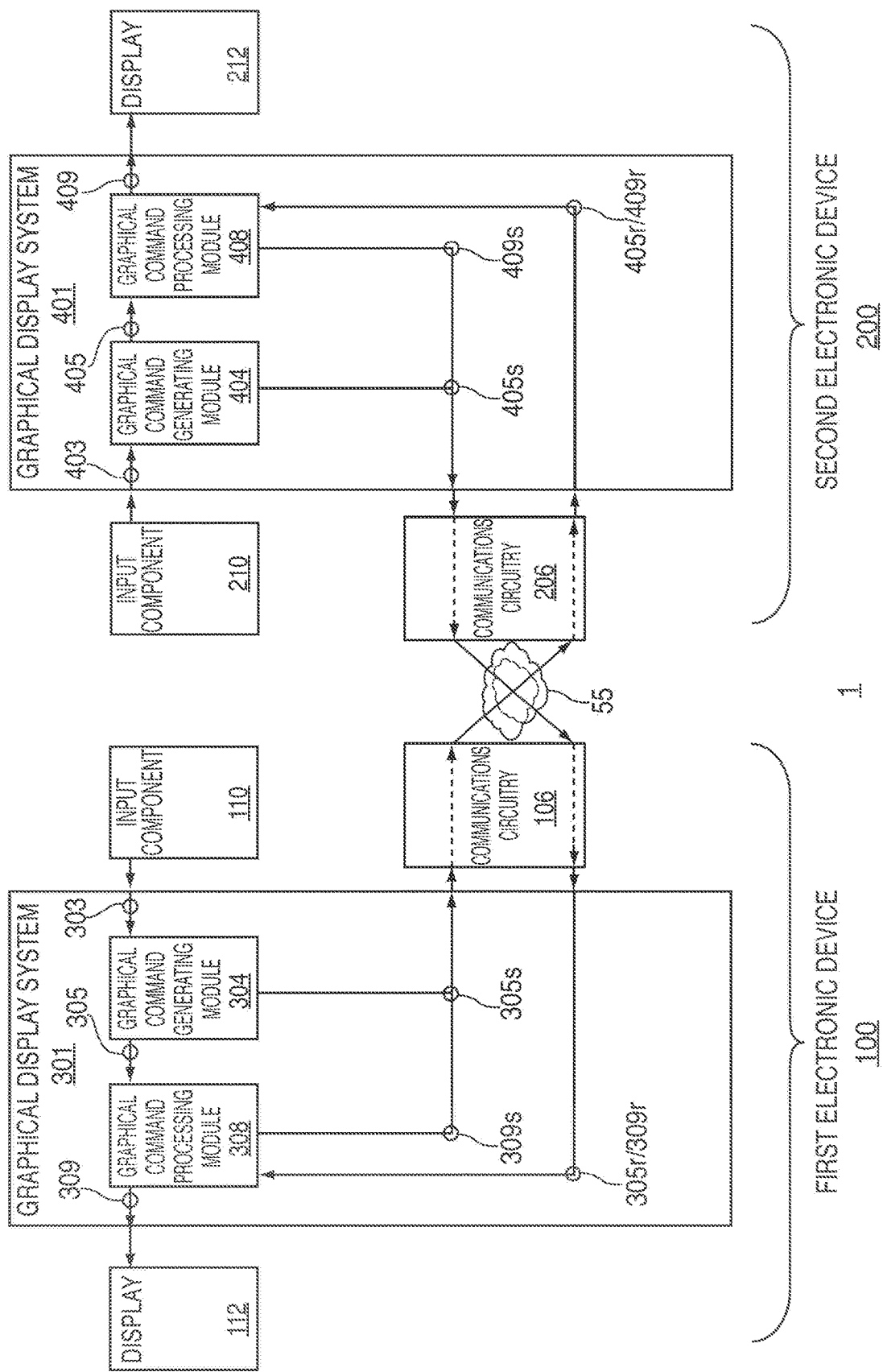
FIG. 2 is a schematic view of illustrative portions of the system of FIG. 1, in accordance with some embodiments of the invention.

FIG. 2 shows a schematic view of a graphical display system 301 of first electronic device 100 of system 1 that may be provided to generate and manipulate graphical data for presentation to a user of device 100. For example, in some embodiments, graphical display system 301 may generate and manipulate graphical data representations of two-dimensional and/or three-dimensional objects that may define at least a portion of a visual screen of information to be presented as an image on a display, such as display 112 of first electronic device 100. Graphical display system 301 may be configured to generate and manipulate realistic animated images in real time (e.g., using about 30 or more screens or frames per second).

As shown in FIG. 2, for example, graphical display system 301 of first electronic device 100 may include a graphical command generating module 304 that may define and generate one or more generated input commands 305 that may be processed to create at least a portion of the graphical contents of each of the screens to be rendered for display by first electronic device 100. Such commands and graphical screen contents may be based on the one or more applications being run by first electronic device 100 (e.g., application 103) as well as any input instructions being received by first electronic device 100 (e.g., via input component 110). The graphical screen contents can include free-form drawing strokes, image content (e.g., photographic images), textual information (e.g., one or more alphanumeric characters in a text string), drawing shape objects, video data based on images of a video program, and combinations thereof. For example, an application run by first electronic device 100 (e.g., application 103 of FIG. 1) may be any suitable application that may provide a virtual canvas or workspace on which a user may create and manipulate graphical objects, such as free-form drawing strokes, images, drawing shapes, and text strings (e.g., Photoshop™ or Illustrator™ by Adobe Systems Incorporated or Microsoft Paint™ by Microsoft Corporation). Graphical command generating module 304 may define and generate input commands 305 that may be processed to create at least a portion of these types of graphical objects on display 112. For example, graphical command generating module 304 may define and generate input commands 305 that may be processed to create drawing stroke graphical objects, image graphical objects, drawing shape graphical objects, and/or text string graphical objects on a virtual canvas for display by graphical display system 301 on display 112 of first electronic device 100.

Graphical object data may generally be represented or described in two ways or as two types of data (i.e., pixel data and analytical graphic objects or "vector objects"). Graphical object data of the pixel data type may be collections or arrays of one or more pixels (e.g., samples of color and/or other information including transparency and the like) that may be provided in various raster or bitmap or pixmap layers on a canvas or workspace. On the other hand, graphical object data of the vector object type may be an abstract graphic entity (e.g., such that its appearance, position, and orientation in a canvas or workspace may be defined analytically through geometrical formulas, coordinates, and the like). Some pixel data may be provided with additional position and orientation information that can specify the spatial relationship of its pixels relative to a canvas or workspace containing the pixel data, which may be considered a bitmap vector graphic object when placed in a vector graphics document. Before the application of any additional transformation or deformation, such a bitmap vector object may be equivalent to a rectangular vector object texture-mapped to the pixel data.

Graphical command generating module 304 may receive input information 303 from various input sources for defining one or more graphical object properties of a graphical object that may be generated and presented on display 112. For example, such input sources may be the one or more applications being run by first electronic device 100 (e.g., application 103 of FIG. 1) and/or any user input instructions being received by device 100 (e.g., via input component 110 of first electronic device 100, as shown in FIG. 2). In some embodiments, based on at least a portion of the received input information 303, graphical command generating module 304 may define and generate one or more generated input commands 305 that may be processed to create at least a portion of any suitable type of graphical content, such as a drawing stroke, an image, a string of text, a drawing shape, and the like. In some embodiments, the graphical object content may be at least partially based on one or more graphical object properties defined by received input information 303.

For example, when graphical command generating module 304 generates an input command 305 that may be processed to create at least a portion of a drawing stroke graphical object, input information 303 may be received by module 304 to define at least a portion of that input command 305 and, thus, one or more drawing stroke properties of that drawing stroke graphical object. Such input information 303 may be referred to herein as drawing stroke graphical object input information 303.

A drawing stroke graphical object may be considered a path along which a drawing stroke input tool (e.g., a stamp) may be applied. Such a drawing stroke input tool may define a particular set of pixel data to be applied on a virtual canvas when the stamp is used for creating a drawing stroke graphical object along a defined trail. For example, such a trail may define a path on the canvas along which an associated drawing stroke input tool may repeatedly apply its pixel data for generating a drawing stroke graphical object on the canvas to be displayed. A drawing stroke input tool may be defined by any suitable drawing stroke input tool property or set of drawing stroke input tool properties including, but not limited to, shape, size, pattern, orientation, hardness, color, transparency, spacing, and the like. A drawing stroke trail may be defined by any suitable drawing stroke trail property or set of drawing stroke trail properties including, but not limited to, starting point, end point, length, path, and the like.

Therefore, drawing stroke graphical object input information 303 may define one or more drawing stroke input tool properties and/or one or more drawing stroke trail properties for a particular drawing stroke graphical object that may be at least partially created by processing a command 305 generated by graphical command generating module 304 using that drawing stroke graphical object input information 303. Once drawing stroke graphical object input information 303 has been received by graphical command generating module 304, graphical command generating module 304 may define and generate at least one appropriate drawing stroke graphical object input command 305 that may be processed for creating at least a portion of an appropriate drawing stroke graphical object.

As another example, when graphical command generating module 304 generates an input command 305 that may be processed to create at least a portion of an image graphical object, input information 303 may be received by module 304 to define at least a portion of that input command 305 and, thus, one or more properties of that image graphical object. Such input information 303 may be referred to herein as image graphical object input information 303. An image graphical object may be any suitable image file that can be imported into a graphical object document or canvas. For example, a property of an image graphical object may be an address at which image data of the image is stored as an image file (e.g., in memory 104 of first electronic device 100). An image file may be in any suitable format for providing image content to graphical display system 301 of first electronic device 100 including, but not limited to, a JPEG file, a TIFF file, a PNG file, a GIF file, and the like. As another example, a property of an image graphical object may be the size or position of the image in the graphical object canvas. Once image graphical object input information 303 has been received by graphical command generating module 304, graphical command generating module 304 may define and generate at least one appropriate image graphical object input command 305 that may be processed for creating at least a portion of an appropriate image graphical object.

As another example, when graphical command generating module 304 generates an input command 305 that may be processed to create at least a portion of a text string graphical object, input information 303 may be received by module 304 to define at least a portion of that input command 305 and, thus, one or more properties of that text string graphical object. Such input information 303 may be referred to herein as text string graphical object input information 303. For example, a text string graphical object may include one or more characters, such as a letter, number, punctuation, or other symbol that may be used in the written form of one or more languages. Symbol characters may include, but are not limited to, representations from a variety of categories, such as mathematics, astrology, astronomy, chess, dice, ideology, musicology, economics, politics, religion, warning signs, meteorology, and the like. A property of a text string graphical object may be the selection of one or more particular characters and/or a characteristic of a particular character. Such a characteristic may include, but is not limited to, a font type (e.g., Arial or Courier), a style type (e.g., bold or italic), a color, a character size, a position of the character on the graphical object canvas, and the like. Once text string graphical object input information 303 has been received by graphical command generating module 304, graphical command generating module 304 may define and generate at least one appropriate text string graphical object input command 305 that may be processed for creating at least a portion of an appropriate text string graphical object.

As yet another example, when graphical command generating module 304 generates an input command 305 that may be processed to create at least a portion of a drawing shape graphical object, input information 303 may be received by module 304 to define at least a portion of that input command 305 and, thus, one or more properties of that drawing shape graphical object. Such input information 303 may be referred to herein as drawing shape graphical object input information 303. For example, a property of a drawing shape graphical object may be a pre-defined shape (e.g., a box, a star, a heart, etc.), a free-form drawing input indicative of a user-defined shape, or a characteristic of such a shape (e.g., color, size, position on the canvas, etc.). Once drawing shape graphical object input information 303 has been received by graphical command generating module 304, graphical command generating module 304 may define and generate at least one appropriate drawing shape graphical object input command 305 that may be processed for creating at least a portion of an appropriate drawing shape graphical object.

Regardless of the type of graphical object to be created, a user may interact with one or more drawing applications running on first electronic device 100 (e.g., application 103 of FIG. 1) via input component 110 to generate suitable input information 303 for defining one or more of the graphical object properties of a graphical object. Alternatively or additionally, in other embodiments, an application running on first electronic device 100 may be configured to automatically generate at least a portion of input information 303 for defining one or more of the graphical object properties.

As shown in FIG. 2, for example, graphical display system 301 of first electronic device 100 may also include a graphical command processing module 308 that may process graphical object input commands 305 generated by graphical command generating module 304 such that graphical objects may be created and presented to a user on display 112 of first electronic device 100. In some embodiments, as shown in FIG. 2, for example, graphical command processing module 308 may be configured to process received input commands 305 for providing pixel array data 309 for presentation on display 112. For example, graphical command processing module 308 may be configured to interpret each input command 305 and generate appropriate pixel array data 309 for representing the graphical object described by each input command 305 on a virtual canvas of display 112.

Graphical command processing module 308 may utilize application 103 to interpret commands 305 for generating graphical object content as pixel array data 309 on a virtual canvas. For example, graphical command processing module 308 may be configured to perform various types of graphics computations or processing techniques and/or implement various rendering algorithms on graphical object content that module 308 may generate based on commands 305, such that module 308 may provide the graphical data necessary to define at least a portion of the canvas to be displayed on display 112. Such processing may include, but is not limited to, matrix transformations, scan-conversions, various rasterization techniques, various techniques for three-dimensional vertices and/or three-dimensional primitives, texture blending, and the like. For example, in some embodiments, graphical command processing module 308 may encompass at least a portion of the graphics library of the operating system of first device 100, which may be a code module that may handle function calls like "draw circle in bitmap" or "fill bitmap with color" or "draw this set of triangles in 3-dimensional space", and that may appropriately modify the bitmap with commands performed by processor 102 (e.g., for software rendering), and/or which may be dedicated graphics processing hardware (e.g., for hardware accelerated rendering). The bitmap may be either a frame buffer in video memory (e.g., a region of bytes that may directly represent the colors of pixels on the display) or an off-screen buffer in main memory.

Pixel array data 309 generated by graphical command processing module 308 may include one or more sets of pixel data, each of which may be associated with a respective pixel of canvas 501 to be displayed by display 112. For example, each of the sets of pixel data included in pixel array data 309 may be correlated with coordinate values that identify a particular one of the pixels of canvas 501 to be displayed by display 112, and each pixel data set may include a color value for its particular pixel as well as any additional information that may be used to appropriately shade and/or provide other cosmetic features for its particular pixel.

Graphical display system 301 of first electronic device 100 may also be configured to share one or more input commands 305 generated by graphical command generating module 304 with one or more other electronic devices or servers. For example, as shown in FIG. 2, graphical command generating module 304 and/or graphical command processing module 308 may be configured to provide one or more input commands 305 as one or more shared input commands 305s to communications circuitry 106 of first electronic device 100. Shared input commands 305s may then be transmitted by communications circuitry 106 from first electronic device 100 to any other device (e.g., second electronic device 200 and/or server 70, via communications media 55).

Similarly, graphical display system 301 of first electronic device 100 may also be configured to share at least a portion of pixel array data 309 generated by graphical command processing module 308 with one or more other electronic devices or servers. For example, as shown in FIG. 2, graphical command processing module 308 may be configured to provide at least a portion of generated pixel array data 309 as shared pixel array data 309s to communications circuitry 106 of first electronic device 100. Shared pixel array data 309s may then be transmitted by communications circuitry 106 from first electronic device 100 to any other device (e.g., second electronic device 200 and/or server 70, via communications media 55).

Graphical display system 301 of first electronic device 100 may also be configured to receive one or more input commands from one or more other electronic devices or servers. For example, as shown in FIG. 2, graphical command processing module 308 may be configured to receive one or more received input commands 305r from communications circuitry 106 of first electronic device 100. Received input commands 305r may be received by communications circuitry 106 of first electronic device 100 from any other device (e.g., second electronic device 200 and/or server 70, via communications media 55). Graphical command processing module 308 may utilize application 103 to interpret both generated input commands 305 provided by graphical command generating module 304 as well as received input commands 305r provided by communications circuitry 106 for generating pixel array data 309 on a virtual canvas.

Similarly, graphical display system 301 of first electronic device 100 may also be configured to receive pixel array data from one or more other electronic devices or servers. For example, as shown in FIG. 2, graphical command processing module 308 may be configured to receive received pixel array data 309r from communications circuitry 106 of first electronic device 100. Received pixel array data 309r may be received by communications circuitry 106 of first electronic device 100 from any other device (e.g., second electronic device 200 and/or server 70, via communications media 55). Graphical command processing module 308 may utilize application 103 to generate pixel array data 309 by combining any received pixel array data 309r with any pixel array data generated by graphical command processing module 308 in response to input commands 305 and received input commands 305r.

FIG. 2 also shows a schematic view of a graphical display system 401 of second electronic device 200 of system 1 that may be provided to generate and manipulate graphical data for presentation to a user of device 200. Graphical display system 401 of second electronic device 200 may include a graphical command generating module 404 that may receive input information 403 (e.g., from input component 210 and/or application 203 of second electronic device 200) and generate one or more input commands 405. Graphical display system 401 of second electronic device 200 may also include a graphical command processing module 408 that may receive input commands 405 and generate pixel array data 409 (e.g., for presentation on display 212 of second electronic device 200).

Graphical command generating module 404 and/or graphical command processing module 408 may be configured to provide one or more input commands 405 as one or more shared input commands 405s to communications circuitry 206 of second electronic device 200, which may then transmit shared input commands 405s from second electronic device 200 to any other device (e.g., first electronic device 100 and/or server 70, via communications media 55). For example, a particular shared input command 405s provided by graphical command generating module 404 and/or graphical command processing module 408 of graphical display system 401 of second electronic device 200 may be transmitted by communications circuitry 206 of second electronic device 200, via communications media 55, and received by communications circuitry 106 of first electronic device 100 as a particular received input command 305r, which may then be provided to graphical command processing module 308 of graphical display system 301 of first electronic device 100.

Similarly, graphical command processing module 408 may be configured to provide at least a portion of generated pixel array data 409 as shared pixel array data 409s to communications circuitry 206, which may then transmit shared pixel array data 409s from second electronic device 200 to any other device (e.g., first electronic device 100 and/or server 70, via communications media 55). For example, particular shared pixel array data 409s provided by graphical command processing module 408 of graphical display system 401 of second electronic device 200 may be transmitted by communications circuitry 206 of second electronic device 200, via communications media 55, and received by communications circuitry 106 of first electronic device 100 as particular received pixel array data 309r, which may then be provided to graphical command processing module 308 of graphical display system 301 of first electronic device 100.

Moreover, graphical command processing module 408 may be configured to receive one or more received input commands 405r from communications circuitry 206 of second electronic device 200, which may receive received input commands 405r from any other device (e.g., first electronic device 100 and/or server 70, via communications media 55). For example, a particular shared input command 305s provided by graphical display system 301 to communications circuitry 106 of first electronic device 100, may be transmitted by communications circuitry 106, via communications media 55, and received by communications circuitry 206 of second electronic device 200 as a particular received input command 405r, which may then be provided to graphical command processing module 408 of graphical display system 401 of second electronic device 200.

Similarly, graphical command processing module 408 may be configured to receive received pixel array data 409r from communications circuitry 206 of second electronic device 200, which may receive received pixel array data 409r from any other device (e.g., first electronic device 100 and/or server 70, via communications media 55). For example, particular shared pixel array data 309s provided by graphical command processing module 308 to communications circuitry 106 of first electronic device 100, may be transmitted by communications circuitry 106, via communications media 55, and received by communications circuitry 206 of second electronic device 200 as particular received pixel array data 409r, which may then be provided to graphical command processing module 408 of graphical display system 401 of second electronic device 200.

The type of data that may be exchanged or otherwise shared between devices may be either bitmap or vector data. The format of the data exchanged between devices does not have to be identical to the format used by the operating system and/or underlying hardware (e.g., the graphics processing unit) of the devices. For example, graphical data might be converted to and/or from a hardware-independent format before being sent and/or after being received, which may to allow for differences in hardware platforms between devices (e.g., whether integers may be stored big-endian or little-endian, whether or not both devices conform to the IEEE 754-2008 floating point arithmetic specification, etc.).

Each one of graphical display system 401, input information 403, graphical command generating module 404, generated input command 405, shared input command 405s, received input command 405r, graphical command processing module 408, generated pixel array data 409, shared pixel array data 409s, and received pixel array data 409r of second electronic device 200 may be the same as or substantially similar to a respective one of graphical display system 301, input information 303, graphical command generating module 304, generated input command 305, shared input command 305s, received input command 305r, graphical command processing module 308, generated pixel array data 309, shared pixel array data 309s, and received pixel array data 309r of first electronic device 100 and, therefore, may not be independently described in greater detail. While, in some embodiments, graphical display system 301 of first electronic device 100 and graphical display system 401 of second electronic device 200 may be the same or substantially similar graphical display systems, in other embodiments, graphical display system 301 of first electronic device 100 may have one or more different and/or additional modules that graphical display system 401 of second electronic device 200 does not have, and vice versa. While, in some embodiments, graphical display system 301 of first electronic device 100 and graphical display system 401 of second electronic device 200 may be the same or substantially similar graphical display systems, in other embodiments, graphical display system 301 of first electronic device 100 may be configured to process or otherwise handle one or more different and/or additional types of input commands and/or types of pixel array data that graphical display system 401 of second electronic device 200 may not be configured to process or otherwise handle, and vice versa.

An illustrative example of how system 1 may manage collaboration on a virtual work of art may be described with reference to FIGS. 4A-4K.

FIGS. 4A-4K, for example, show first electronic device 100 with housing 101 and display 112 presenting respective exemplary screens 500a-500k of visual information and second electronic device 200 with housing 201 and display 212 presenting respective exemplary screens 600a-600k of visual information. As mentioned, first electronic device 100 and second electronic device 200 may be similar devices or different types of devices. For example, as shown, in FIGS. 4A-4K, first electronic device 100 may be provided as a desktop computer or a notebook computer (e.g., an iMac™ or a MacBook™ available by Apple Inc.) that may include a display 112 that may be distinct from a first user input component 110 (e.g., a mouse coupled to display 112 via a first bus 116) and a second user input component 110a (e.g., a keyboard coupled to display 112 via a second bus 116a), while second electronic device 200 may be provided as a portable tablet or telephone (e.g., an iPad™ or an iPhone™ available by Apple Inc.) that may include a display 212 that may be combined with a first user input component 210 to provide an I/O interface component 211 (e.g., a touch screen), which may be distinct from a second user input component 210a (e.g., a mechanical button provided through housing 201).

At least a portion of the visual information of each one of screens 500a-500k may be defined by graphical command generating module 304 and/or processed by graphical command processing module 308 of graphical display system 301, while at least a portion of the visual information of each one of screens 600a-600k may be defined by graphical command generating module 404 and/or processed by graphical command processing module 408 of graphical display system 401. As shown, screens 500a-500k may present a user interface for a virtual drawing space application of first electronic device 100, with which a user may create and manipulate graphical objects for making original works of art (e.g., a virtual drawing space application, such as application 103, that may be similar to that of Photoshop™ by Adobe Systems Incorporated or Microsoft Paint™ by Microsoft Corporation). It is to be understood, however, that screens 500a-500k are merely exemplary, and display 112 may present any content representing any type of graphical objects and/or graphical object animations that may be at least partially generated and/or processed by graphical display system 301 of first electronic device 100.

Similarly, as shown, screens 600a-600k may present a user interface for a virtual drawing space application of device 200 (e.g., application 203), with which a user may create and manipulate graphical objects for making original works of art. It is to be understood, however, that screens 600a-600k are merely exemplary, and display 212 may present any content representing any type of graphical objects and/or graphical object animations that may be at least partially generated and/or processed by graphical display system 401 of second electronic device 200.

For example, as shown in FIGS. 4A-4K, a virtual drawing space application of first electronic device 100 (e.g., application 103) may provide at least a portion of a canvas 501 on a portion of each one of screens 500a-500k in which various graphical objects may be presented on display 112. At least a portion of canvas 501 may be provided in a virtual drawing workspace portion of each screen in which pixel data may be created and/or manipulated for generating a virtual work of art 11. In some embodiments, the size of canvas 501 may dynamically change in response to various graphical objects that may be positioned on canvas 501, such that canvas 501 may always be large enough to contain whatever objects are generated for artwork 11. However, the amount of canvas 501 that may actually be displayed on any of screens 500a-500k of display 112 may vary from screen to screen as application 103 is utilized. For example, a user may zoom-in on a specific portion of canvas 501 such that only a portion of artwork 11 may be presented across the entire virtual drawing workspace portion on display 112.

In some embodiments, a virtual drawing space application of first device 100 (e.g., application 103) may also provide at least one artist menu 510 on a portion of each one of screens 500a-500k of first device 100. Menu 510 may include one or more graphical input options that a user may choose from to access various tools and functionalities of the application that may then be utilized by the user to create various types of graphical objects in canvas area 501. Menu 510 may provide one or more toolbars, toolboxes, palettes, buttons, or any other suitable user interface submenus that may be one or more layers or windows distinct from canvas 501. For example, artist menu 510 may include one or more suitable submenus, such as a graphical object type selection submenu 513, a graphical object property selection submenu 523, and an inter-device submenu 527. It is to be understood, however, that submenus 513, 523, and 527 of artist menu 510 are merely exemplary, and a virtual drawing space application of first electronic device 100 (e.g., application 103) may provide various other types of submenus that a user may interact with for creating and/or manipulating content in artwork 11 on canvas area 501.

As shown in FIGS. 4A-4K, for example, graphical object type selection submenu 513 of artist menu 510 of first electronic device 100 may include various graphical object type input options for selecting a particular type of graphical object to be created on canvas 501 for artwork 11. For example, graphical object type selection submenu 513 may include a free-form drawing stroke input option 512, which a user may select for creating one or more free-form drawing strokes on canvas 501 (e.g., by repeatedly applying a stamp of a user-controlled virtual input drawing tool along a stroke trail on canvas 501). Graphical object type selection submenu 513 may alternatively or additionally include a text string input option 514, which a user may select for creating one or more strings of characters on canvas 501. Graphical object type selection submenu 513 may alternatively or additionally include a drawing shape input option 516, which a user may select for creating one or more various drawing shapes on canvas 501. Moreover, graphical object type selection submenu 513 may alternatively or additionally include an image input option 518, which a user may select for importing one or more video-based and/or photographic images into canvas 501. It is to be understood, however, that options 512, 514, 516, and 518 of graphical object type selection submenu 513 of artist menu 510 are merely exemplary, and a virtual drawing space application of first electronic device 100 (e.g., application 103) may provide various other types of graphical object type input options that a user may interact with for creating and manipulating content in artwork 11 on canvas 501.

In some embodiments, as also shown in FIGS. 4A-4K, for example, artist menu 510 may include graphical object property selection submenu 523, which may provide various graphical object property input options for selecting particular properties of a graphical object to be created on canvas 501. For example, graphical object property selection submenu 523 may include a graphical object style input option 520, which a user may interact with to alter one or more various style properties of a graphical object to be created on canvas 501. Graphical object property selection submenu 523 may alternatively or additionally include a graphical object color input option 522, which a user may interact with to alter one or more various color properties of a graphical object to be created on canvas 501. Moreover, graphical object property selection submenu 523 may alternatively or additionally include a graphical object effect input option 524, which a user may interact with to alter one or more various effect properties of a graphical object to be created on canvas 501. It is to be understood, however, that options 520, 522, and 524 of graphical object property selection submenu 523 of artist menu 510 are merely exemplary, and a virtual drawing space application of first electronic device 100 (e.g., application 103) may provide various other types of graphical object property input options that a user may interact with for creating and manipulating content in artwork 11 on canvas 501.

In some embodiments, as also shown in FIGS. 4A-4K, for example, artist menu 510 may include inter-device submenu 527, which may provide various options for regulating how a user of first electronic device 100 may interact with another device (e.g., second electronic device 200) for collaborating on a shared work of art (e.g., artwork 11). For example, inter-device submenu 527 may include an input synch option 526, which a user of first device 100 may interact with to synchronize the current active user interface selections of first electronic device 100 (e.g., the current active graphical object type selection(s) of submenu 513 and/or the current active graphical object property selection(s) of submenu 523) with the current active user interface selections of another device (e.g., the current active user interface selections of second electronic device 200). Inter-device submenu 527 may alternatively or additionally include an outline lock option 528, which a user of first device 100 may interact with to fix an outline of another device's actively displayed canvas portion (e.g., an outline of the actively displayed canvas portion of a canvas of second electronic device 200) on canvas 501 of first electronic device 100. It is to be understood, however, that options 526 and 528 of inter-device submenu 527 of artist menu 510 are merely exemplary, and a virtual drawing space application of first electronic device 100 (e.g., application 103) may provide various other types of inter-device input options that a user may interact with for regulating how a user of first electronic device 100 may interact with another device (e.g., second electronic device 200) for collaborating on a shared work of art (e.g., artwork 11).

Similarly, as also shown in FIGS. 4A-4K, a virtual drawing space application 203 of second electronic device 200 may provide at least a portion of a canvas 601 on a portion of each one of screens 600a-600k in which various graphical objects may be presented on display 212. At least a portion of canvas 601 may be provided in a virtual drawing workspace portion of each screen in which pixel data may be created and manipulated for creating a user work of art (e.g., artwork 11). In some embodiments, the size of canvas 601 may dynamically change in response to various graphical objects that may be positioned on canvas 601, such that canvas 601 may always be large enough to contain whatever objects are generated for the artwork shown by device 200. However, the amount of canvas 601 that may actually be displayed on any of screens 600a-600k of display 212 may vary from screen to screen as application 203 is utilized.

Virtual drawing space application 203 may also provide at least one artist menu 610 on a portion of each one of screens 600a-600k of second device 200. Like menu 510 of first device 100, menu 610 may also include one or more graphical input options that a user may choose from to access various tools and functionalities of the application that may then be utilized by the user to create various types of graphical objects in the work of art on canvas 601. For example, artist menu 610 may include one or more suitable submenus, such as a graphical object type selection submenu 613, a graphical object property selection submenu 623, and an inter-device submenu 627. It is to be understood, however, that submenus 613, 623, and 627 of artist menu 610 are merely exemplary, and a virtual drawing space application of second electronic device 200 (e.g., application 203) may provide various other types of submenus that a user may interact with for creating and manipulating content in a work of art on canvas 601.

For example, as shown in FIGS. 4A-4K, artist menu 610 of second device 200 may include some or all of the same options as menu 510 of first device 100. In some embodiments, graphical object type selection submenu 613 of menu 610 may include a free-form drawing stroke input option 612, a text string input option 614, a drawing shape input option 616, and/or an image input option 618. Alternatively or additionally, graphical object property selection submenu 623 of menu 610 may include a graphical object style input option 620, a graphical object color input option 622, and/or a graphical object effect input option 624. Moreover, alternatively or additionally, inter-device submenu 627 of menu 610 may include an input synch option 626 and/or an outline lock option 628. It is to be understood, however, that options 612, 614, 616, 618, 620, 622, 624, 626, and 628 of submenus 613, 623, and 627 of artist menu 610 are merely exemplary, and a virtual drawing space application of second electronic device 200 (e.g., application 203) may provide various other types of input options that a user may interact with for creating and/or editing an original work of art on canvas 601.

Each one of canvas 601, artist menu 610, graphical object type selection submenu 613, free-form drawing stroke input option 612, text string input option 614, drawing shape input option 616, image input option 618, graphical object property selection submenu 623, graphical object style input option 620, graphical object color input option 622, graphical object effect input option 624, inter-device submenu 627, input synch option 626, and outline lock option 628 of second electronic device 200 may be the same as or substantially similar to a respective one of canvas 501, artist menu 510, graphical object type selection submenu 513, free-form drawing stroke input option 512, text string input option 514, drawing shape input option 516, image input option 518, graphical object property selection submenu 523, graphical object style input option 520, graphical object color input option 522, graphical object effect input option 524, inter-device submenu 527, input synch option 526, and outline lock option 528 of first electronic device 100 and, therefore, may not be independently described in greater detail. While, in some embodiments, artist menu 510 of first electronic device 100 and artist menu 610 of second electronic device 200 may be presented as the same or substantially similar artist menus, in other embodiments, menu 510 of first electronic device 100 may present one or more different and/or additional submenus or options that menu 610 of second electronic device 200 may not present, and vice versa. For example, in some embodiments, menu 610 may not present a text string input option 614 (e.g., if second electronic device 200 is not provided with a keyboard for a user of second electronic device 200 to interact with for entering strings of text).

Virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. First device 100 and second device 200 may connect with one another in any suitable way such that application 103 may be synched with application 203. For example, each device may be configured to utilize any suitable service discovery protocol for communicating with one another via communications media 55, such as a zero configuration networking protocol (e.g., Bonjour™ available by Apple Inc.).

Before or after devices 100 and 200 have established communication between each another, at least one device may load a virtual drawing application. For example, first device 100 may initially load application 103 into processor 102 (e.g., from memory 104 or from server 70). Then, once communication has been established between first device 100 and second device 200 via communications media 55, first device 100 may instruct second device 200 to load a virtual drawing application (e.g., application 203) into processor 202. In some embodiments, first device 100 may transmit a copy of application 103 to second device 200, which device 200 may load into processor 202 as application 203. Alternatively, first device 100 may instruct second device 200 to access a suitable virtual drawing application 203 from server 70. In other embodiments, second device 200 may already have application 203 available in memory 204 and may receive an instruction from first device 100 to load application 203 into processor 202. In yet other embodiments, each device may already have an appropriate drawing application loaded, and the devices may communicate this fact to one another.

Once first device 100 and second device 200 have established communication between each other, and once an appropriate virtual drawing application has been loaded by at least one of the devices, a single virtual work of art may be shared between the two applications. A virtual work of art may be any suitable document or file that may be accessed by a virtual drawing application from any suitable source (e.g., a local device memory 104/204 or from a remote server 70). For example, application 103 of first device 100 may initially load artwork 11 from memory 104 or server 70 and present artwork 11 on canvas 501. Artwork 11 may have been previously created and may be loaded by application 103 to edit the graphical contents of artwork 11. Alternatively, artwork 11 may be initially generated as a new virtual work of art by application 103.

Once artwork 11 is loaded by application 103, and once first device 100 and second device 200 have established communication between each other, artwork 11 may be shared between the two devices. In some embodiments, first device 100 may transmit to second device 200 both an instruction to load an appropriate drawing application 203 and a copy of artwork 11 to be loaded by that drawing application 203 on second device 200. Alternatively, first device 100 may just send a copy of artwork 11 to second device 200, which may have already loaded application 203. In yet other embodiments, first device 100 may send an instruction to second device 200 to load a copy of artwork 11 from an independent source (e.g., server 70). In still yet other embodiments, it may not be necessary for an entire copy of artwork 11 to be loaded by each device upon initial connection. For example, first device 100 may transmit only a subregion of the pixel array data of artwork 11 to second device 200 (e.g., if first device 100 detects that second device 200 has a smaller screen or only wishes to initially display a particular portion of artwork 11). In some embodiments, before transmitting any portion of artwork 11 or instructing second device to load any portion of artwork 11, first device 100 may initially ask second device 200 for the dimensions of its canvas 601, or screen resolution, or initial portion of its canvas 601 second device 200 wishes to initially display, and first device 100 may then share a portion of artwork 11 according to the response received from second device 200. In some embodiments, before transmitting any portion of artwork 11 or instructing second device to load any portion of artwork 11, a user may interact with first device 100 to define an outline of second device 200 (e.g., an outline 602 of FIG. 4F) on a portion of canvas 501, and first device 100 may then share only the portion of artwork 11 within that outline with second device 200. Regardless of the various ways in which first device 100 and second device 200 may be configured to not only establish communication with one another, but also to load the same artwork 11 in their respective virtual drawing applications 103 and 203, first device 100 and second device 200 may be configured to collaboratively edit artwork 11 through both user interactions with first device 100 and user interactions with second device 200.

Application 103 of first device 100 and application 203 of second device 200 may be the same application. Alternatively, application 103 may at least be configured to handle at least some of the same commands as application 203 (e.g., commands 305/405). For example, although applications 103 and 203 may not be the exact same binary code, certain portions of their source code may be the same and may share a common command vocabulary, while other portions of their source code may be device-specific layers and/or platform-specific layers. Applications 103 and 203 may be referred to as cross-platform applications. In some embodiments, first device 100 may be a device configured to run on a first platform that may be different than a second platform on which second device 200 may be configured to run, yet applications 103 and 203 may still share a common portion of source code for handling or interpreting a particular set of commands. For example, first device 100 may be configured to run the Android™ operating system available from Google Inc. of Mountain View, Calif., such that application 103 may be written in the Java programming language, while second device 200 may be configured to run the iOS™ operating system available from Apple Inc., such that application 203 may be written in the Objective-C programming language. However, although applications 103 and 203 may be configured to run on different platforms and/or different devices, applications 103 and 203 may share at least a portion of the same source code, and each application may have its own abstraction layer of the common source code that may be configured to call a platform-specific and/or device-specific portion of the code.

Regardless, application 103 and 203 may be configured to share the same semantic application-specific information. Each application may have the same semantics or semantic response when a command of a particular command set is received from another one of the applications. Therefore, all communication between application 103 of first device 100 and application 203 of second device 200 may be in terms relevant to each application and not to any system-wide, device-specific, or platform-specific events that aren't also application-specific events. For example, any communication between applications 103 and 203 that relate to coordinates may be defined in an application-specific coordinate space. Each one of applications 103 and 203 may recognize and receive any command in a command set that may be communicated from another one of the applications (e.g., commands 305/405). Although a device-specific layer and/or a platform-specific layer of an application of a particular device may determine whether or not the application may act on a particular command in a particular way, each application may still receive and recognize that command.

In some embodiments, the bytes or other data that may be provided as a graphical input command may not necessarily be identical to the bytes or other data that a device's display subsystem may use to represent vector object data or pixel array data. An additional layer of translation may be provided to make the shared commands and pixel data be platform-independent, which may allow compatibility between devices (e.g., between devices with different CPU architectures). Additionally, vector or pixel array data may be compressed before being sent between devices over communications media 55 and may be decompressed by the receiving device before being drawn to the screen or otherwise interpreted (e.g., to save bandwidth of the system).

There may be various ways in which devices can determine each others' capabilities. For example, as part of an initial synchronization process, each device may send a message over communications media 55 indicating which operations are supported by that device. Additionally, a first device may be configured to respond with an error code or any other suitable communication type if a second device instructs the first device to perform an operation that the first device does not support or is not currently able to handle. The second device may be configured to process such an error code and fall back to an alternate command (e.g., the second device may send to the first device pixel array data corresponding to the unsupported instruction). The scheme by which pixel array data may be shared may be a part of a common command vocabulary. There can be a common, platform-independent format for pixel data that all devices may be capable of sending and receiving. The specifics of this format (e.g., the order of bytes and color components, whether pixel data is split into chunks for easier transport, whether or not compression is used, etc.) may be defined in various ways by a party responsible for defining the common command set/network communication protocol for the system.

Figure 4A:
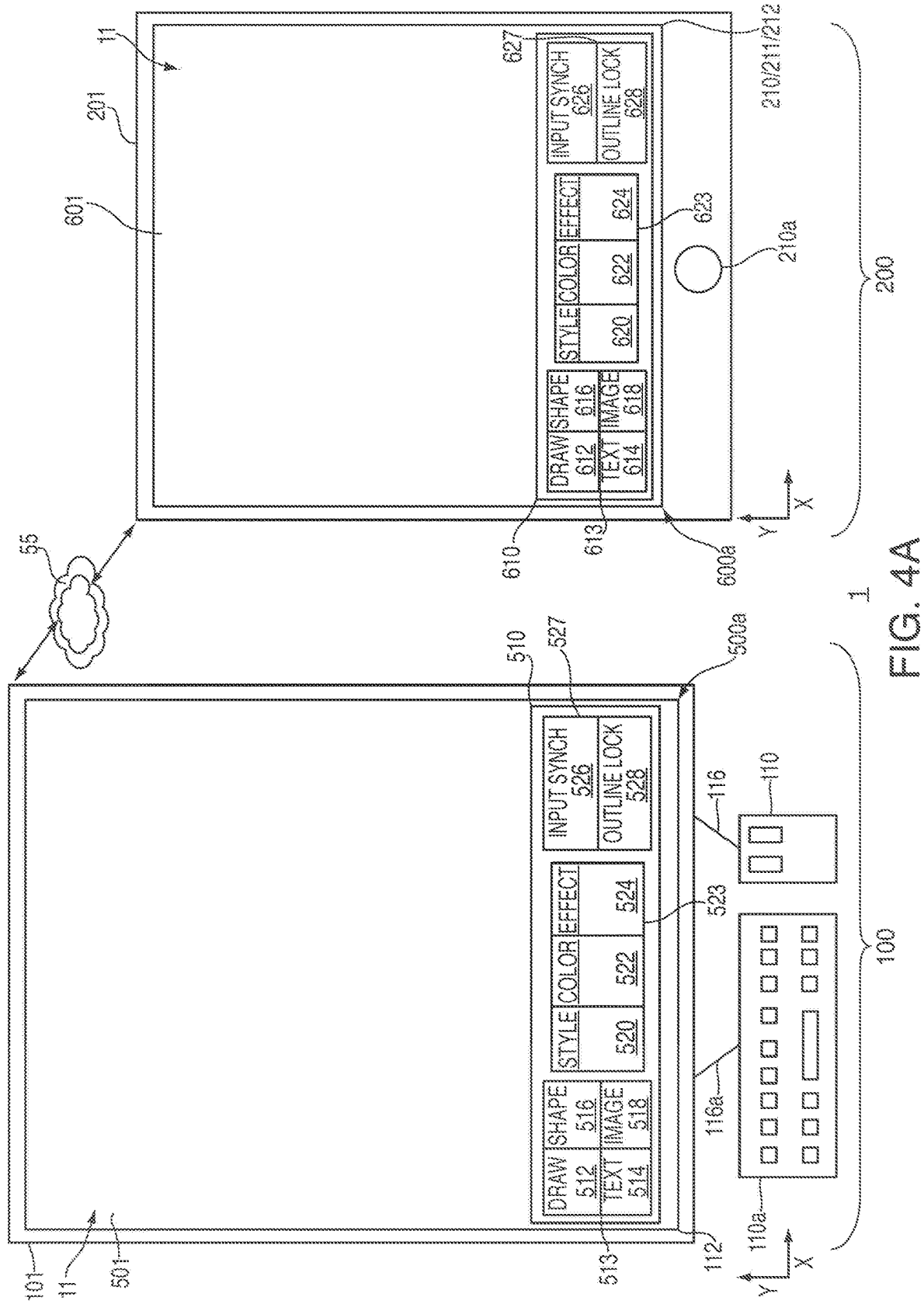

Once first device 100 has loaded application 103 and/or second device 200 has loaded application 203, artwork 11 may be loaded by at least one of the applications. For example, as shown in FIG. 4A, application 103 may be loaded by first device 100 and artwork 11 may be loaded by application 103. As shown by screen 500a of FIG. 4A, artwork 11 may initially include no graphical content. For example, application 103 may initially create artwork 11 as a new artwork 11. Next, application 103 may either share artwork 11 with second device 200 (e.g., by instructing second device 200 to load application 203 and receive artwork 11 from first device 100) before a user interacts with either device for generating new graphical content in artwork 11, or a user may interact with first device to generate new graphical content in artwork 11 before sharing artwork 11 with second device 200. As shown in FIG. 4A, for example, artwork 11 may be shared with application 203 of second device 200 such that artwork 11 is also displayed on canvas 601 of second device 200.

Figure 4B:
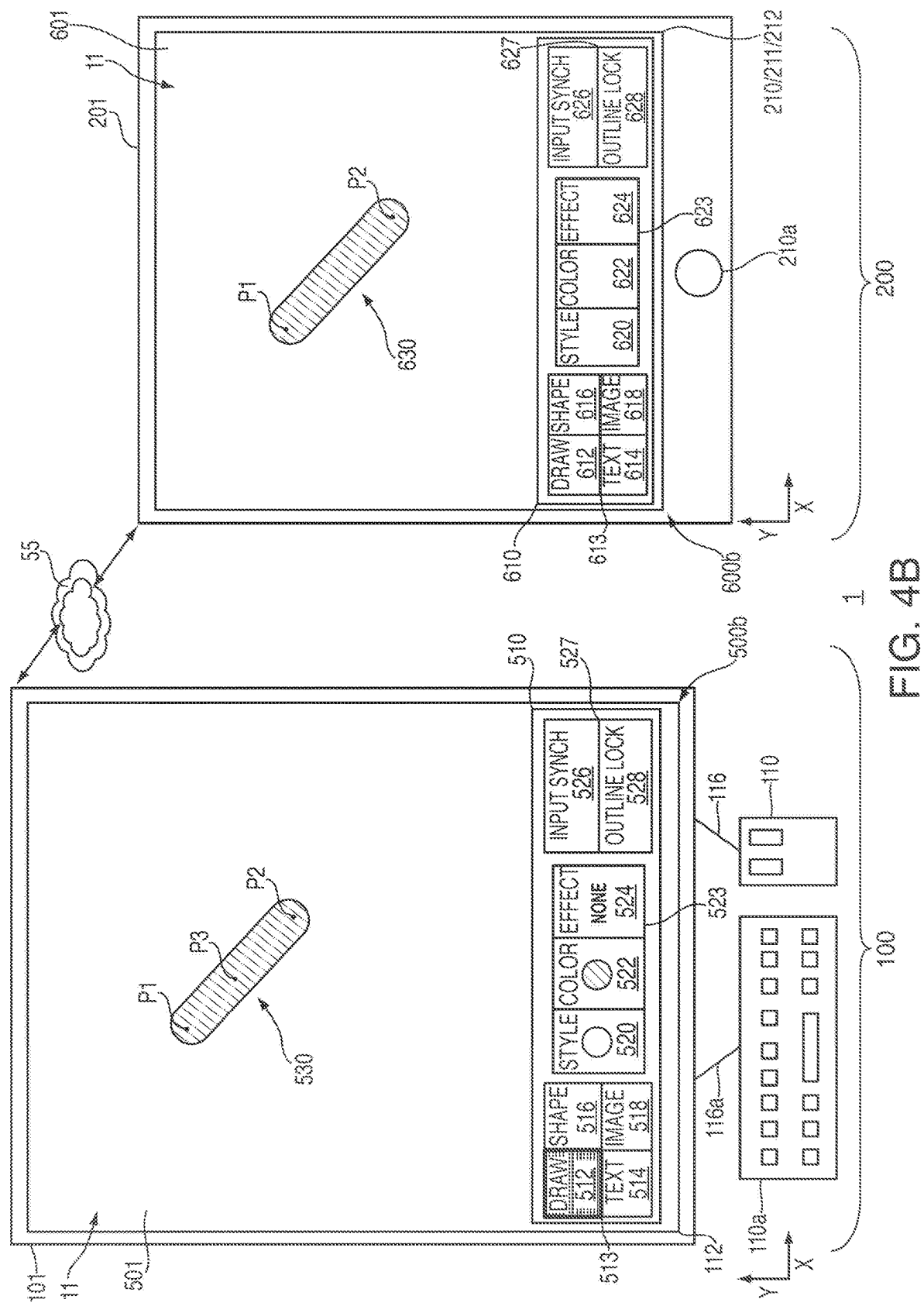

As shown by screen 500b of FIG. 4B, for example, once artwork 11 has been loaded by application 103, a user of first electronic device 100 may select drawing stroke input option 512 of submenu 513 of artist menu 510 for creating one or more free-form drawing strokes in artwork 11 on canvas 501 (e.g., user selection of option 512 may be shown by shading indicia within option 512 on screen 500b of FIG. 4B, although selection of any option may be made apparent in any other suitable way, including non-visual ways). When a user selects drawing stroke input option 512, various additional options (not shown) may be made available to the user with respect to one or more of submenu options 520, 522, and 524 of graphical object property selection submenu 523, such that a user may select one or more drawing stroke properties that may at least partially define a drawing stroke graphical object to be created in artwork 11 on canvas 501. For example, drawing stroke graphical object style input option 520 of property selection submenu 523 may allow the user to select a drawing stroke input tool from a group of various pre-defined drawing stroke input tools or stamps (e.g., a "circular pen" drawing stroke input tool, as shown in FIG. 4B), drawing stroke graphical object color input option 522 of property selection submenu 523 may allow the user to select a color from a group of various pre-defined drawing stroke colors (e.g., a color represented by "///" markings, as shown in FIG. 4B), and drawing stroke graphical object effect input option 524 of property selection submenu 523 may allow the user to select one or more effects to be applied to the drawing stroke from a group of various pre-defined drawing stroke effects (e.g., no effects, as shown in FIG. 4B). It is to be understood that additional or alternative pre-defined drawing stroke input tools of various other pre-defined shapes, colors, effects, and other various pre-defined drawing stroke graphical object properties may also be provided by submenu 523 of menu 510 when drawing stroke input option 512 of submenu 513 is selected.

Any selections made by the user with respect to the options provided by menu 510 may be received by graphical display system 301 of first electronic device 100 for generating and displaying menu input content on menu 510. For example, selections made by the user with respect to the options provided by menu 510 may be received by graphical command generating module 304 of graphical display system 301 as menu input information 303. In some embodiments, a user may interact with menu 510 to provide selections using any suitable pointing input component of first electronic device 100 (e.g., mouse input component 110 of FIGS. 4A-4K). For example, a user may interact with mouse input component 110 to point and click a cursor (not shown) at one or more suitable portions of screen 500b of display 112 that may be presenting the appropriate selectable options of menu 510. It is to be understood, however, that any suitable pointing input component may be used by a user to point to or otherwise identify a particular menu option provided by menu 510 and any suitable input gesture of that pointing input component or another input component may be used to interact with that particular menu option in any particular way.

When a user selectively interacts with options 512, 520, 522, and 524 of menu 510 for creating a drawing stroke graphical object with a circular pen drawing stroke input tool of a particular color and no effects, for example, the selections may be received by graphical command generating module 304 of graphical display system 301 as menu input information 303, and graphical command generating module 304 may generate one or more appropriate menu input commands 305 that may be representative of these menu selections. These menu input commands 305 may be processed by graphical command processing module 308 to generate at least a portion of pixel array data 309 with pixel data that may represent these menu selections, and that pixel data may be presented on display 112 in menu 510 or at any other suitable portion of the displayed interface.

For example, as shown by screen 500b of FIG. 4B, in response to a user selecting drawing stroke input option 512 (e.g., with mouse input component 110), graphical command generating module 304 may receive certain menu input information 303 and may then generate a particular menu input command 305 (e.g., a menu input command with the representative syntax "COMMAND: CLASS=MENU INPUT; SELECT=MENU OPTION 512"), which may be processed by graphical command processing module 308 to generate at least a portion of pixel array data 309 with updated menu pixel data that may present shading indicia at the portion of screen 500b identifying input option 512 in menu 510 on display 112. Similarly, as shown by screen 500b of FIG. 4B, in response to a user selecting a circular pen drawing stroke graphical object style input option 520, graphical display system 301 may generate and present a rigid circle within the box identifying input option 520 in menu 510 on display 112. Moreover, as shown by screen 500b of FIG. 4B, in response to a user selecting a particular color with input option 522 and no effect with input option 524, graphical display system 301 may generate and present a representation of that color (e.g., "///") within the box identifying input option 522 in menu 510 on display 112 and a representation of no effect (e.g., "none") within the box identifying input option 524 in menu 510 on display 112.

Once options 512, 520, 522, and 524 of menu 510 have been selected for creating a drawing stroke graphical object (e.g., with a circular pen drawing stroke input tool of a particular color and no effects), and once the selections have been received by graphical display system 301 and represented on display 112 in menu 510, the user may then interact with graphical display system 301 for generating one or more new drawing stroke graphical objects in artwork 11 on canvas 501 according to the selected options. Based on any appropriate drawing stroke graphical object input information 303, which may be generated by a user (e.g., using input component 110 and/or 110a) and/or by any application running on device 100 (e.g., application 103), graphical command generating module 304 may be configured to define and generate at least one new drawing stroke graphical object input command 305. This new drawing stroke graphical object input command 305 may then be processed by graphical command processing module 308 as new drawing stroke graphical object pixel array data 309 and presented on display 112 in canvas 501.

For example, as also shown by screen 500b of FIG. 4B, a user may interact with graphical display system 301 to generate a new drawing stroke graphical object 530 in artwork 11 on canvas 501. As shown, drawing stroke graphical object 530 of artwork 11 may include a straight diagonal line extending along a trail path from a starting point P1 on canvas 501 to an ending point P2 on canvas 501 with the selected drawing stroke properties of options 520, 522, and 524. For example, in response to a user defining a trail path for a new drawing stroke graphical object (e.g., by dragging a cursor along canvas 501 from point P1 to point P2 with mouse input component 110), graphical command generating module 304 may receive certain drawing stroke input information 303 and then generate a particular drawing stroke input command 305. For example, based on the currently selected properties of options 520, 522, and 524, and the trail path defined by points P1 and P2, graphical command generating module 304 may generate a new drawing stroke graphical object input command 305, which may have the following representative syntax: "COMMAND: CLASS=GRAPHICAL OBJECT INPUT; TYPE=DRAWING STROKE; STYLE=CIRCULAR PEN; COLOR=///; EFFECT=NONE; START:P1; END:P2". The new drawing stroke input command 305 generated by graphical command generating module 304 may then be processed by graphical command processing module 308 to generate at least a portion of new drawing stroke pixel array data 309 that may present new drawing stroke graphical object 530 at the appropriate position on canvas 501 of screen 500b of display 112.

It is to be understood that the above representative syntax of new drawing stroke input command 305 for generating new drawing stroke graphical object 530 is merely representative, and that any suitable syntax may be used by application 103 of first electronic device 100 for generating a new drawing stroke input command 305 in response to received drawing stroke input information 303. The actual data that may be shared between devices may be binary (e.g., one byte to indicate a command class, two bytes to represent a coordinate value, four bytes to represent a color, etc.). For example, a command to create a new graphical object might include (1) a code indicating this command creates a new object, (2) the length in bytes of the data that follows, and (3) a sequence of attribute/value pairs. The attributes may be represented as numeric codes. For example, a byte with a value of 1 may represent "color" and may indicate that four bytes of color data (e.g., red/green/blue/alpha) follow. As another example, a byte with a value of 2 may represent "stroke width" and may indicate that one byte follows.

As yet another example, a byte with a value of 20 may represent "start point" and may indicate that four bytes follow (e.g., two for the X coordinate and two for the Y coordinate). The exact sequence of attribute/value pairs sent may depend on the type of the object being created. The absence of an attribute may indicate that a default value can be used. For example, a "new circle" command sent without a color attribute may inform the recipient device to simply use the currently selected color.

Common attributes that may be shared among shape and drawing stroke tools may be stroke color, interior color, line width, and initial position. Shape tools may also send height and width values, as well as an identifier indicating the type of the shape (e.g., circle, square, diamond, etc.). A pen stroke may not have a two-dimensional size, but it can treat the initial position as the starting point of the stroke, and send an endpoint attribute. It may also send control points as attributes if the stroke is to be a Bezier curve or other spline. The set of attributes can be orthogonal to the set of actions. For example, an action might be "create new object" or "modify existing object." Both actions may use the same attribute/value pairs, where the "create new object" action may use the attributes to determine the appearance of the new object, and the "modify existing object" action may use the attributes to describe which properties of the object should be changed.

Although only starting point P1 and ending point P2 of the trail of new drawing stroke graphical object 530 may be defined by the exemplary representative syntax of new drawing stroke input command 305, it is to be understood that, in other embodiments, multiple additional points of the trail may be defined by the new drawing stroke input command 305. For example, if the new drawing stroke is a straight line (e.g., as is shown in FIG. 4B by the straight diagonal line of drawing stroke graphical object 530 between starting point P1 and ending point P2), graphical command generating module 304 may only define a new drawing stroke input command 305 with a starting point and an ending point in order for the new drawing stroke input command 305 to adequately instruct graphical command processing module 308 to generate the appropriate path of the new drawing stroke graphical object on canvas 501. However, if the new drawing stroke is not a straight line (e.g., a drawing stroke that follows a curved or otherwise non-linear path), graphical command generating module 304 may define a new drawing stroke input command 305 with multiple additional points along the path between the starting point and the ending point in order for the new drawing stroke input command 305 to adequately instruct graphical command processing module 308 to generate the appropriate path of the new drawing stroke graphical object on canvas 501.

In some embodiments, rather than generating a single new drawing stroke input command 305 for a new drawing stroke graphical object to be generated on canvas 501, graphical command generating module 304 may generate multiple new drawing stroke input commands 305, each of which may adequately instruct graphical command processing module 308 to generate a particular portion of the new drawing stroke graphical object on canvas 501. For example, as shown in FIG. 4B, the trail path of drawing stroke graphical object 530 may be defined by starting point P1, ending point P2, and an intermediate point P3, such that graphical command generating module 304 may generate two drawing stroke graphical object input commands 305. The first of such two drawing stroke graphical object input commands 305 for defining drawing stroke graphical object 530 may have the following representative syntax: "COMMAND: CLASS=GRAPHICAL OBJECT INPUT; TYPE=DRAWING STROKE; STYLE=CIRCULAR PEN; COLOR=///; EFFECT=NONE; START:P1; END:P3", while the second of such two drawing stroke graphical object input commands 305 for defining drawing stroke graphical object 530 may have the following representative syntax: "COMMAND: CLASS=GRAPHICAL OBJECT INPUT; TYPE=DRAWING STROKE; STYLE=CIRCULAR PEN; COLOR=///; EFFECT=NONE; START:P3; END:P2". Each one of these two drawing stroke input commands 305 generated by graphical command generating module 304 may be processed by graphical command processing module 308 to generate at least a portion of new drawing stroke pixel array data 309 that may present new drawing stroke graphical object 530 at the appropriate position on canvas 501 of screen 500b.

A first input command 305 defining a first portion of a graphical object may be processed by processing module 308 while a second input command 305 defining a second portion of the graphical object is being generated by command generating module 304 in order to decrease the latency of system 1. That is, each one of multiple input commands 305 defining different portions of a graphical object may be processed for displaying its particular portion of the graphical object as soon as that particular input command is received by processing module 308, rather than none of the multiple input commands 305 being processed until all of the multiple input commands 305 are received by processing module 308. For example, following the example of drawing stroke graphical object 530 being defined by two drawing stroke input commands 305, the first drawing stroke input command 305 may be processed by processing module 308 for presenting a first portion of new drawing stroke graphical object 530 at the appropriate position on canvas 501 of screen 500b (i.e., the portion of new drawing stroke graphical object 530 between points P1 and P3 defined by the first of the two drawing stroke input commands 305) before and/or while command generating module 304 may be generating the second drawing stroke input command 305 (i.e., the input command 305 defining the portion of new drawing stroke graphical object 530 between points P3 and P2).

As mentioned, virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. Therefore, when applications 103 and 203 are synched and have loaded common work of art 11, graphical object input commands generated by devices 100 and 200 may be shared by the devices such that artwork 11 presented by each device may have the same graphical object content. For example, at least some graphical object input commands 305 generated by graphical command generating module 304 may be provided to communications circuitry 106 of first electronic device 100 as shared graphical object input commands 305s. A shared graphical object input command 305s may be provided to communications circuitry 106 directly from graphical command generating module 304 or from graphical command processing module 308 (e.g., after graphical command processing module 308 has received the graphical object input command 305 from graphical command generating module 304). Communications circuitry 106 may then provide the shared graphical object input command 305s to communications circuitry 206 of second electronic device 200 via communications media 55, and communications circuitry 206 may provide the shared graphical object input command 305s as a received graphical object input command 405r to graphical command processing module 408 of graphical display system 401.

Therefore, continuing with the example of FIG. 4B, based on the selected properties of options 520, 522, and 524, and points P1 and P2 of the trail path defined by new drawing stroke input information 303, graphical display system 301 may generate at least one new drawing stroke graphical object input command 305 that not only may be received and processed by graphical command processing module 308 of first electronic device 100 to generate at least a portion of new drawing stroke pixel array data 309 that may present new drawing stroke graphical object 530 at the appropriate position on canvas 501 of screen 500b of display 112, but that also may be received and processed (i.e., as a received graphical object input command 405r) by graphical command processing module 408 of second electronic device 200 to generate at least a portion of new drawing stroke pixel array data 409 that may present a new drawing stroke graphical object 630 at the appropriate position on canvas 601 of screen 600b of display 212. By sharing each of the one or more new drawing stroke graphical object input commands 305 that may define new drawing stroke graphical object 530 (e.g., as one or more shared drawing stroke graphical object input commands 305s and, eventually, as one or more received drawing stroke graphical object input commands 405r), both graphical command processing module 308 of first device 100 and graphical command processing module 408 of second device 200 may independently receive and process the same new drawing stroke graphical object input command(s) for generating and displaying a new drawing stroke graphical object of shared work of art 11 on both canvas 501 of first device 100 and canvas 601 of second device 200. It is to be appreciated that, in some embodiments, no confirmation is required when a device receives a shared command. For example, after a user interacts with first device 100 to generate a graphical input command 305 and that input command is shared with second device 200 (e.g., as shared input command 305s/received input command 405r), second device 200 need not send any command or other data back to first device 100 in order for second device to process the input command or for first device to stop sharing the command.

Alternatively, as mentioned, at least some new drawing stroke graphical object pixel array data 309 generated by graphical command processing module 308 may be provided to communications circuitry 106 of first electronic device 100 as shared drawing stroke graphical object pixel array data 309s. Communications circuitry 106 may then provide the shared drawing stroke graphical object pixel array data 309s to communications circuitry 206 of second electronic device 200 via communications media 55, and communications circuitry 206 may provide the shared drawing stroke graphical object pixel array data 309s as received drawing stroke graphical object pixel array data 409r to graphical command processing module 408 of graphical display system 401.

Therefore, graphical command processing module 308 may process at least one new drawing stroke graphical object input command 305 to generate at least a portion of new drawing stroke pixel array data 309 that not only may present at least a portion of new drawing stroke graphical object 530 at the appropriate position on canvas 501 of screen 500b of display 112, but that also may be received (i.e., as received drawing stroke pixel array data 409r) by graphical command processing module 408 of second electronic device 200 to present at least a portion of new drawing stroke graphical object 630 at the appropriate position on canvas 601 of screen 600b of display 212. By sharing the pixel array data 309 that may present new drawing stroke graphical object 530 (e.g., as shared drawing stroke graphical object pixel array data 309s and, eventually, as received drawing stroke graphical object pixel array data 409r), both graphical command processing module 308 of first device 100 and graphical command processing module 408 of second device 200 may independently display a new drawing stroke graphical object of shared work of art 11 on both canvas 501 of first device 100 and canvas 601 of second device 200. There may be semantics attached to shared pixel array data, but they may minimal compared to that of shared graphical input commands. For example, a chunk of pixel array data may contain the following fields: (1) a width of the region in pixels; (2) a height of the region in pixels; (3) an X and Y coordinate pair where a particular point of the region (e.g., the upper-left point) is to be placed on the canvas; and (4) the pixel data. Such pixel data may include a sequence of, for example, 4-byte values that may indicate pixel colors starting at the upper-left point and progressing to the right and downward. The number of pixels in this sequence may be configured to equal the width value times the height value for the command to be well-formed.

However, this approach of sharing pixel array data may add unnecessary latency to system 1, as graphical display system 301 of first device 100 may have to generate new drawing stroke pixel array data 309 from a new drawing stroke graphical object input command 305 before sharing new drawing stroke pixel array data 309 with second device 200, whereas the previously described approach may allow graphical display system 301 of first device 100 to share a new drawing stroke graphical object input command 305 with second device 200 before and/or while graphical display system 301 of first device 100 may generate new drawing stroke pixel array data 309 from the new drawing stroke graphical object input command 305. Moreover, the bandwidth that may be required by communications media 55 to communicate a drawing stroke graphical object input command 305 from first device 100 to second device 200 (e.g., as shared drawing stroke graphical object input command 305s/received drawing stroke graphical object input command 405r) may be significantly less than the bandwidth that may be required by communications media 55 to communicate drawing stroke pixel array data 309 from first device 100 to second device 200 (e.g., as shared drawing stroke pixel array data 309s/received drawing stroke pixel array data 409r). Each particular command generated and/or shared by system 1 may be smaller in size (e.g., may require less bandwidth to be transmitted across communications media 55) than that of the pixel array data that may be generated by processing the particular command. By utilizing common semantics in response to particular shared input commands, graphical display system 301 of first device 100 and graphical display system 401 of second device 200 may share the input commands generated by one another so that each device may independently process the same input commands and so that each device may display the resultant pixel array data with reduced latency.

However, in some embodiments, despite utilizing common semantics in response to particular input commands, first electronic device 100 and second electronic device 200 may have different resources or capabilities, and may sometimes rather share pixel array data generated by one of the two devices for updating collaborative artwork 11 instead of or in addition to sharing input commands generated by one of the two devices for updating collaborative artwork 11. For example, upon receiving a received drawing stroke graphical object input command 405r, graphical display system 401 may determine that second electronic device 200 is not able to or does not wish to generate new drawing stroke pixel array data 409 from the received drawing stroke graphical object input command 405r. For example, graphical display system 401 may determine that second device 200 is trying to conserve its power supply 208 and does not have enough processing power to utilize for generating new drawing stroke pixel array data 409 from the received drawing stroke graphical object input command 405r. As another example, graphical display system 401 may determine that second device 200 may lack a graphics processing unit powerful enough to perform a complex operation for processing a received graphical input command (e.g., a filter that renders an image with simulated oil pastels or paintbrush strokes in real time). As yet another example, graphical display system 401 may determine that first device 100 may have native support for hardware-accelerated image processing filters (e.g., that first device 100 may be an iMac™ with a Core Image library), and that it may be faster to use the native functionality of first device 100 and then receive the results from first device 100 over communications media 55 rather than perform the operation on second device 200. In some embodiments, in response to such a determination, rather than generating new drawing stroke pixel array data 409 from received drawing stroke graphical object input command 405r with graphical command processing module 408, graphical display system 401 of second device 200 may instead send a command to graphical display system 301 of first device 100 that may instruct graphical display system 301 to transmit new drawing stroke pixel array data 309 (e.g., as shared drawing stroke pixel array data 309s) to graphical command processing module 408 (e.g., as received drawing stroke pixel array data 409r), such that graphical command processing module 408 may avoid having to independently process received drawing stroke graphical object input command 405r.

As shown by screen 500c of FIG. 4C, for example, a user of first electronic device 100 may select text string input option 514 of submenu 513 of artist menu 510 for creating one or more text string graphical objects in artwork 11 on canvas 501 (e.g., selection of option 514 may be shown by shading indicia within option 514 on FIG. 4C, although selection of any option may be made apparent in any other suitable way, including non-visual ways). When a user selects text string input option 514, various options (not shown) may be made available to the user with respect to one or more of submenu options 520, 522, and 524 of graphical object property selection submenu 523, such that a user may select one or more text string properties that may at least partially define a text string graphical object to be created in artwork 11 on canvas 501. For example, text string graphical object style input option 520 of property selection submenu 523 may allow the user to select a font type from a group of various pre-defined font types (e.g., a "Arial" text string style, as shown in FIG. 4C), text string graphical object color input option 522 of property selection submenu 523 may allow the user to select a color from a group of various pre-defined text string colors (e.g., a solid color represented by "■", as shown in FIG. 4C), and text string graphical object effect input option 524 of property selection submenu 523 may allow the user to select one or more effects to be applied to the text string from a group of various pre-defined text string effects (e.g., an underlining effect, as shown in FIG. 4C). It is to be understood that additional or alternative pre-defined text string input tools of various other pre-defined fonts, colors, effects, and other various pre-defined text string graphical object properties may also be provided by submenu 523 of menu 510 when text string input option 514 of submenu 513 is selected.

Any interactions made by the user with respect to the options provided by menu 510 may be received by graphical display system 301 of first electronic device 100 for generating and displaying new menu content in menu 510. For example, when a user selects options 514, 520, 522, and 524 of menu 510 for creating a text string graphical object with an Arial font of a particular color and an underlining effect, for example, the menu selections may be received by graphical command generating module 304 of graphical display system 301 as menu input information 303, and graphical command generating module 304 may generate one or more appropriate menu input commands 305 representative of these menu selections. These menu input commands 305 may be processed by graphical command processing module 308 to generate at least a portion of pixel array data 309 with pixel data that may represent these menu selections, and that menu selection pixel data may be presented on display 112 in menu 510.

For example, as shown by screen 500c of FIG. 4C, in response to a user selecting text string input option 514 (e.g., with mouse input component 110), graphical command generating module 304 may receive certain menu input information 303 and then generate a particular menu input command 305 (e.g., a menu input command with the representative syntax "COMMAND: CLASS=MENU INPUT; SELECT=MENU OPTION 514"), which may be processed by graphical command processing module 308 to generate at least a portion of pixel array data 309 with updated menu pixel data that may present shading indicia at the portion of screen 500*c* identifying input option 514 in menu 510 of display 112. Submenu 513 may be configured such that only one of options 512, 514, 516, and 518 may be selected at any given time. Therefore, the shading indicia identifying input option 512 on screen 500*b* of FIG. 4B may be removed. Similarly, as shown by screen 500*c* of FIG. 4C, in response to a user selecting an Arial font at style input option 520, graphical display system 301 may generate and present "Arial" within the box identifying input option 520 in menu 510 of display 112. Moreover, as shown by screen 500*c* of FIG. 4C, in response to a user selecting a particular color with input option 522 and an underlining effect with input option 524, graphical display system 301 may generate and present a representation of that color (e.g., "■") within the box identifying input option 522 in menu 510 of display 112 and a representation of the underlining effect (e.g., "__") within the box identifying input option 524 in menu 510 of display 112. It is to be understood that a menu input command generated with respect to a particular platform's user interface might not be shared with another device (e.g., if input synch 526/626 is not selected). Different devices may have entirely different user interfaces, with different menu schemes, button layouts, presence or lack of certain features, and the like. Therefore, certain menu input commands may not affect the user interface of one device like it may affect another.

Once options 514, 520, 522, and 524 of menu 510 have been selected for creating a text string graphical object (e.g., with an Arial font of a particular color and an underlining effect), and once the selections have been received by graphical display system 301 and represented on display 112 in menu 510, the user may then interact with device 100 for generating one or more glyphs of text on canvas 501 according to the selected options. Based on any appropriate text string graphical object input information 303, which may be generated by a user (e.g., using input component 110 and/or input component 110*a*) and/or any application running on device 100 (e.g., application 103), graphical command generating module 304 may be configured to define and generate at least one new text string graphical object input command 305. This new text string graphical object input command 305 may then be processed by graphical command processing module 308 as new text string graphical object pixel array data 309 and presented on display 112.

For example, as also shown by screen 500*c* of FIG. 4C, a user may interact with graphical display system 301 to generate a new text string graphical object 540 in artwork 11 on canvas 501. As shown, text string graphical object 540 may include the text "OK" beginning at a starting point P4 on canvas 501 with the selected text string properties of options 520, 522, and 524. For example, in response to a user defining a starting point P4 of a new text string graphical object (e.g., by pointing a cursor at point P4 on canvas 501 with mouse input component 110) and defining the characters "OK" of the new text string graphical object (e.g., by selecting the appropriate keys on keyboard input component 110*a*), graphical command generating module 304 may receive certain text string input information 303 and then generate a particular text string input command 305. For example, based on the selected properties of options 520, 522, and 524, starting point P4, and characters "OK", graphical command generating module 304 may generate a new text string graphical object input command 305, which may have the following representative syntax: "COMMAND: CLASS=GRAPHICAL OBJECT INPUT; TYPE=TEXT STRING; STYLE=ARIAL; COLOR=BLACK; EFFECT=UNDERLINE; START:P4; CHARACTER(S):OK". The new text string input command 305 generated by graphical command generating module 304 may then be processed by graphical command processing module 308 to generate at least a portion of new text string pixel array data 309 that may present new text string graphical object 540 at the appropriate position on canvas 501 of screen 500*c* of display 112.

It is to be understood that the above representative syntax of new text string input command 305 for generating new text string graphical object 540 is merely representative, and that any suitable syntax may be used by application 103 of first electronic device 100 for generating a new text string input command 305 in response to received text string input information 303. Although only starting point P4 of new text string graphical object 540 may be defined by the exemplary representative syntax of new text string input command 305, it is to be understood that, in other embodiments, multiple additional points on canvas 501 with respect to the new text string graphical object may be defined by the new text string input command 305.

In some embodiments, rather than generating a single new text string input command 305 for a new text string graphical object to be generated on canvas 501, graphical command generating module 304 may generate multiple new text string input commands 305, each of which may adequately instruct graphical command processing module 308 to generate a particular portion of the new text string graphical object on canvas 501. For example, as shown in FIG. 4C, the starting position of text string character "O" of text string graphical object 540 may be defined by starting point P4, and the starting point of text string character "K" of text string graphical object 540 may be defined by starting point P5, such that graphical command generating module 304 may generate two text string graphical object input commands 305. The first of such two text string graphical object input commands 305 for defining text string graphical object 540 may have the following representative syntax: "COMMAND: CLASS=GRAPHICAL OBJECT INPUT; TYPE=TEXT STRING; STYLE=ARIAL; COLOR=BLACK; EFFECT=UNDERLINE; START:P4; CHARACTER(S):O", while the second of such two text string graphical object input commands 305 for defining text string graphical object 540 may have the following representative syntax: "COMMAND: CLASS=GRAPHICAL OBJECT INPUT; TYPE=TEXT STRING; STYLE=ARIAL; COLOR=BLACK; EFFECT=UNDERLINE; START:P5; CHARACTER(S): K". Each one of these two text string input commands 305 generated by graphical command generating module 304 may be processed by graphical command processing module 308 to generate at least a portion of new text string pixel array data 309 that may present new text string graphical object 540 at the appropriate position on canvas 501 of screen 500*c* of display 112.

As mentioned, virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. Therefore, continuing with the example of FIG. 4C, based on the selected properties of options 520, 522, and 524, point P4, and characters "OK" defined by text string graphical object input information 303 and received by first electronic device 100, graphical command generating module 304 may generate a new text string graphical object input command 305 that not only may be received and processed by graphical command processing module 308 of first electronic device 100 to generate at least a portion of new drawing stroke pixel array data 309 for presenting new text string graphical object 540 at the appropriate position on canvas 501 of screen 500c of display 112, but that also may be received and processed (i.e., as a received graphical object input command 405r) by graphical command processing module 408 of second electronic device 200 to generate at least a portion of new text string pixel array data 409 for presenting a new text string graphical object 640 at the appropriate position on canvas 601 of screen 600c of display 212. By sharing the new text string graphical object input command 305 (e.g., as shared text string graphical object input command 305s and, eventually, as received text string graphical object input command 405r), both graphical command processing module 308 of first device 100 and graphical command processing module 408 of second device 200 may independently receive and process the same new text string graphical object input command for generating a new text string graphical object of artwork 11 on both canvas 501 of first device 100 and canvas 601 of second device 200.

Alternatively, as mentioned, at least some new text string graphical object pixel array data 309 generated by graphical command processing module 308 may be provided to communications circuitry 106 of first electronic device 100 as shared text string graphical object pixel array data 309s. Communications circuitry 106 may then provide the shared text string graphical object pixel array data 309s to communications circuitry 206 of second electronic device 200 via communications media 55, and communications circuitry 206 may provide the shared text string graphical object pixel array data 309s as received text string graphical object pixel array data 409r to graphical command processing module 408 of graphical display system 401. Therefore, graphical command processing module 308 may process a new text string graphical object input command 305 to generate at least a portion of new text string pixel array data 309 that not only may present new text string graphical object 540 at the appropriate position on canvas 501 of screen 500c of display 112, but that also may be received (i.e., as received text string pixel array data 409r) by graphical command processing module 408 of second electronic device 200 to present new text string graphical object 640 at the appropriate position on canvas 601 of screen 600c of display 212.

Figure 4D:
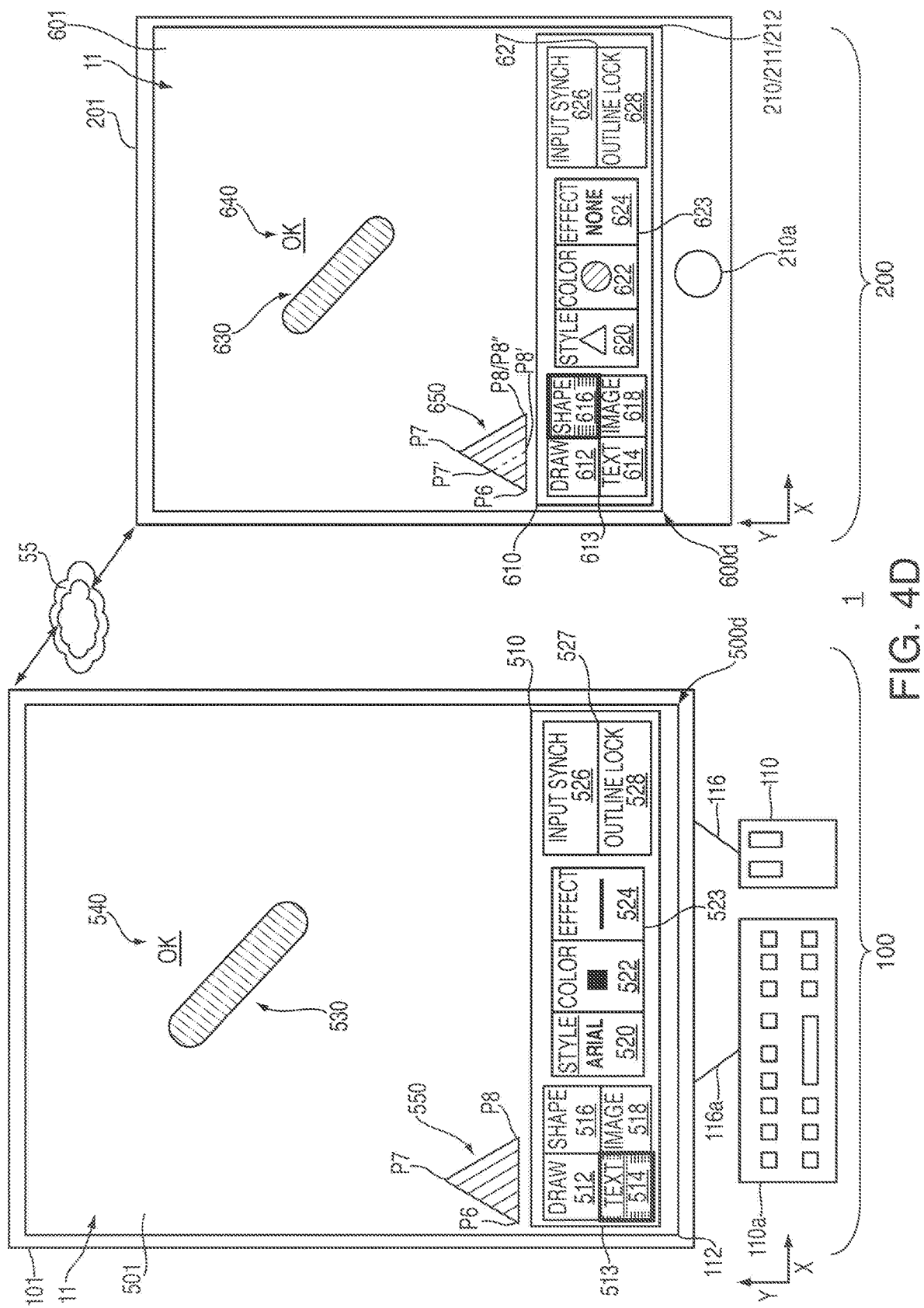

Rather than a user interacting with menu 510 of first device 100 to generate input information for defining new graphical object content of artwork 11 to be displayed on canvas 501 and/or 601, a user may similarly interact with menu 610 of second device 200 to generate input information for defining new graphical object content of artwork 11. As shown by screen 600d of FIG. 4D, for example, a user of second electronic device 200 may select shape input option 616 of submenu 613 of artist menu 610 for creating one or more shapes on canvas 601 (e.g., selection of option 616 may be shown by shading indicia within option 616 on FIG. 4D, although selection of any option may be made apparent in any other suitable way, including non-visual ways). When a user selects shape input option 616, various options (not shown) may be made available to the user with respect to one or more of submenu options 620, 622, and 624 of graphical object property selection submenu 623, such that a user may select one or more shape properties that may at least partially define a shape graphical object to be created in artwork 11 on canvas 601. For example, shape graphical object style input option 620 of property selection submenu 623 may allow the user to select a shape type from a group of various pre-defined shape types (e.g., a triangle style shape, as shown in FIG. 4D), shape graphical object color input option 622 of property selection submenu 623 may allow the user to select a color from a group of various pre-defined shape colors (e.g., a color represented by "\\V" markings, as shown in FIG. 4D), and shape graphical object effect input option 624 of property selection submenu 623 may allow the user to select one or more effects to be applied to the shape from a group of various pre-defined shape effects (e.g., no effects, as shown in FIG. 4D). It is to be understood that additional or alternative pre-defined shapes of various other pre-defined colors, effects, and other various pre-defined shape graphical object properties may also be provided by submenu 623 of menu 610 when shape input option 616 of submenu 613 is selected.

Any interactions made by the user with respect to the options provided by menu 610 may be received by graphical display system 401 of second electronic device 200 for generating and displaying new menu content in canvas area 601. For example, when a user selects options 616, 620, 622, and 624 of menu 610 for creating a triangle shape graphical object of a particular color and no effects, the selections may be received by graphical command generating module 404 of graphical display system 401 as new menu input information 403, and graphical command generating module 404 may generate one or more appropriate new menu input commands 405 representative of these menu selections. These menu input commands 405 may be processed by graphical command processing module 408 to generate at least a portion of pixel array data 409 with pixel data that may represent these menu selections, and that menu selection pixel data may be presented on display 212 in menu 610.

For example, as shown by screen 600d of FIG. 4D, in response to a user selecting shape input option 616 (e.g., with touch screen I/O component 211), graphical command generating module 404 may receive certain menu input information 403 and then generate a particular menu input command 405 (e.g., a menu input command with the representative syntax "COMMAND: CLASS=MENU INPUT; SELECT=MENU OPTION 616"), which may be processed by graphical command processing module 408 to generate at least a portion of pixel array data 409 with updated menu pixel data that may present shading indicia at the portion of screen 600d identifying input option 616 in menu 610 of display 212. Similarly, as shown by screen 600d of FIG. 4D, in response to a user selecting a triangle shape at style input option 620, graphical display system 401 may generate and present a "A" within the box identifying input option 620 in menu 610 of display 212. Moreover, as shown by screen 600d of FIG. 4D, in response to a user selecting a particular color with input option 622 and no effects with input option 624, graphical display system 401 may generate and present a representation of that color (e.g., "\\\") within the box identifying input option 622 in menu 610 of display 212 and a representation of no effect (e.g., "none") within the box identifying input option 624 in menu 610 of display 212.

Once options 616, 620, 622, and 6524 of menu 610 have been selected for creating a shape graphical object (e.g., a triangle shape of a particular color with no effects), and once the selections have been received by graphical display system 401 and represented on display 212 in menu 610, the user may then interact with device 200 for generating at least one triangle shape on canvas 601 according to the selected options. Based on any appropriate shape graphical object input information 403, which may be generated by a user (e.g., using input component 210 and/or input component 210a) and/or any application running on device 200 (e.g., application 203), graphical command generating module 404 may be configured to define and generate at least one new shape graphical object input command 405. This new shape graphical object input command 405 may then be processed by graphical command processing module 408 as new shape graphical object pixel array data 409 and presented on display 212.

For example, as also shown by screen 600d of FIG. 4D, a user may interact with graphical display system 401 to generate a new shape graphical object 650 in artwork 11 on canvas 601. As shown, shape graphical object 650 may include a triangle with a first corner at a point P6 on canvas 601, a second corner at point P7 on canvas 601, and a third corner at point P8 on canvas 601, with the selected shape properties of options 620, 622, and 624. For example, in response to a user defining a point P6 on canvas 601 for positioning a lower-left corner of a new triangle shape graphical object (e.g., by touching point P6 on canvas 601 with touch screen input component 210), and additional points P7 and P8 on canvas 601 for respectively positioning a top corner and a lower-right corner of the new triangle shape graphical object, graphical command generating module 404 may receive certain shape input information 403 and then generate a particular shape input command 405. For example, based on the selected properties of options 620, 622, and 624, and points P6-P8, graphical command generating module 404 may generate a new shape graphical object input command 405, which may have the following representative syntax: "COMMAND: CLASS=GRAPHICAL OBJECT INPUT; TYPE=SHAPE; STYLE=TRIANGLE; COLOR=\\\; EFFECT=NONE; CORNER1:P6; CORNER2:P7; CORNER3:P8". The new shape input command 405 generated by graphical command generating module 404 may then be processed by graphical command processing module 408 to generate at least a portion of new shape pixel array data 409 that may present new shape graphical object 650 at the appropriate position on canvas 601 of screen 600d of display 212. It is to be understood that the above representative syntax of new shape input command 405 for generating new shape graphical object 650 is merely representative, and that any suitable syntax may be used by application 203 of second electronic device 200 for generating a new shape input command 405 in response to received shape input information 403.

In some embodiments, rather than generating a single new shape input command 405 for a new shape graphical object to be generated on canvas 601, graphical command generating module 404 may generate multiple new shape input commands 405, each of which may adequately instruct graphical command processing module 408 to generate a particular portion or configuration of the new shape graphical object 650 on canvas 601. For example, as shown in FIG. 4D, when a user has only defined a point P6 on canvas 601 for positioning a lower-left corner of a new triangle shape graphical object, but has not yet defined point P7 or point P8, a default position for the top corner of the triangle may be defined by a default point P7' and a default position for the lower-right corner of the triangle may be defined by a default point P8' (e.g., based on a default size and/or a default orientation of the shape), such that graphical command generating module 404 may generate at least two shape graphical object input commands 405. The first of such two shape graphical object input commands 405 for defining shape graphical object 650 may be generated only after the user has defined point P6 and may have the following representative syntax: "COMMAND: CLASS=GRAPHICAL OBJECT INPUT; TYPE=SHAPE; STYLE=TRIANGLE; COLOR=\\\; EFFECT=NONE; CORNER1:P6; CORNER2:P7'; CORNER3:P8'", while the second of such two shape graphical object input commands 405 for defining shape graphical object 650 may be generated after the user has defined point P6 and then point P7 and may have the following representative syntax: "COMMAND: CLASS=GRAPHICAL OBJECT INPUT; TYPE=SHAPE; STYLE=TRIANGLE; COLOR=\\\; EFFECT=NONE; CORNER1:P6; CORNER2:P7; CORNER3:P8"" (e.g., where point P8" may be at a default position for the lower-right corner of the triangle when the user has defined both point P6 and point P7, but not yet point P8; although as shown in FIG. 4D, point P8" may be the same as point P8). Each one of these two shape input commands 405 generated by graphical command generating module 404 may be processed by graphical command processing module 408 to generate at least a portion of new shape pixel array data 409 that may present new shape graphical object 650 at the appropriate position on canvas 601 of screen 600d of display 212.

As mentioned, virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. Therefore, continuing with the example of FIG. 4D, based on the selected properties of options 620, 622, and 624, and points P6-P8 defined by shape graphical object input information 603 and received by second electronic device 200, graphical command generating module 404 may generate at least one new shape graphical object input command 405 that not only may be received and processed by graphical command processing module 408 of second electronic device 200 to generate at least a portion of new shape pixel array data 409 for presenting new shape graphical object 650 at the appropriate position on canvas 601 of screen 600d of display 212, but that also may be received and processed (i.e., as a received graphical object input command 305r) by graphical command processing module 308 of first electronic device 100 to generate at least a portion of new shape pixel array data 309 that may present a new shape graphical object 550 at the appropriate position on canvas 501 of screen 500d of display 112. By sharing at least one new shape graphical object input command 405 (e.g., as shared shape graphical object input command 405s and, eventually, as received shape graphical object input command 305r), both graphical command processing module 408 of second device 200 and graphical command processing module 308 of first device 100 may independently receive and process the same new shape graphical object input command for generating a new shape graphical object of artwork 11 on both canvas 501 of first device 100 and canvas 601 of second device 200.

Alternatively, at least some new shape graphical object pixel array data 409 generated by graphical command processing module 408 may be provided to communications circuitry 206 of second electronic device 200 as shared shape graphical object pixel array data 409s. Communications circuitry 206 may then provide the shared shape graphical object pixel array data 409s to communications circuitry 106 of first electronic device 100 via communications media 55, and communications circuitry 106 may provide the shared shape graphical object pixel array data 409s as received shape graphical object pixel array data 309r to graphical command processing module 308 of graphical display system 301. Therefore, graphical command processing module 408 may process a new shape graphical object input command 405 to generate at least a portion of new shape pixel array data 409 that not only may present new shape graphical object 650 at the appropriate position on canvas 601 of screen 600d of display 212, but that also may be received (i.e., as received shape pixel array data 309r) by graphical command processing module 308 of first electronic device 100 to present new shape graphical object 550 at the appropriate position on canvas 501 of screen 500d of display 112.

Figure 4E:
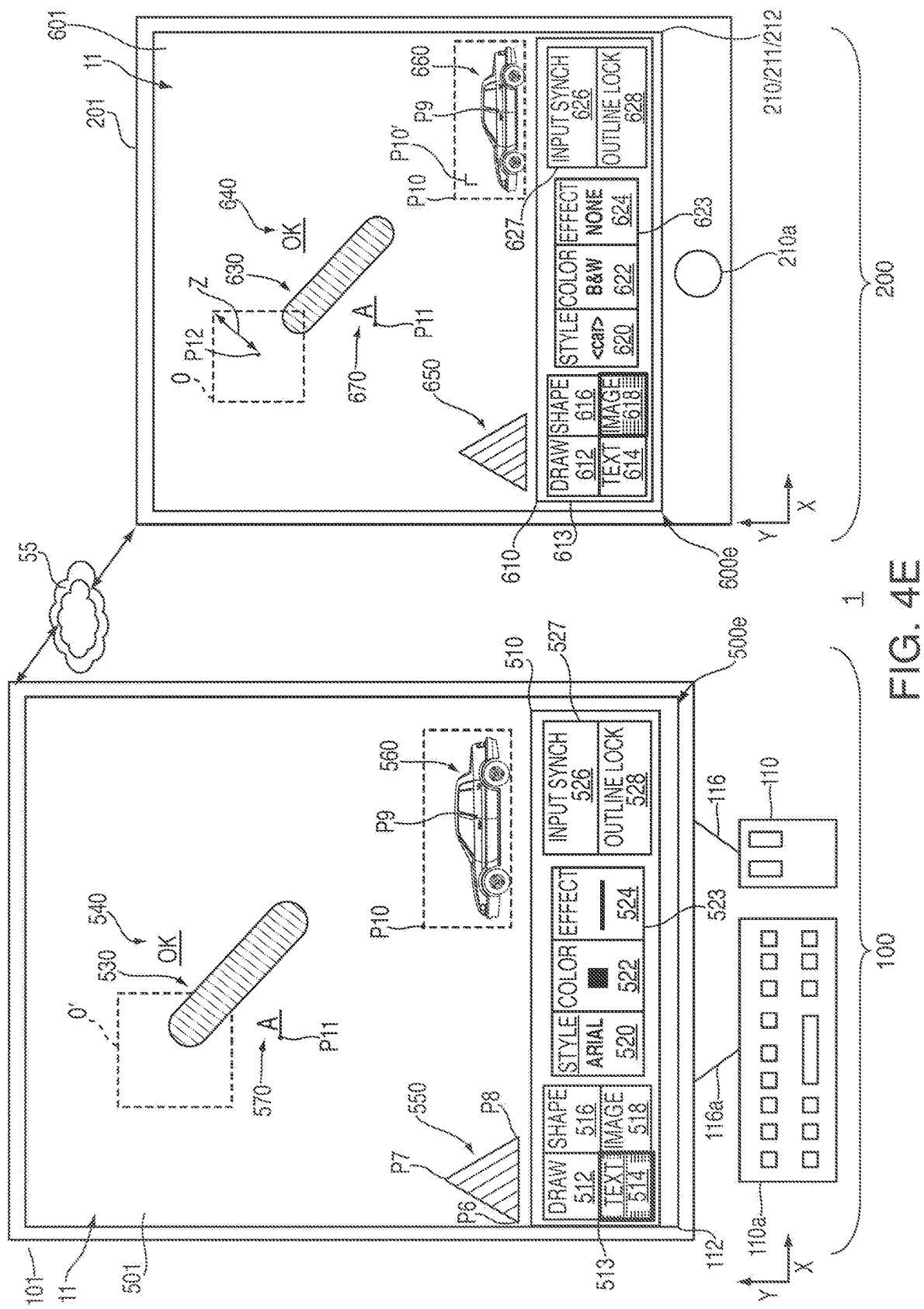

As shown by screen 600e of FIG. 4E, for example, a user of second electronic device 200 may select image input option 618 of submenu 613 of artist menu 610 for creating one or more images on canvas 601 (e.g., selection of option 618 may be shown by shading indicia within option 618 on FIG. 4E, although selection of any option may be made apparent in any other suitable way, including non-visual ways). When a user selects image input option 618, various options (not shown) may be made available to the user with respect to one or more of submenu options 620, 622, and 624 of graphical object property selection submenu 623, such that a user may select one or more image properties that may at least partially define an image graphical object to be created in artwork 11 on canvas 601. For example, image graphical object style input option 620 of property selection submenu 623 may allow the user to select a particular image file from a group of various image files that may be accessible to second device 200 (e.g., an image of a car, as shown in FIG. 4E), image graphical object color input option 622 of property selection submenu 623 may allow the user to select a color or color scheme from a group of various pre-defined image colors or color schemes (e.g., a black and white color scheme represented, as shown in FIG. 4E), and image graphical object effect input option 624 of property selection submenu 623 may allow the user to select one or more effects to be applied to the image from a group of various pre-defined image effects (e.g., no effects, as shown in FIG. 4E). It is to be understood that additional or alternative pre-defined images of various other pre-defined colors, effects, and other various pre-defined image graphical object properties may also be provided by submenu 623 of menu 610 when image input option 618 of submenu 613 is selected.

Any selections made by the user with respect to the options provided by menu 610 may be received by graphical display system 401 of second electronic device 200 for generating and displaying new menu content in menu 610. For example, when a user selects options 618, 620, 622, and 624 of menu 610 for creating an image graphical object of a car of a particular color and no effects, the selections may be received by graphical command generating module 404 of graphical display system 401 as new menu input information 403, and graphical command generating module 404 may generate one or more appropriate new menu input commands 405 representative of these menu selections. These menu input commands 405 may be processed by graphical command processing module 408 to generate at least a portion of pixel array data 409 with pixel data that may represent these menu selections, and that menu pixel array data may be presented on display 212 in menu 610.

For example, as shown by screen 600e of FIG. 4E, in response to a user selecting image input option 618 (e.g., with touch screen I/O component 211), graphical command generating module 404 may receive certain menu input information 403 and then generate a particular menu input command 405 (e.g., a menu input command with the representative syntax "COMMAND: CLASS=MENU INPUT; SELECT=MENU OPTION 618"), which may be processed by graphical command processing module 408 to generate at least a portion of pixel array data 409 with updated menu pixel data that may present shading indicia at the portion of screen 600e identifying input option 618 in menu 610 of display 212. Similarly, as shown by screen 600e of FIG. 4E, in response to a user selecting a car image at style input option 620, graphical display system 401 may generate and present "<car>" within the box identifying input option 620 in menu 610 of display 212. Moreover, as shown by screen 600e of FIG. 4E, in response to a user selecting a particular black and white color scheme with input option 622 and no effects with input option 624, graphical display system 401 may generate and present a representation of that color scheme (e.g., "B&W") within the box identifying input option 622 in menu 610 of display 212 and a representation of no effect (e.g., "none") within the box identifying input option 624 in menu 610 of display 212.

Once options 618, 620, 622, and 624 of menu 610 have been selected for creating an image graphical object (e.g., a black and white image of a car with no effects), and once the selections have been received by graphical display system 401 and represented on display 212 in menu 610, the user may then interact with device 200 for generating at least one car image on canvas 601 according to the selected options. Based on any appropriate image graphical object input information 403, which may be generated by a user (e.g., using input component 210 and/or input component 210a) and/or any application running on device 200 (e.g., application 203), graphical command generating module 404 may be configured to define and generate at least one new image graphical object input command 405. This new image graphical object input command 405 may then be processed by graphical command processing module 408 as new image graphical object pixel array data 409 and presented on display 212.

For example, as also shown by screen 600e of FIG. 4E, a user may interact with graphical display system 401 to generate a new image graphical object 660 in artwork 11 on canvas 601. As shown, image graphical object 660 may include a black and white image of a car centered about a point P9 on canvas 601 and with an upper-left corner at a point P10 on canvas 601, with the selected image properties of options 620, 622, and 624. For example, in response to a user defining point P9 on canvas 601 for positioning the center of a new image graphical object (e.g., by touching point P9 on canvas 601 with touch screen input component 210), and additional point P10 for positioning the upper-left corner of the new image graphical object, graphical command generating module 404 may receive certain image input information 403 and then generate a particular image input command 405. For example, based on the selected properties of options 620, 622, and 624, and points P9 and P10, graphical command generating module 404 may generate a new image graphical object input command 405, which may have the following representative syntax: "COMMAND: CLASS=GRAPHICAL OBJECT INPUT; TYPE=IMAGE; STYLE=<CAR.FILE>; COLOR=B&W; EFFECT=NONE; CENTER:P9; CORNER:P10". The new image input command 405 generated by graphical command generating module 404 may then be processed by graphical command processing module 408 to generate at least a portion of new image pixel array data 409 that may present new image graphical object 660 at the appropriate position on canvas 601 of screen 600*e* of display 212. It is to be understood that the above representative syntax of new image input command 405 for generating new image graphical object 660 is merely representative, and that any suitable syntax may be used by application 203 of second electronic device 200 for generating a new image input command 405 in response to received shape input information 403.

In some embodiments, rather than generating a single new image input command 405 for a new image graphical object to be generated on canvas 601, graphical command generating module 404 may generate multiple new image input commands 405, each of which may adequately instruct graphical command processing module 408 to generate a particular portion or configuration of new image graphical object 650 on canvas 601. For example, as shown in FIG. 4E, when a user has only defined a point P9 on canvas 601 for positioning the center of a new image graphical object, but has not yet defined point P10, a default position for the upper-right corner of the image may be defined by a default point P10' (e.g., based on a default size and/or a default orientation of the image), such that graphical command generating module 404 may generate two image graphical object input commands 405. The first of such two image graphical object input commands 405 for defining image graphical object 660 may be generated only after the user has defined point P9 and may have the following representative syntax: "COMMAND: CLASS=GRAPHICAL OBJECT INPUT; TYPE=IMAGE; STYLE=<CAR.FILE>; COLOR=B&W; EFFECT=NONE; CENTER:P9; CORNER:P10'", while the second of such two image graphical object input commands 405 for defining image graphical object 660 may be generated after the user has defined points P9 and P10 and may have the following representative syntax: "COMMAND: CLASS=GRAPHICAL OBJECT INPUT; TYPE=IMAGE; STYLE=<CAR.FILE>; COLOR=B&W; EFFECT=NONE; CENTER:P9; CORNER:P10". Each one of these two image input commands 405 generated by graphical command generating module 404 may be processed by graphical command processing module 408 to generate at least a portion of new image pixel array data 409 that may present new image graphical object 660 at the appropriate position on canvas 601 of screen 600*e* of display 212.

As mentioned, virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. Therefore, continuing with the example of FIG. 4E, based on the selected properties of options 620, 622, and 624, and points P9 and P10 defined by image graphical object input information 603 and received by second electronic device 200, graphical command generating module 404 may generate at least one new image graphical object input command 405 that not only may be received and processed by graphical command processing module 408 of second electronic device 200 to generate at least a portion of new image pixel array data 409 for presenting new image graphical object 660 at the appropriate position on canvas 601 of screen 600*e* of display 212, but that also may be received and processed (i.e., as a received graphical object input command 305*r*) by graphical command processing module 308 of first electronic device 100 to generate at least a portion of new image pixel array data 309 that may present a new image graphical object 560 at the appropriate position on canvas 501 of screen 500*e* of display 112. By sharing at least one new image graphical object input command 405 (e.g., as shared image graphical object input command 405*s* and, eventually, as received image graphical object input command 305*r*), both graphical command processing module 408 of second device 200 and graphical command processing module 308 of first device 100 may independently receive and process the same new image graphical object input command for generating a new image graphical object of artwork 11 on both canvas 501 of first device 100 and canvas 601 of second device 200.

Alternatively, at least some new image graphical object pixel array data 409 generated by graphical command processing module 408 may be provided to communications circuitry 206 of second electronic device 200 as shared image graphical object pixel array data 409*s*. Communications circuitry 206 may then provide the shared image graphical object pixel array data 409*s* to communications circuitry 106 of first electronic device 100 via communications media 55, and communications circuitry 106 may provide the shared image graphical object pixel array data 409*s* as received image graphical object pixel array data 309*r* to graphical command processing module 308 of graphical display system 301. Therefore, graphical command processing module 408 may process a new image graphical object input command 405 to generate at least a portion of new image pixel array data 409 that not only may present new image graphical object 660 at the appropriate position on canvas 601 of screen 600*e* of display 212, but that also may be received (i.e., as received image pixel array data 309*r*) by graphical command processing module 308 of first electronic device 100 to present new image graphical object 560 at the appropriate position on canvas 501 of screen 500*e* of display 112.

As mentioned, in some embodiments, based on the selected properties of options 620, 622, and 624, and points P9 and P10, graphical command generating module 404 may generate a new image graphical object input command 405, which may have the following representative syntax: "COMMAND: CLASS=GRAPHICAL OBJECT INPUT; TYPE=IMAGE; STYLE=<CAR.FILE>; COLOR=B&W; EFFECT=NONE; CENTER:P9; CORNER:P10". The style portion of such a new image graphical object input command 405 (i.e., the "STYLE=<CAR.FILE>" portion) may be a pointer, URL, or any other suitable address at which the appropriate image file may be accessed. The appropriate image file may be stored in any suitable location that may be accessible to first device 100 and/or second device 200 (e.g., memory 106, memory 206, and/or server 70), and the appropriate image file may be stored in any suitable format (e.g., JPEG, TIFF, PNG, GIF, etc.). When such a new image graphical object input command 405 is received by a graphical command processing module, the graphical command processing module may access the addressed image file and process the file as new image pixel array data. In other embodiments, the style portion of such a new image graphical object input command 405 (i.e., the "STYLE=<CAR.FILE>" portion) may be a copy of at least a portion of the appropriate image file. For example, in some embodiments, the style portion of a new image graphical object input command 405 may include at least a portion of an actual image file in any suitable format (e.g., a JPEG file, a TIFF file, a PNG file, a GIF file, etc.) that may be in any compressed or uncompressed state. When such a new image graphical object input command 405 is received by a graphical command processing module, the graphical command processing module may process the received image file as new image pixel array data.

As mentioned, inter-device submenu 527 of artist menu 510 may include an input synch option 526, and inter-device submenu 627 of artist menu 610 may include an input synch option 626, each of which a user may interact with to selectively synchronize the current active user interface selections of first electronic device 100 with the current active user interface selections of second electronic device 200. As shown in FIGS. 4A-4E, input synch options 526 and 626 are unselected. When input synch options 526 and 626 are unselected, system 1 may be configured such that the current active user interface selections of first electronic device 100 are not synchronized with the current active user interface selections of second electronic device 200. Such non-synchronization may allow for the current active graphical object type selection(s) of submenu 513 and/or the current active graphical object property selection(s) of submenu 523 of first device 100 to differ from the current active graphical object type selection(s) of submenu 613 and/or the current active graphical object property selection(s) of submenu 623 of second device 200. Such non-synchronization may also allow for first device 100 to be interacted with for generating a first type of graphical object while second device 200 may be simultaneously interacted with for generating a second type of graphical object.

For example, with continued reference to FIG. 4E, although a user of second device 200 may select image input option 618 of submenu 613 of artist menu 610 for creating image graphical object 660 on canvas 601 (e.g., selection of option 618 may be shown by shading indicia within option 618 on FIG. 4E), text string input option 514 of submenu 513 of artist menu 510 may still be selected (e.g., due to a user of first device 100 originally creating text string graphical object 540 in FIG. 4C). Therefore, in some embodiments, while one user may interact with second device 200 for creating new image graphical object 660 on canvas 601 and/or new image graphical object 560 on canvas 501, the same user or another user may simultaneously interact with first device 100 for creating another new graphical object on canvas 501 and/or on canvas 601.

For example, as also shown by screen 500e of FIG. 4E, while one user may interact with second device 200 for creating image graphical object 660 on canvas 601 and/or image graphical object 560 on canvas 501, the same or another user may simultaneously interact with first electronic device 100 for creating a new text string graphical object. The new text string graphical object to be created may be at least partially defined by the same selections for submenu options 520, 522, and 524 as made with respect to FIG. 4C or by new properties as selected by the user. Once options 514, 520, 522, and 524 of menu 510 have been selected for creating a new text string graphical object (e.g., with an Arial font of a particular color and an underlining effect), the user may then interact with device 100 for generating one or more glyphs of text on canvas 501 according to the selected options. Based on any appropriate text string graphical object input information 303, which may be generated by a user (e.g., using input component 110 and/or input component 110a) and/or any application running on device 100 (e.g., application 103), graphical command generating module 304 may be configured to define and generate at least one new text string graphical object input command 305. This new text string graphical object input command 305 may then be processed by graphical command processing module 308 as new text string graphical object pixel array data 309 and presented on display 112.

For example, as also shown by screen 500e of FIG. 4E, a user may interact with graphical display system 301 to generate a new text string graphical object 570 in artwork 11 on canvas 501. As shown, text string graphical object 570 may include the text "A" beginning at a starting point P11 on canvas 501 with the selected text string properties of options 520, 522, and 524. For example, in response to a user defining a starting point P11 of a new text string graphical object (e.g., by pointing a cursor at point P11 on canvas 501 with mouse input component 110) and defining the character "A" of the new text string graphical object (e.g., by selecting the appropriate key(s) on keyboard input component 110a), graphical command generating module 304 may receive certain text string input information 303 and then generate a particular text string input command 305. For example, based on the selected properties of options 520, 522, and 524, starting point P11, and character "A", graphical command generating module 304 may generate a new text string graphical object input command 305, which may have the following representative syntax: "COMMAND: CLASS=GRAPHICAL OBJECT INPUT; TYPE=TEXT STRING; STYLE=ARIAL; COLOR=BLACK; EFFECT=UNDERLINE; START:P11; CHARACTER(S):A". The new text string input command 305 generated by graphical command generating module 304 may then be processed by graphical command processing module 308 to generate at least a portion of new text string pixel array data 309 that may present new text string graphical object 570 at the appropriate position on canvas 501 of screen 500e of display 112.

As mentioned, virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. Therefore, continuing with the example of FIG. 4E, based on the selected properties of options 520, 522, and 524, point P11, and character "A" defined by text string graphical object input information 303 and received by first electronic device 100, graphical command generating module 304 may generate a new text string graphical object input command 305 that not only may be received and processed by graphical command processing module 308 of first electronic device 100 to generate at least a portion of new drawing stroke pixel array data 309 for presenting new text string graphical object 570 at the appropriate position on canvas 501 of screen 500e of display 112, but that also may be received and processed (i.e., as a received graphical object input command 405r) by graphical command processing module 408 of second electronic device 200 to generate at least a portion of new text string pixel array data 409 that may present a new text string graphical object 670 at the appropriate position on canvas 601 of screen 600e of display 212. By sharing the new text string graphical object input command 305 (e.g., as shared text string graphical object input command 305s and, eventually, as received text string graphical object input command 405r), both graphical command processing module 308 of first device 100 and graphical command processing module 408 of second device 200 may independently receive and process the same new text string graphical object input command for generating a new text string graphical object of artwork 11 on both canvas 501 of first device 100 and canvas 601 of second device 200.

Alternatively, as mentioned, at least some new text string graphical object pixel array data 309 generated by graphical command processing module 308 may be provided to communications circuitry 106 of first electronic device 100 as shared text string graphical object pixel array data 309s. Communications circuitry 106 may then provide the shared text string graphical object pixel array data 309s to communications circuitry 206 of second electronic device 200 via communications media 55, and communications circuitry 206 may provide the shared text string graphical object pixel array data 309s as received text string graphical object pixel array data 409r to graphical command processing module 408 of graphical display system 401. Therefore, graphical command processing module 308 may process a new text string graphical object input command 305 to generate at least a portion of new text string pixel array data 309 that not only may present new text string graphical object 570 at the appropriate position on canvas 501 of screen 500e of display 112, but that also may be received (i.e., as received text string pixel array data 409r) by graphical command processing module 408 of second electronic device 200 to present new text string graphical object 670 at the appropriate position on canvas 601 of screen 600e of display 212.

Due to input synch options 526 and 626 being unselected, system 1 may be configured such that first electronic device 100 may define, process, display, and/or share new text string graphical object input command 305 and/or new text string graphical object pixel array data 309 for new text string graphical object 570 with second electronic device 200 before, during, and/or at the same time as second electronic device 200 may define, process, display, and/or share new image graphical object input command 405 and/or new image graphical object pixel array data 409 for new image graphical object 660 with first electronic device 100. Alternatively, if input synch options 526 and 626 are selected (not shown), system 1 may be configured such that whenever a user interacts with either first device 100 to make a selection on artist menu 510 or second device 200 to make a selection on artist menu 610, the selection may be made to both artist menu 510 and artist menu 610.

In some embodiments, different portions of a collaborative work of art may be shown on different devices at a particular time. For example, although FIGS. 4A-4E may show the entirety of collaborative work of art 11 on both canvas 501 of first electronic device 100 and canvas 601 of second electronic device 200, a user may choose to view the entirety of collaborative artwork 11 on display 112 of first device 100 and only a portion of collaborative artwork 11 on display 212 of second device 200 (e.g., to view a portion of the artwork in greater detail by zooming-in to that portion using second device 200). However, before describing such additional features of system 1 with respect to screens 500a-500k and 600a-600k of FIGS. 4A-4K, a more detailed description of portions of graphical display system 301 and graphical display system 401 is provided.

Figures 3, 3A:
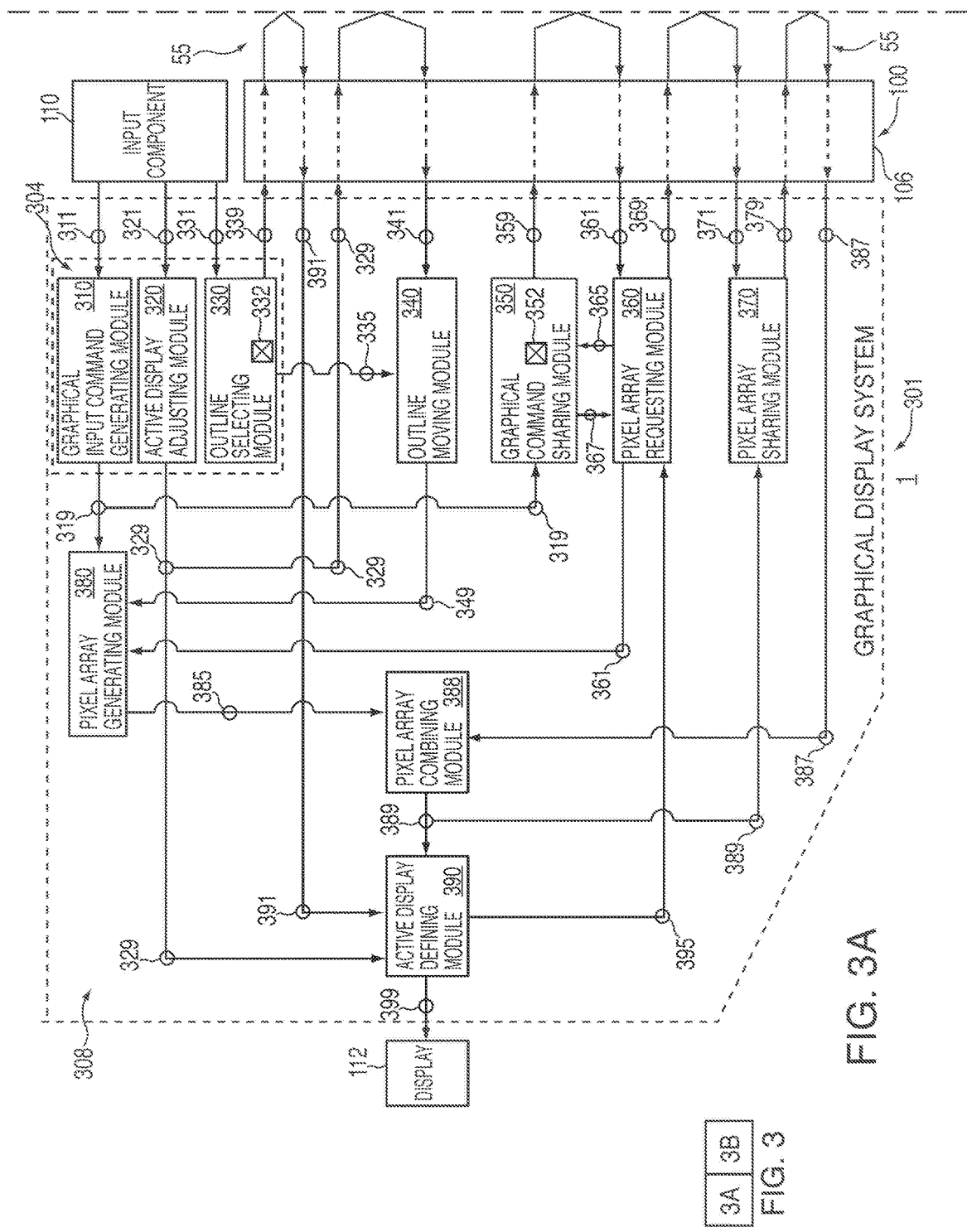

In some embodiments, as shown in FIG. 3A, for example, graphical command generating module 304 of graphical display system 301 may include a graphical input command generating module 310, an active display adjusting module 320, and an outline selecting module 330. Moreover, as shown in FIG. 3A, graphical command processing module 308 of graphical display system 301 may include an outline moving module 340, a graphical command sharing module 350, a pixel array requesting module 360, a pixel array sharing module 370, a pixel array generating module 380, a pixel array combining module 388, and an active display defining module 390.

As described in more detail with respect to FIGS. 4E-4K, graphical input command generating module 310 may be configured to receive graphical input information 311 and to generate one or more generated graphical input commands 319, which may then be provided to graphical command sharing module 350 and/or to pixel array generating module 380. Active display adjusting module 320 may be configured to receive active display adjustment input information 321 and to generate one or more active display adjustment input commands 329, which may then be provided to active display defining module 390 and/or to communications circuitry 106 of first device 100 for sharing with a remote entity. Outline selecting module 330 may be configured to receive outline selecting input information 331 and to generate one or more shared other device active display adjustment input commands 339, which may then be provided to communications circuitry 106 of first device 100 for sharing with a remote entity. Moreover, outline selecting module 330 may be configured to generate one or more generated outline moving commands 335, which may then be provided to outline moving module 340. Graphical input information 311, active display adjustment input information 321, and/or outline selecting input information 331 may be a portion of input information 303 and may be received from various input sources, such as the one or more applications being run by first electronic device 100 (e.g., application 103) and/or any user input instructions being received by device 100 (e.g., via any input component 110 of first electronic device 100). When provided to communications circuitry 106 of first device 100 for sharing with a remote entity, active display adjustment input commands 329 and/or shared other device active display adjustment input commands 339 may be a shared input command 305s.

Outline moving module 340 may be configured to receive one or more generated outline moving commands 335 from outline selecting module 330 and/or one or more received outline moving commands 341 from communications circuitry 106 of first device 100. Received outline moving commands 341 may be received by communications circuitry 106 from any suitable remote entity (e.g., second device 200) and a received outline moving command 341 may be a received input command 305r. Moreover, outline moving module 340 may be configured to generate one or more master outline moving commands 349, which may then be provided to pixel array generating module 380.

Graphical command sharing module 350 may be configured to receive one or more generated graphical input commands 319 from graphical input command generating module 310 and to generate one or more shared graphical input commands 359, which may then be provided to communications circuitry 106 of first device 100 for sharing with a remote entity. When provided to communications circuitry 106 of first device 100 for sharing with a remote entity, a graphical input command 359 may be a shared input command 305s.

Pixel array requesting module 360 may be configured to receive one or more received graphical input commands 361 from communications circuitry 106 of first device 100 and/or active display adjustment pixel array data request information 395 from active display defining module 390. Received graphical input commands 361 may be received by communications circuitry 106 from any suitable remote entity (e.g., second device 200) and a received graphical input command 361 may be a received input command 305r. Moreover, pixel array requesting module 360 may be configured to provide one or more received graphical input commands 361 to pixel array generating module 380. Additionally or alternatively, pixel array requesting module 360 may be configured to generate one or more shared pixel array data request commands 369, which may then be provided to communications circuitry 106 of first device 100 for sharing with a remote entity. When provided to communications circuitry 106 of first device 100 for sharing with a remote entity, a shared pixel array data request command 369 may be a shared input command 305s.

Pixel array sharing module 370 may be configured to receive one or more received pixel array data request commands 371 from communications circuitry 106 of first device 100. Received pixel array data request commands 371 may be received by communications circuitry 106 from any suitable remote entity (e.g., second device 200) and a received pixel array data request command 371 may be a received input command 305r. Moreover, pixel array sharing module 370 may be configured to receive combined pixel array data 389 from pixel array combining module 388. Pixel array sharing module 370 may also be configured to generate shared pixel array data 379, which may then be provided to communications circuitry 106 of first device 100 for sharing with a remote entity. When provided to communications circuitry 106 of first device 100 for sharing with a remote entity, shared pixel array data 379 may be shared pixel array data 309s.

Pixel array generating module 380 may be configured to receive one or more generated graphical input commands 319 from graphical input command generating module 310, one or more master outline moving commands 349 from outline moving module 340, and/or one or more received graphical input commands 361 from pixel array requesting module 360. Moreover, pixel array generating module 380 may be configured to generate generated pixel array data 385, which may then be provided to pixel array combining module 388.

Pixel array combining module 388 may be configured to receive generated pixel array data 385 from pixel array generating module 380 and/or received pixel array data 387 from communications circuitry 106 of first device 100. Received pixel array data 387 may be received by communications circuitry 106 from any suitable remote entity (e.g., second device 200) and pixel array data 387 may be received pixel array data 309r. Moreover, pixel array combining module 388 may be configured to generate combined pixel array data 389, which may then be provided to pixel array sharing module 370 and/or to active display defining module 390.

As also shown in FIG. 3A, active display defining module 390 may be configured to receive one or more active display adjustment input commands 329 from active display adjusting module 320, combined pixel array data 389 from pixel array combining module 380, and/or one or more received active display adjustment input commands 391 from communications circuitry 106 of first device 100. Received active display adjustment input commands 391 may be received by communications circuitry 106 from any suitable remote entity (e.g., second device 200) and a received active display adjustment input command 391 may be a received input command 305r. Active display defining module 390 may also be configured to generate active pixel array data 399, which may then be presented on display 112 of first device 100. Active pixel array data 399 may be pixel array data 309. Alternatively or additionally, active display defining module 390 may be configured to generate active display adjustment pixel array data request information 395, which may then be provided to pixel array requesting module 360.

In some embodiments, as shown in FIG. 3B, for example, graphical command generating module 404 of graphical display system 401 may include a graphical input command generating module 410, an active display adjusting module 420, and an outline selecting module 430. Moreover, as shown in FIG. 3B, graphical command processing module 408 of graphical display system 401 may include an outline moving module 440, a graphical command sharing module 450, a pixel array requesting module 460, a pixel array sharing module 470, a pixel array generating module 480, a pixel array combining module 488, and an active display defining module 490.

As described in more detail with respect to FIGS. 4E-4K, graphical input command generating module 410 may be configured to receive graphical input information 411 and to generate one or more generated graphical input commands 419, which may then be provided to graphical command sharing module 450 and/or to pixel array generating module 480. Active display adjusting module 420 may be configured to receive active display adjustment input information 421 and to generate one or more active display adjustment input commands 429, which may then be provided to active display defining module 490 and/or to communications circuitry 206 of second device 200 for sharing with a remote entity. Outline selecting module 430 may be configured to receive outline selecting input information 431 and to generate one or more shared other device active display adjustment input commands 439, which may then be provided to communications circuitry 206 of second device 200 for sharing with a remote entity. Moreover, outline selecting module 430 may be configured to generate one or more generated outline moving commands 435, which may then be provided to outline moving module 440. Graphical input information 411, active display adjustment input information 421, and/or outline selecting input information 431 may be a portion of input information 403 and may be received from various input sources, such as the one or more applications being run by second electronic device 200 (e.g., application 203) and/or any user input instructions being received by device 200 (e.g., via any input component 210 of second electronic device 200). When provided to communications circuitry 206 of second device 200 for sharing with a remote entity, active display adjustment input commands 429 and/or shared other device active display adjustment input commands 439 may be a shared input command 405s.

Outline moving module 440 may be configured to receive one or more generated outline moving commands 435 from outline selecting module 430 and/or one or more received outline moving commands 441 from communications circuitry 206 of second device 200. Received outline moving commands 441 may be received by communications circuitry 206 from any suitable remote entity (e.g., first device 100) and a received outline moving command 441 may be a received input command 405r. Moreover, outline moving module 440 may be configured to generate one or more master outline moving commands 449, which may then be provided to pixel array generating module 480.

Graphical command sharing module 450 may be configured to receive one or more generated graphical input commands 419 from graphical input command generating module 410 and to generate one or more shared graphical input commands 459, which may then be provided to communications circuitry 206 of second device 200 for sharing with a remote entity. When provided to communications circuitry 206 of second device 200 for sharing with a remote entity, a graphical input command 459 may be a shared input command 405s.

Pixel array requesting module 460 may be configured to receive one or more received graphical input commands 461 from communications circuitry 206 of second device 200 and/or active display adjustment pixel array data request information 495 from active display defining module 490. Received graphical input commands 461 may be received by communications circuitry 206 from any suitable remote entity (e.g., first device 100) and a received graphical input command 461 may be a received input command 405r. Moreover, pixel array requesting module 460 may be configured to provide one or more received graphical input commands 461 to pixel array generating module 480. Additionally or alternatively, pixel array requesting module 460 may be configured to generate one or more shared pixel array data request commands 469, which may then be provided to communications circuitry 206 of second device 200 for sharing with a remote entity. When provided to communications circuitry 206 of second device 200 for sharing with a remote entity, a shared pixel array data request command 469 may be a shared input command 405s.

Pixel array sharing module 470 may be configured to receive one or more received pixel array data request commands 471 from communications circuitry 206 of second device 200. Received pixel array data request commands 471 may be received by communications circuitry 206 from any suitable remote entity (e.g., first device 100) and a received pixel array data request command 471 may be a received input command 405r. Moreover, pixel array sharing module 470 may be configured to receive combined pixel array data 489 from pixel array combining module 488. Pixel array sharing module 470 may also be configured to generate shared pixel array data 479, which may then be provided to communications circuitry 206 of second device 200 for sharing with a remote entity. When provided to communications circuitry 206 of second device 200 for sharing with a remote entity, shared pixel array data 479 may be shared pixel array data 409s.

Pixel array generating module 480 may be configured to receive one or more generated graphical input commands 419 from graphical input command generating module 410, one or more master outline moving commands 449 from outline moving module 440, and/or one or more received graphical input commands 461 from pixel array requesting module 460. Moreover, pixel array generating module 480 may be configured to generate generated pixel array data 485, which may then be provided to pixel array combining module 488.

Pixel array combining module 488 may be configured to receive generated pixel array data 485 from pixel array generating module 480 and/or received pixel array data 487 from communications circuitry 206 of second device 200. Received pixel array data 487 may be received by communications circuitry 206 from any suitable remote entity (e.g., first device 100) and pixel array data 487 may be received pixel array data 409r. Moreover, pixel array combining module 488 may be configured to generate combined pixel array data 489, which may then be provided to pixel array sharing module 470 and/or to active display defining module 490.

As also shown in FIG. 3B, active display defining module 490 may be configured to receive one or more active display adjustment input commands 429 from active display adjusting module 420, combined pixel array data 489 from pixel array combining module 480, and/or one or more received active display adjustment input commands 491 from communications circuitry 206 of second device 200. Received active display adjustment input commands 491 may be received by communications circuitry 206 from any suitable remote entity (e.g., first device 100) and a received active display adjustment input command 491 may be a received input command 405r. Active display defining module 490 may also be configured to generate active pixel array data 499, which may then be presented on display 212 of second device 200. Active pixel array data 499 may be pixel array data 409. Alternatively or additionally, active display defining module 490 may be configured to generate active display adjustment pixel array data request information 495, which may then be provided to pixel array requesting module 460.

Each one of graphical input command generating module 410, active display adjusting module 420, outline selecting module 430, outline moving module 440, graphical command sharing module 450, pixel array requesting module 460, pixel array sharing module 470, pixel array generating module 480, pixel array combining module 488, and active display defining module 490 of graphical display system 401 of second electronic device 200, and any of the information, commands, and pixel array data generated or received by any of those modules of system 401, may be the same as or substantially similar to a respective one of graphical input command generating module 310, active display adjusting module 320, outline selecting module 330, outline moving module 340, graphical command sharing module 350, pixel array requesting module 360, pixel array sharing module 370, pixel array generating module 380, pixel array combining module 388, and active display defining module 390 of graphical display system 301 of first electronic device 100, and any of the information, commands, and pixel array data generated or received by any of those modules of system 301, and, therefore, may not be independently described in greater detail.

While, in some embodiments, graphical display system 301 of first electronic device 100 and graphical display system 401 of second electronic device 200 may be the same or substantially similar graphical display systems, in other embodiments, graphical display system 301 of first electronic device 100 may have one or more different and/or additional modules that graphical display system 401 of second electronic device 200 may not have, and vice versa. While, in some embodiments, graphical display system 301 of first electronic device 100 and graphical display system 401 of second electronic device 200 may be the same or substantially similar graphical display systems, in other embodiments, graphical display system 301 of first electronic device 100 may be configured to process or otherwise handle one or more different and/or additional types of input commands and/or types of pixel array data that graphical display system 401 of second electronic device 200 may not be configured to process or otherwise handle, and vice versa.

As also shown in FIGS. 3A and 3B, a shared other device active display adjustment input command 339 generated by graphical display system 301 may be received by graphical display system 401 as a received own active display adjustment input command 491, while a shared other device active display adjustment input command 439 generated by graphical display system 401 may be received by graphical display system 301 as a received own active display adjustment input command 391. An active display adjustment input command 329 generated by graphical display system 301 may be received by graphical display system 401 as a received outline moving command 441, while an active display adjustment input command 429 generated by graphical display system 401 may be received by graphical display system 301 as a received outline moving command 341. A shared graphical input command 359 generated by graphical display system 301 may be received by graphical display system 401 as a received graphical input command 461, while a shared graphical input command 459 generated by graphical display system 401 may be received by graphical display system 301 as a received graphical input command 361. Moreover, a shared pixel array data request command 369 generated by graphical display system 301 may be received by graphical display system 401 as a received pixel array data request command 471, while a shared pixel array data request command 469 generated by graphical display system 401 may be received by graphical display system 301 as a received pixel array data request command 371. Finally, as shown in FIGS. 3A and 3B, shared pixel array data 379 generated by graphical display system 301 may be received by graphical display system 401 as received pixel array data 487, while shared pixel array data 479 generated by graphical display system 401 may be received by graphical display system 301 as received pixel array data 387.

Figure 4F:
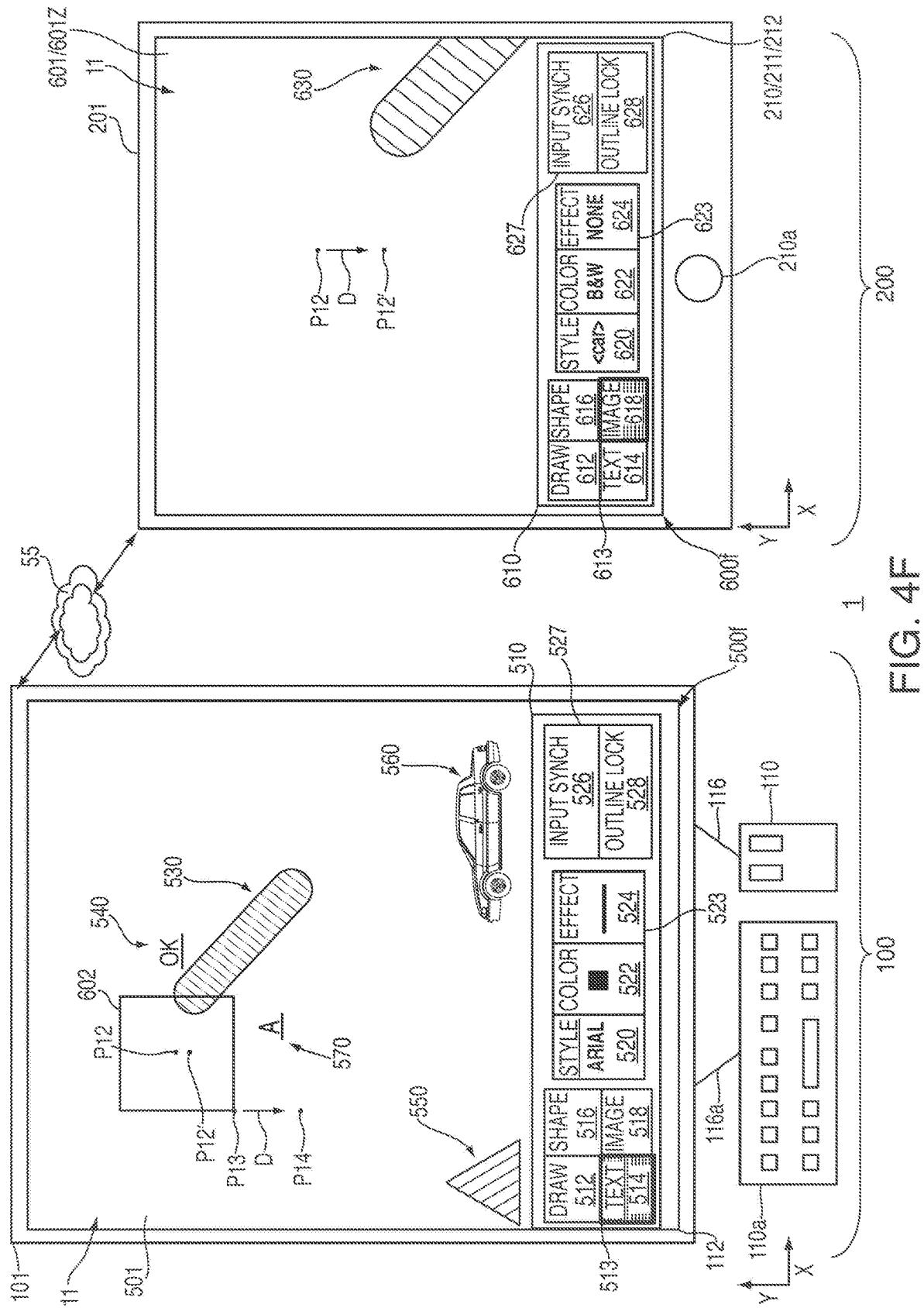

As mentioned, although FIGS. 4A-4E show the entirety of collaborative artwork 11 on both canvas 501 of first electronic device 100 and canvas 601 of second electronic device 200, a user may choose to view the entirety of collaborative artwork 11 on display 112 of first device 100 and only a portion of collaborative artwork 11 on display 212 of second device 200 (e.g., to view a portion of the work in greater detail by zooming-in to that portion using second device 200). For example, as shown in FIGS. 4E and 4F, a user may interact with second device 200 to generate input information for changing the portion of canvas 601 that may be displayed on display 212. As shown by screen 600e of FIG. 4E, for example, a user of second electronic device 200 may select a point P12 on canvas 601 that the user would like to zoom-in on. A user may interact with second electronic device 200 in any suitable way (e.g., using input component 210 and/or input component 210a) to identify point P12 or to instruct device 200 to zoom-in on a particular portion of canvas 601 in any suitable way. For example, a user may use a multi-touch pull user input gesture to zoom-in on canvas 601 about point P12 with a particular zoom factor Z. Additionally or alternatively, a user may trace an outline on canvas 601 to define the portion of canvas 601 that the user would like to be displayed across the entirety of the canvas portion of screen 212 (e.g., by tracing outline O as shown in FIG. 4E). Although not shown, artist menu 610 may provide a user of second electronic device 200 with input options for appropriately interacting with device 200 to properly identify the portion of canvas 601 to be actively displayed on display 212.

Any selections or interactions made by the user of second device 200 with respect to identifying the portion of canvas 601 to be actively displayed on display 212 may be received by graphical display system 401 of second electronic device 200 for updating the visible portion of canvas 601 on display 212. For example, when a user identifies zoom point P12 and an appropriate zoom factor Z on canvas 601 of screen 600e of FIG. 4E, such user interactions may be received by active display adjusting module 420 of graphical command generating module 404 of graphical display system 401 as active display adjustment input information 421, and active display adjusting module 420 may generate one or more active display adjustment input commands 429 representative of these user interactions. These active display adjustment input commands 429 may be processed by active display defining module 490 of graphical command processing module 408 to adjust the portion of pixel array data of canvas 601 (e.g., combined pixel array data 489) that may be actively displayed (e.g., as active pixel array data 499) on display 212.

For example, as shown by screen 600f of FIG. 4F, in response to a user interacting with second device 200 to identify the portion of canvas 601 to be actively displayed on display 212 (e.g., zoom point P12 and zoom factor Z with touch screen I/O component 211), active display adjusting module 420 may receive certain active display adjustment input information 421 and may then generate a particular active display adjustment input command 429 (e.g., an active display adjustment input command with the representative syntax "COMMAND: CLASS=ACTIVE DISPLAY ADJUSTMENT INPUT; ADJUST=ZOOM; POINT=P12; FACTOR=Z"). Such an active display adjustment input command 429 may then be processed by active display defining module 490 to adjust the portion of combined pixel array data 489 of canvas 601 that may be actively displayed as active pixel array data 499 on display 212, as shown by screen 600f of FIG. 4F. For example, as shown in FIG. 4F, a zoomed-in canvas portion 601z of canvas 601 (e.g., about point P12) may be actively displayed by screen 600f of display 212.

As mentioned, virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. Therefore, continuing with the example of FIG. 4F, based on the active display adjustment input information 421 received by active display adjusting module 420 of second electronic device 200, active display adjusting module 420 may generate an active display adjustment input command 429 that not only may be received and processed by active display defining module 490 to adjust the portion of combined pixel array data 489 of canvas 601 that may be actively displayed as active pixel array data 499 on display 212 as canvas portion 601z of screen 600f of display 212, but that also may be received and processed (i.e., as received outline moving command 341) by graphical display system 301 of first electronic device 100 to generate at least a portion of new pixel array data that may present a second device outline 602 at the appropriate position on canvas 501 of screen 500f of display 112. Second device outline 602 may be configured to identify on canvas 501 of screen 500f the portion of collaborative artwork 11 on canvas 501 that is currently actively displayed by canvas portion 601z on screen 600f of display 212 (i.e., the zoomed-in portion about point P12 of synched canvases 501 and 601).

For example, active display adjustment input command 429 may be received as received outline moving command 341 by outline moving module 340 of graphical command processing module 308 of first electronic device 100. Outline moving module 340 may be configured to process received outline moving command 341 and generate a master outline moving command 349, which may then be provided to pixel array generating module 380. In some embodiments, master outline moving command 349 may be the same as received outline moving command 341 (e.g., when outline moving module 340 has not also received a generated outline moving command 335 that has priority over received outline moving command 341). When received outline moving command 341 is passed on to pixel array generating module 380 (e.g., as a master outline moving command 349), pixel array generating module 380 may process that command in order to generate appropriate generated pixel array data 385 for defining second device outline 602 at the appropriate position on canvas 501. Such generated pixel array data 385 may be received by pixel array combining module 388, which may combine generated pixel array data 385 with any received pixel array data 387 in order to generate combined pixel array data 389. Such combined pixel array data 389, which may include the generated pixel array data 385 for defining second device outline 602 at the appropriate position on canvas 501, may then be processed by active display defining module 390 for generating active pixel array data 399 for presentation on display 112.

In some embodiments, system 1 may be configured such that when the displayed portion of a synched canvas on one device is adjusted to be different than the displayed portion of the synched canvas on another device, an outline of the adjusted displayed portion may be automatically provided on the non-adjusted canvas (e.g., outline 602 on canvas 501). However in other embodiments, no such outline may be provided. System 1 may be configured such that a user may selectively determine whether or not such an outline is to be presented.

Due to input synch options 526 and 626 being unselected, system 1 may be configured such that first electronic device 100 may not adjust the actively displayed portion of canvas 501 on screen 500f when electronic device 200 adjusts the actively displayed portion of canvas 601 on screen 600f. Alternatively, if input synch options 526 and 626 are selected (not shown), system 1 may be configured such that whenever a user interacts with either first device 100 to adjust the portion of canvas 501 displayed on display 112 or second device 200 to adjust the portion of canvas 601 displayed on display 212, the adjustment may be made to both canvas 501 and canvas 601.

As mentioned, inter-device submenu 527 of artist menu 510 may include an outline lock option 528, and inter-device submenu 627 of artist menu 610 may include an outline lock option 628, each of which a user may interact with to selectively fix an outline of the device's canvas on another device's canvas (e.g., to fix second device outline 602 on canvas 501 of first device 100). As shown in FIGS. 4F-4K, outline lock options 528 and 628 are unselected. When outline lock options 528 and 628 are unselected, system 1 may be configured such that the actively displayed portion of canvas 601 represented by second device outline 602 on canvas 501 is not prevented from being adjusted by interaction with first device 100. That is, when outline lock options 528 and 628 are unselected, system 1 may be configured such that a user may interact with outline 602 displayed on canvas 501 of first device 100 to adjust the actively displayed portion of canvas 601 displayed on display 212 of second device 200.

For example, with continued reference to FIG. 4F, although a user of second device 200 may have interacted with second device 200 to identify the portion of canvas 601 to be actively displayed on display 212 (e.g., zoomed-in canvas portion 601z), a user may then interact with outline 602 on canvas 501 of first device 100 in order to alter the portion of canvas 601 to be actively displayed on display 212. As shown by screen 500f of FIG. 4F, for example, a user of first electronic device 100 may select a point P13 on canvas 501 that may include a displayed portion of outline 602 that the user would like to move to another point on canvas 501 (e.g., to point P14, in the direction of arrow D). A user may interact with first electronic device 100 in any suitable way (e.g., using input component 110 and/or input component 110a) to identify point P13 of outline 602 and to instruct device 100 to move that point of outline 602 from point P13 on canvas 501 to point P14 on canvas 501 in any suitable way. For example, a user may click on that portion of outline 602 and drag it down in the direction of arrow D to point P14 (e.g., using mouse input component 110). Although not shown, artist menu 510 may provide a user of first electronic device 100 with input options for appropriately interacting with device 100 to easily adjust the portion of canvas 501 covered by outline 602 on display 112.

Any selections or interactions made by the user of first device 100 for identifying how to adjust outline 602 with respect to canvas 501 may be received by graphical display system 301 of first electronic device 100 for updating outline 602 on canvas 501. For example, when a user identifies initial outline point P13 and adjusted outline point P14 on canvas 501 of screen 500f of FIG. 4F, such user interactions may be received by outline selecting module 330 of graphical command generating module 304 of graphical display system 301 as outline selecting input information 331, and outline selecting module 330 may generate one or more generated outline moving commands 335 representative of these user interactions (e.g., one or more generated outline moving input commands with the representative syntax "COMMAND: CLASS=OUTLINE MOVEMENT INPUT; ADJUST=MOVE; FROMPOINT=P13; TOPOINT=P14"). These generated outline moving commands 335 may be processed by outline moving module 340 of graphical command processing module 308, which may pass generated outline moving commands 335 on to pixel array generating module 380 as master outline moving commands 349 (e.g., if outline moving module 340 does not receive any received outline moving commands 341 of higher priority). Pixel array generating module 380 may then generate appropriate pixel array data for an updated outline 602 to be displayed on display 112. For example, as shown by screen 500g of FIG. 4G, in response to a user interacting with first device 100 to identify how to adjust outline 602 with respect to canvas 501 on display 112, such that appropriate outline selecting input information 331 may be provided to outline selecting module 330 for generating the appropriate generated outline moving command 335, and such that the appropriate master outline moving commands 349 may then be provided to pixel array generating module 380 for generating appropriate pixel array data for an updated outline 602 to be displayed on display 112, outline 602 may be moved to a new position on canvas 501.

Figure 4G:
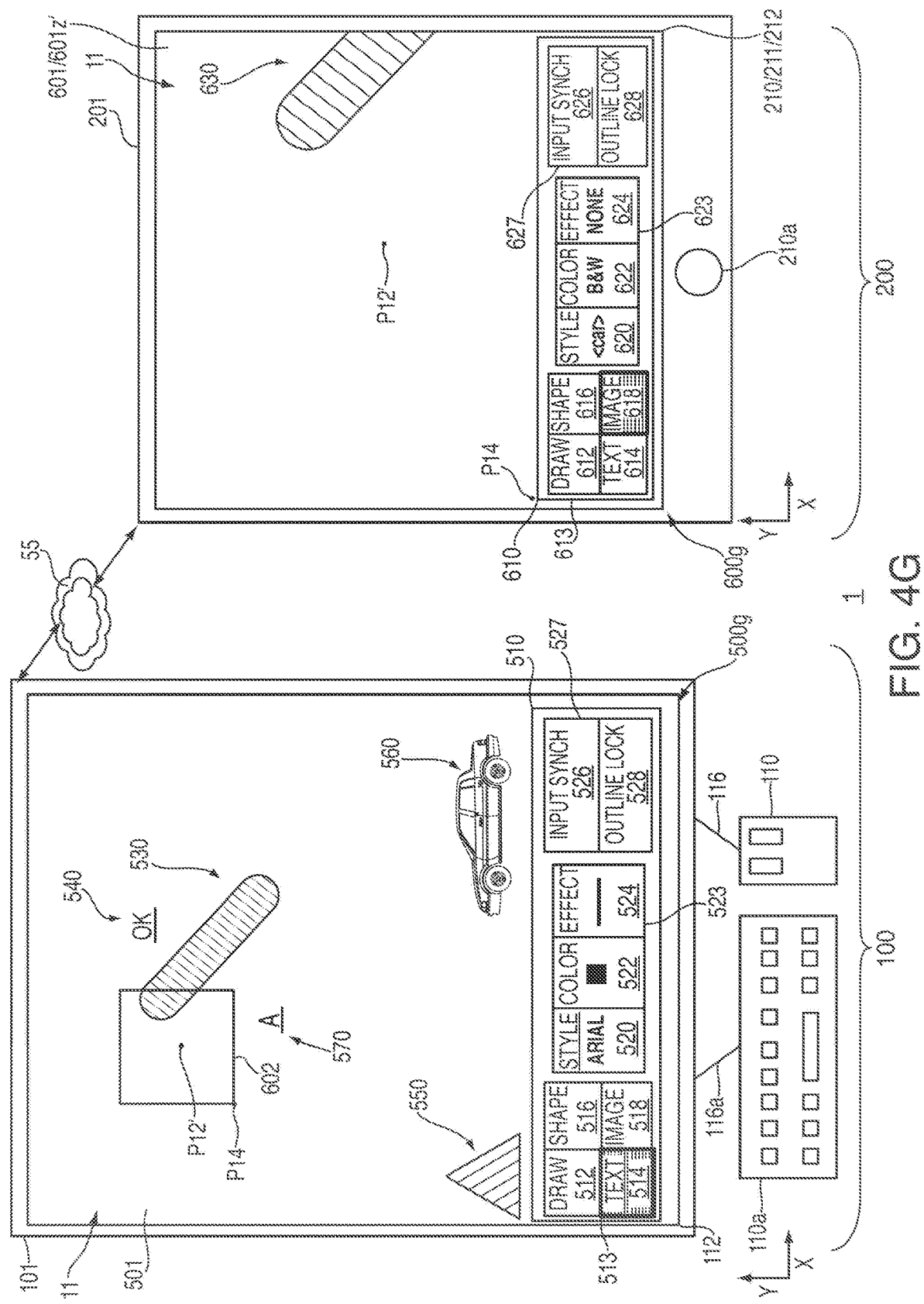

As mentioned, virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. Therefore, continuing with the example of FIG. 4G, based on the outline selecting input information 331 received by outline selecting module 330 of first electronic device 100, outline selecting module 330 may also generate one or more shared other device active display adjustment input commands 339 that may be received and processed (i.e., as received own active display adjustment input command 491) by graphical display system 401 of second electronic device 200 to adjust the portion of canvas 601 that may be actively displayed on screen 600g of display 212. For example, a shared other device active display adjustment input command 339 may be received as received own active display adjustment input command 491 by active display defining module 490 of graphical command processing module 408 of second electronic device 200. Active display defining module 490 may be configured to process received own active display adjustment input command 491 to adjust the portion of combined pixel array data 489 of canvas 601 that may be actively displayed as active pixel array data 499 on display 212, as shown by screen $600_g$ of FIG. 4G. For example, as shown in FIG. 4G, an adjusted zoomed-in canvas portion 601z' of canvas 601 (e.g., with new point P14) may be actively displayed by screen 600g of display 212. In some embodiments, a shared other device active display adjustment input command 339 may be similar to an associated generated outline moving input command 335 that has also been generated by outline selecting module 330 for particular input information 331 (e.g., a shared other device active display adjustment input command 339 may have the representative syntax "COMMAND: CLASS=OTHER DEVICE ACTIVE DISPLAY ADJUSTMENT INPUT; ADJUST=MOVE; FROMPOINT=P13; TOPOINT=P14").

If however, at screen 500f of FIG. 4F, outline lock option 528 and/or outline lock option 628 is selected, system 1 may be configured such that any user interaction with device 100 to adjust outline 602 would be disregarded and would not be processed by outline selecting module 330. For example, if outline lock option 528 and/or outline lock option 628 is selected (e.g., by a user interaction with menu 510 and/or menu 610), that selection may generate specific input information 331 that may set an outline lock register 332 in outline selecting module 330 that may then prevent outline selecting module 330 from generating any command 335 and/or command 339 until that register is unset (e.g., until outline lock option 528 and/or outline lock option 628 is unselected).

Alternatively, rather than moving outline 602 in response to a user interacting with outline 602 on first device 100, a user may interact with canvas 601 on second device 200 to similarly move outline 602. For example, as shown in screen 400f of FIG. 4F, a user of second device 200 may interact with canvas 601 to pan canvas 601 such that the center of the actively displayed portion of canvas 601 on second device 200 may be changed from point P12 to a new center point P12' (e.g., a user of device 200 may interact with touch screen 211 to drag original center point P12 in the direction of arrow D to new center point P12'). Any selections or interactions made by the user of second device 200 with respect to identifying the portion of canvas 601 to be actively displayed on display 212 may be received by graphical display system 401 of second electronic device 200 for updating the visible portion of canvas 601 on display 212.

For example, when a user identifies original center point P12 and a new center point P12' on canvas 601 of screen 600f of FIG. 4F, such user interactions may be received by active display adjusting module 420 of graphical command generating module 404 of graphical display system 401 as active display adjustment input information 421, and active display adjusting module 420 may then generate one or more active display adjustment input commands 429 responsive to that active display adjustment input information 421. For example, as shown by screen 600g of FIG. 4G, in response to a user interacting with second device 200 to identify the new portion of canvas 601 to be actively displayed on display 212 (e.g., original center point P12 and a new center point P12' in the direction of arrow D with touch screen I/O component 211), active display adjusting module 420 may receive certain active display adjustment input information 421 and may then generate a particular active display adjustment input command 429 (e.g., an active display adjustment input command with the representative syntax "COMMAND: CLASS=ACTIVE DISPLAY ADJUSTMENT INPUT; ADJUST=PAN; STARTPOINT=P12; ENDPOINT=P12"). Such an active display adjustment input command 429 may then be processed by active display defining module 490 to adjust the portion of combined pixel array data 489 of canvas 601 that may be actively displayed as active pixel array data 499 on display 212, as shown by screen 600g of FIG. 4G. For example, as shown in FIG. 4G, a panned canvas portion 601z' of canvas 601 (e.g., about new center point P12') may be actively displayed by screen 600g of display 212.

Moreover, rather than a user interacting with second device 200 to define a portion of canvas 601 to be actively displayed (e.g., by defining an outline O or a center point P12 and a zoom factor Z as described with respect to FIG. 4E), a user may instead interact with first device 100 to initially define a portion of canvas 601 to be actively displayed by second device 200. A user may interact with first electronic device 100 in any suitable way (e.g., using input component 110 and/or input component 110a) to identify a portion of artwork 11 on canvas 501 to be made the actively displayed portion of canvas 601 on second device 200 and, thus, the portion of canvas 501 indicated by outline 602. For example, as shown in FIG. 4E, a user of first device 100 may interact with first device 100 to define an outline O' on screen 500e of FIG. 4E and to instruct device 100 share a command with device 200 to make the portion of artwork 11 within outline O' on canvas 601 the portion of canvas 601 actively displayed by device 200. Such a shared command may be similar to shared other device active display adjustment input command 339. For example, a user may define outline O' using mouse input component 110. Although not shown, artist menu 510 may provide a user of first electronic device 100 with input options for appropriately interacting with device 100 to easily define the portion of artwork 11 to be actively displayed by device 200.

Continuing with the example of FIG. 4G, based on the panning active display adjustment input information 421 received by active display adjusting module 420 of second electronic device 200, active display adjusting module 420 may generate an active display adjustment input command 429 that not only may be received and processed by active display defining module 490 to adjust the portion of combined pixel array data 489 of canvas 601 that may be actively displayed as active pixel array data 499 on display 212 as panned canvas portion 601z' of screen 600g of display 212, but that also may be received and processed (i.e., as received outline moving command 341) by graphical display system 301 of first electronic device 100 to generate at least a portion of new pixel array data that may present an adjusted second device outline 602 at the appropriate adjusted position on canvas 501 of screen 500g of display 112. Second device outline 602 may be configured to identify on canvas 501 of screen 500g the portion of collaborative artwork 11 on canvas 501 that is currently actively displayed by canvas portion 601z' on screen 600g of display 212 (i.e., the panned portion about point P12' of synched canvases 501 and 601).

In some embodiments, rather than sharing artwork 11 with application 203 of second device 200 before creating any graphical content in artwork 11, a user may first interact with first device 100 to generate one or more graphical objects in artwork 11. Then, once certain content has been created in artwork 11 on canvas 501, a user of first device may share artwork 11 with application 203 of second device 200 such that both devices may proceed with collaborating on artwork 11. In some embodiments, a user of first device 100 may select only a portion of artwork 11 to be initially displayed by application 203 on display 212. For example, as mentioned, a user may interact with first device 100 to define outline 602 for indicating which portion of artwork 11 and canvas 601 is to be actively displayed by application 203 on display 212. When artwork 11 is initially being shared with application 203, a user of first device 100 may define outline 602 such that only the portion of artwork 11 within outline 602 may be initially shared with application 203 of second device 200. This may reduce the amount of information that may have to be communicated to second device 200 for defining the portion of artwork 11 to be initially displayed by device 200. For example, when artwork 11 is initially shared with second device 200 only after a user has interacted with first device 100 to define outline 602, application 103 may be configured to only share the portion of artwork 11 defined by the portion of canvas 501 within outline 602. This portion of artwork 11 may be shared with application 203 as shared pixel array data 309s containing the graphical content of that portion and/or as one or more shared input commands 305s defining the graphical content of that portion.

Figure 4H:
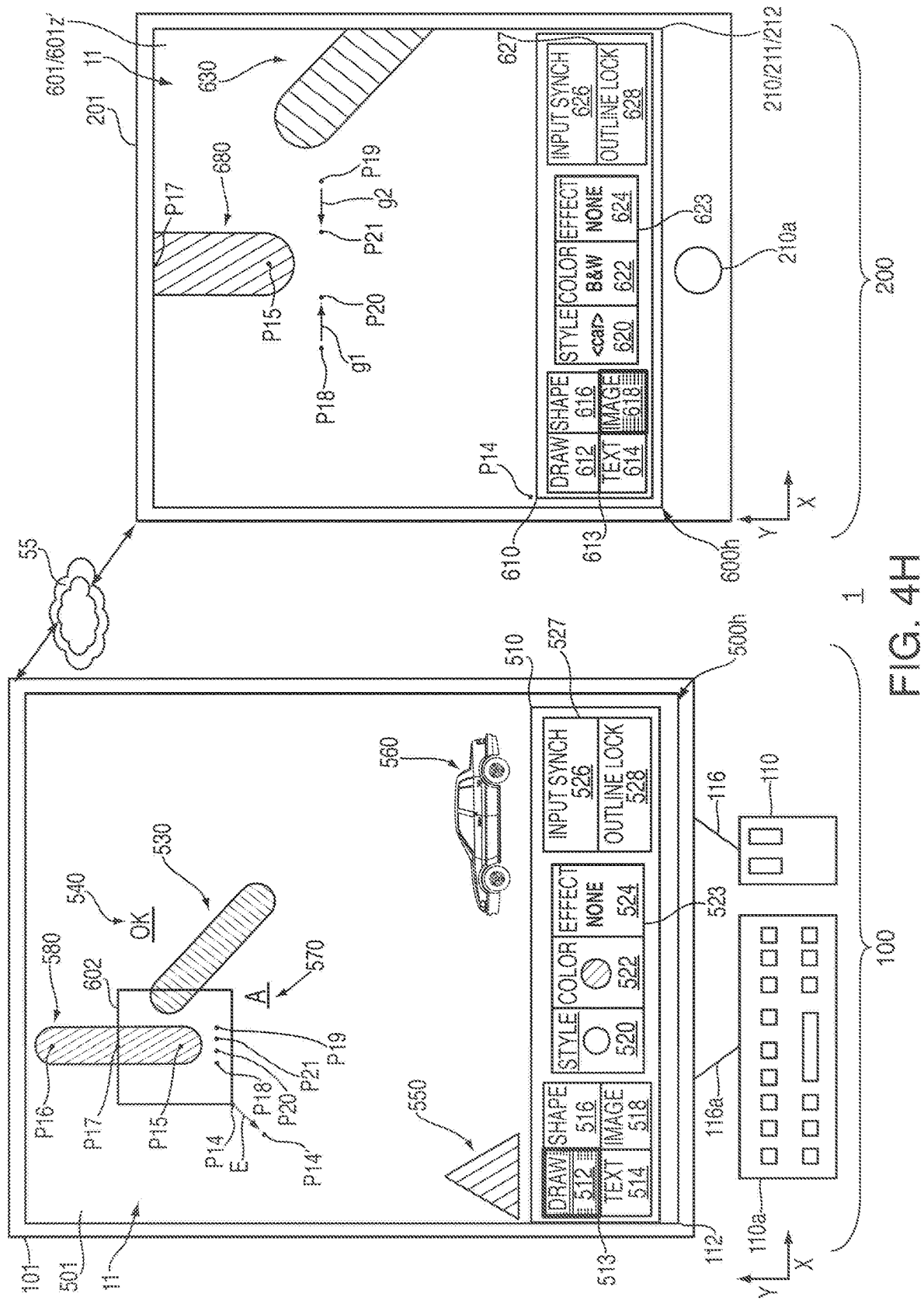

As shown by screen 500h of FIG. 4H, for example, a user of first electronic device 100 may select drawing stroke input option 512 of submenu 513 of artist menu 510 for creating a new free-form drawing stroke on canvas 501 (e.g., selection of option 512 may be shown by shading indicia within option 512 on FIG. 4H, although selection of any option may be made apparent in any other suitable way, including non-visual ways). As described above with respect to FIG. 4B, when a user selects drawing stroke input option 512, various options (not shown) may be made available to the user with respect to one or more of submenu options 520, 522, and 524 of graphical object property selection submenu 523, such that a user may select one or more drawing stroke properties that may at least partially define a drawing stroke graphical object to be created on canvas 501. For example, drawing stroke graphical object style input option 520 of property selection submenu 523 may allow the user to select a drawing stroke input tool from a group of various pre-defined drawing stroke input tools or stamps (e.g., a "circular pen" drawing stroke input tool, as shown in FIG. 4H), drawing stroke graphical object color input option 522 of property selection submenu 523 may allow the user to select a color from a group of various pre-defined drawing stroke colors (e.g., a color represented by "///" markings, as shown in FIG. 4H), and drawing stroke graphical object effect input option 524 of property selection submenu 523 may allow the user to select one or more effects to be applied to the drawing stroke from a group of various pre-defined drawing stroke effects (e.g., no effects, as shown in FIG. 4H). It is to be understood that additional or alternative pre-defined drawing stroke input tools of various other pre-defined shapes, colors, effects, and other various pre-defined drawing stroke graphical object properties may also be provided by submenu 523 of menu 510 when drawing stroke input option 512 of submenu 513 is selected.

Any selections made by the user with respect to the options provided by menu 510 may be received by graphical display system 301 of first electronic device 100 for generating and displaying drawing stroke graphical object content on canvas 501. For example, selections made by the user with respect to the options provided by menu 510 may be received by graphical input command generating module 310 of graphical input command generating module 304 of graphical display system 301 as menu graphical input information 311. In some embodiments, a user may interact with menu 510 to provide selections using any suitable pointing input component of first electronic device 100 (e.g., mouse input component 110 of FIGS. 4A-4K). For example, a user may interact with mouse input component 110 to point and click a cursor (not shown) at any suitable portions of screen 500h of display 112 that may be presenting the appropriate selectable options of menu 510. It is to be understood, however, that any suitable pointing input component may be used by a user to point to or otherwise identify a particular menu option provided by menu 510 and any suitable input gesture of that pointing input component or another input component may be used to interact with that particular menu option in any particular way.

When a user selects options 512, 520, 522, and 524 of menu 510 for creating a new drawing stroke graphical object in artwork 11 with a circular pen drawing stroke input tool of a particular color and no effects, for example, the selections may be received by graphical input command generating module 310 of graphical display system 301 as menu graphical input information 311, and graphical input command generating module 310 may generate one or more appropriate generated menu graphical input commands 319 representative of these menu selections. These menu input commands 319 may be processed by array generating module 380 of graphical command processing module 308 to generate at least a portion of generated pixel array data 385 with pixel data that may represent these menu selections. Such menu selection pixel data 385 may be presented on display 112 in menu 510, for example, after first being combined with any received pixel array data 387 by pixel array combining module 388 as combined pixel array data 389, and then provided by active display defining module 390 as at least a portion of active pixel array data 399.

For example, as shown by screen 500h of FIG. 4H, in response to a user selecting drawing stroke input option 512 (e.g., with mouse input component 110), graphical input command generating module 310 may receive certain menu graphical input information 311 and then generate a particular menu generated graphical input command 319 (e.g., a menu generated graphical input command with the representative syntax "COMMAND: CLASS=MENU INPUT; SELECT=MENU OPTION 512"), which may be processed by modules of graphical command processing module 308 to generate at least a portion of active pixel array data 399 with updated menu pixel data that may present shading indicia at the portion of screen 500h identifying input option 512 in menu 510 of display 112. Similarly, as shown by screen 500h of FIG. 4H, in response to a user selecting a circular pen drawing stroke graphical object style input option 520, graphical display system 301 may generate and present a rigid circle within the box identifying input option 520 in menu 510 of display 112. Moreover, as shown by screen 500*h* of FIG. 4H, in response to a user selecting a particular color with input option 522 and no effect with input option 524, graphical display system 301 may generate and present a representation of that color (e.g., "///") within the box identifying input option 522 in menu 510 of display 112 and a representation of no effect (e.g., "none") within the box identifying input option 524 in menu 510 of display 112.

As also shown in FIG. 3A, menu generated graphical input command 319 may also be provided to graphical command sharing module 350, which may be configured to pass certain generated graphical input commands 319 on to communications circuitry 106 of first device 100 as shared graphical input commands 359. Such shared graphical input commands 359 may be received by graphical display system 401 of second device 200 as received graphical input commands 461. Therefore, in some embodiments, particular menu generated graphical input commands 319 may be provided by graphical command sharing module 350 to graphical display system 401 of second device 200 such that similar changes may be made to menu 610 of screen 600*h* of FIG. 4H. However, as shown in FIG. 4H, because input synchs 526 and 626 of menus 510 and 610 are not selected, system 1 may be configured such that the current active user interface selections of first electronic device 100 are not synchronized with the current active user interface selections of second electronic device 200. Such non-synchronization may allow for the current active graphical object type selection(s) of submenu 513 and/or the current active graphical object property selection(s) of submenu 523 of first device 100 to differ from the current active graphical object type selection(s) of submenu 613 and/or the current active graphical object property selection(s) of submenu 623 of second device 200.

For example, as shown in FIG. 3A, graphical command sharing module 350 may include an input synch register 352. In some embodiments, if input synch option 526 is selected (e.g., by a user interaction with menu 510) (not shown), that selection may generate specific input information 311 that may generate one or more menu generated graphical input commands 319, which may set input synch register 352 in graphical command sharing module 350. When input synch register 352 is set, then graphical command sharing module 350 may be configured to pass certain menu generated graphical input commands 319 on to graphical display system 401 of second device 200 such that similar changes may be made to menu 610 of screen 600*h* of FIG. 4H (e.g., for presenting shading indicia at the portion of screen 600*h* identifying input option 612 in menu 610 of display 112). However, because input synch option 526 is not selected on screen 500*h*, input synch register 352 may not be set in graphical command sharing module 350, such that graphical command sharing module 350 may not pass on menu generated graphical input commands 319 to device 200 for updating menu 610 similarly to menu 510.

Once options 512, 520, 522, and 524 of menu 510 have been selected for creating a drawing stroke graphical object (e.g., with a circular pen drawing stroke input tool of a particular color and no effects), and once the selections have been received by graphical display system 301 and represented on display 112 in menu 510, the user may then interact with graphical display system 301 for generating one or more new drawing stroke graphical objects in artwork 11 on canvas 501 according to the selected options. Based on any appropriate drawing stroke graphical object input information 311, which may be generated by a user (e.g., using input component 110 and/or input component 110*a*) and/or any application running on device 100 (e.g., application 103), graphical input command generating module 310 may be configured to define and generate at least one new drawing stroke graphical object input command 319. This new drawing stroke graphical object input command 319 may then be processed by pixel array generating module 380, and eventually by active display generating module 390 as new active drawing stroke graphical object pixel array data 399 for presentation on display 112.

For example, as also shown by screen 500*h* of FIG. 4H, a user may interact with graphical display system 301 to generate a new drawing stroke graphical object 580 in artwork 11 on canvas 501. As shown, drawing stroke graphical object 580 may include a straight vertical line extending along a trail path from a starting point P15 on canvas 501 to an ending point P16 on canvas 501 with the selected drawing stroke properties of options 520, 522, and 524. For example, in response to a user defining a trail path for a new drawing stroke graphical object (e.g., by dragging a cursor along canvas 501 from point P15 to point P16 with mouse input component 110), graphical input command generating module 310 may receive certain drawing stroke input information 311 and then generate a particular drawing stroke input command 319. For example, based on the selected properties of options 520, 522, and 524, and the trail path defined by points P15 and P16, graphical command generating module 310 may generate a new drawing stroke graphical object input command 319, which may have the following representative syntax: "COMMAND: CLASS=GRAPHICAL OBJECT INPUT; TYPE=DRAWING STROKE; STYLE=CIRCULAR PEN; COLOR=///; EFFECT=NONE; START:P15; END:P16". The new drawing stroke input command 319 generated by graphical command generating module 310 may then be processed by graphical command processing module 308 (e.g., modules 380, 388, and/or 390) to generate at least a portion of new drawing stroke pixel array data 399 that may present new drawing stroke graphical object 580 at the appropriate position on canvas 501 of screen 500*h* of display 112. It is to be understood that the above representative syntax of new drawing stroke input command 319 for generating new drawing stroke graphical object 580 is merely representative, and that any suitable syntax may be used by application 103 of first electronic device 100 for generating a new drawing stroke input command 319 in response to received drawing stroke input information 311.

Although only starting point P15 and ending point P16 of the trail of new drawing stroke graphical object 580 may be defined by the exemplary representative syntax of new drawing stroke input command 319, it is to be understood that, in other embodiments, multiple additional points of the path may be defined by the new drawing stroke input information 311. For example, if the new drawing stroke is a straight line (e.g., as is shown in FIG. 5H by the straight vertical line of drawing stroke graphical object 580 between starting point P15 and ending point P16), graphical command generating module 310 may only define a new drawing stroke input command 319 with a starting point and an ending point in order for the new drawing stroke input command 319 to adequately instruct graphical command processing module 308 to generate the appropriate path of the new drawing stroke graphical object on canvas 501. However, if the new drawing stroke is not a straight line (e.g., a drawing stroke that follows a curved or otherwise non-linear path), graphical command generating module 310 may define a new drawing stroke input command 319 with multiple additional points along the path between the starting point and the ending point in order for the new drawing stroke input command 319 to adequately instruct graphical command processing module 308 to generate the appropriate path of the new drawing stroke graphical object on canvas 501.

In some embodiments, rather than generating a single new drawing stroke input command 319 for a new drawing stroke graphical object to be generated on canvas 501, graphical command generating module 310 may generate multiple new drawing stroke input commands 319, each of which may adequately instruct graphical command processing module 308 to generate a particular portion of the new drawing stroke graphical object on canvas 501. For example, as shown in FIG. 4H, the trail path of drawing stroke graphical object 580 may be defined by starting point P15, ending point P16, and an intermediate point P17, such that graphical command generating module 310 may generate two drawing stroke graphical object input commands 319. The first of such two drawing stroke graphical object input commands 319 for defining drawing stroke graphical object 580 may have the following representative syntax: "COMMAND: CLASS=GRAPHICAL OBJECT INPUT; TYPE=DRAWING STROKE; STYLE=CIRCULAR PEN; COLOR=///; EFFECT=NONE; START:P15; END:P17", while the second of such two drawing stroke graphical object input commands 319 for defining drawing stroke graphical object 580 may have the following representative syntax: "COMMAND: CLASS=GRAPHICAL OBJECT INPUT; TYPE=DRAWING STROKE; STYLE=CIRCULAR PEN; COLOR=///; EFFECT=NONE; START:P17; END:P16". Each one of these two drawing stroke input commands 319 generated by graphical command generating module 310 may be processed by graphical command processing module 308 to generate at least a portion of new drawing stroke pixel array data 399 that may present new drawing stroke graphical object 580 at the appropriate position on canvas 501 of screen 500h of display 112.

As mentioned, virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. Therefore, at least some graphical object input commands 319 generated by graphical command generating module 310 may be provided to communications circuitry 106 of first electronic device 100 as shared graphical object input commands 359. Continuing with the example of FIG. 4H, based on the selected properties of options 520, 522, and 524, and points P15 and P16 of the trail path defined by input information 311 received by first electronic device 100, graphical command generating module 310 may generate at least one new drawing stroke graphical object input command 319 that not only may be received and processed by pixel array generating module 380 to generate at least a portion of new drawing stroke pixel array data 385 that may present new drawing stroke graphical object 580 at the appropriate position on canvas 501 of screen 500h of display 112, but that also may be received and processed by graphical command sharing module 350. Graphical command sharing module 350 may pass on new drawing stroke graphical object input command 319 as shared new drawing stroke graphical object input command 359 to communications circuitry 106, which may provide shared new drawing stroke graphical object input command 359 to graphical display system 401 of second device 200 (e.g., as received new drawing stroke graphical object input command 461) to generate at least a portion of new drawing stroke pixel array data 489 that may present a new drawing stroke graphical object 680 at the appropriate position on canvas 601 of screen 600h of display 212.

Such a received new drawing stroke graphical object input command 461 may be received by pixel array requesting module 460 of graphical display system 401 of second device 200. For example, pixel array requesting module 460 may process a received new drawing stroke graphical object input command 461 and may pass that received new drawing stroke graphical object input command 461 on to pixel array generating module 480, such that at least a portion of new drawing stroke pixel array data 499 may be generated to present at least a portion of a new drawing stroke graphical object 680 at the appropriate position on canvas 601 of screen 600h of display 212. As shown in FIG. 4H, because only a zoomed-in portion 601z' of canvas 601 may be presented on screen 600h, only a portion of new drawing stroke graphical object 580 on canvas 501 of screen 500h may be displayed on screen 600h as new drawing stroke graphical object 680. For example, although the entirety of the new drawing stroke graphical object input command 461 may be processed by pixel array generating module 480 to generate generated pixel array data 485 that may be presented on canvas 601 as the entirety of new drawing stroke graphical object 680, active display defining module 490 may only pass a portion of that pixel array data on as active pixel array data 499 to be displayed on screen 600h of FIG. 4H.

In other embodiments, rather than passing each new received drawing stroke graphical object input command 461 defining portions of the new drawing stroke graphical object 680 on to pixel array generating module 480 for processing as pixel array data, pixel array requesting module 460 may determine that only certain new received drawing stroke graphical object input commands 461 should be passed on to pixel array generating module 480 for processing as pixel array data. For example, pixel array requesting module 460 may also be configured to receive active display adjustment pixel array data request information 495 from active display defining module 490. This active display adjustment pixel array data request information 495 may be indicative of the portion of canvas 601 that is currently actively displayed on display 212 (e.g., zoomed-in portion 601z'). Therefore, in some embodiments, pixel array requesting module 460 may determine that only the new received drawing stroke graphical object input commands 461 that may be processed to update currently actively displayed canvas portion 601z' may be passed on to pixel array generating module 480 for processing as pixel array data 485. This may save some processing power or other resources of second device 200.

For example, following the above example where graphical command generating module 310 may generate two drawing stroke graphical object input commands 319 for new drawing stroke graphical object 580, each of those commands 319 may be received by pixel array requesting module 460 as one of two received drawing stroke graphical object input commands 461 for defining a portion of new drawing stroke graphical object 680 on canvas 601. The first of such two received drawing stroke graphical object input commands 461 for defining drawing stroke graphical object 680 may have the following representative syntax: "COMMAND: CLASS=GRAPHICAL OBJECT INPUT;

TYPE=DRAWING STROKE; STYLE=CIRCULAR PEN; COLOR=///; EFFECT=NONE; START:P15; END:P17", while the second of such two received drawing stroke graphical object input commands 461 for defining drawing stroke graphical object 680 may have the following representative syntax: "COMMAND: CLASS=GRAPHICAL OBJECT INPUT; TYPE=DRAWING STROKE; STYLE=CIRCULAR PEN; COLOR=///; EFFECT=NONE; START:P17; END:P16". When the first of these two received drawing stroke graphical object input commands 461 is received by pixel array requesting module 460, pixel array requesting module 460 may determine that the portion of new drawing stroke graphical object 680 defined by that first received drawing stroke graphical object input command 461 would be positioned in the currently actively displayed canvas portion 601z' of canvas 601. That is, by determining that both start point P15 and end point P17 defined by the first of these two received drawing stroke graphical object input commands 461 fall within currently actively displayed canvas portion 601z' of canvas 601 (e.g., by analyzing active display adjustment pixel array data request information 495), pixel array requesting module 460 may be configured to pass that first of the two received drawing stroke graphical object input commands 461 on to pixel array generating module 480 for processing as pixel array data.

However, when the second of these two received drawing stroke graphical object input commands 461 is received by pixel array requesting module 460, pixel array requesting module 460 may determine that the portion of new drawing stroke graphical object 680 defined by that second received drawing stroke graphical object input command 461 would not be positioned in the currently actively displayed canvas portion 601z' of canvas 601. That is, by determining that the portion of canvas 601 between start point P17 and end point P16 defined by the second of these two received drawing stroke graphical object input commands 461 does not fall within currently actively displayed canvas portion 601z' of canvas 601 (e.g., by analyzing active display adjustment pixel array data request information 495), pixel array requesting module 460 may be configured to not pass that second of the two received drawing stroke graphical object input commands 461 on to pixel array generating module 480 for processing as pixel array data. This may save some processing power or other resources of second device 200. In some embodiments, pixel array requesting module 460 may only be configured to selectively pass certain received graphical object input commands 461 on to pixel array generating module 480 when a certain operating condition of device 200 is met (e.g., the battery of second device 200 is below a certain threshold). In some embodiments, pixel array requesting module 460 may be configured to store or otherwise make accessible to system 401 any received graphical object input commands 461 that are not immediately passed on by module 460 to module 480. Instead, such commands may be later accessed by module 460 for updating a portion of canvas 601 when that portion is made an actively displayed portion of canvas 601 on display 212.

Alternatively, as mentioned, at least some new drawing stroke graphical object pixel array data generated by graphical display system 301 may be provided to communications circuitry 106 of first electronic device 100 as shared drawing stroke graphical object pixel array data. Communications circuitry 106 may then provide the shared drawing stroke graphical object pixel array data to communications circuitry 206 of second electronic device 200 via communications media 55, and communications circuitry 206 may provide the shared drawing stroke graphical object pixel array data as received drawing stroke graphical object pixel array data to graphical display system 401 for presentation on display 212.

For example, in some embodiments, despite utilizing common semantics in response to particular input commands, first electronic device 100 and second electronic device 200 may have different resources or capabilities and may sometimes rather share pixel array data instead of or in addition to sharing input commands. For example, upon receiving a received drawing stroke graphical object input command 461, pixel array requesting module 460 of graphical display system 401 may determine that second electronic device 200 does not currently have enough processing power or capabilities for enabling pixel array generating module 480 to generate new drawing stroke pixel array data from the received drawing stroke graphical object input command 461 (e.g., graphical display system 401 may determine that second device 200 is trying to conserve its power supply 208 or is otherwise unable to generate pixel array data based on the received input command). In some embodiments, in response to such a determination, rather than passing received drawing stroke graphical object input command 461 on to pixel array generating module 480, pixel array requesting module 460 may instead send a command to graphical display system 301 of first device 100 instructing graphical display system 301 to transmit new drawing stroke pixel array data (e.g., as shared drawing stroke pixel array data) to graphical display system 401 (e.g., as received drawing stroke pixel array data), such that graphical display system 401 may avoid having to independently process a received drawing stroke graphical object input command 461 for adding new drawing stroke graphical object 680 on canvas 601.

For example, in response to determining that system 401 would rather receive corresponding pixel array data from device 100 than generate its own pixel array data from received drawing stroke graphical object input command 461, pixel array requesting module 460 may generate a shared pixel array data request command 469. In some embodiments, shared pixel array data request command 469 may request the pixel array data for the entirety of canvas 501. In other embodiments, shared pixel array data request command 469 may request the pixel array data for the portion of canvas 501 associated with the currently active display portion of canvas 601 (e.g., zoomed-in canvas portion 601z'), which may be determined by pixel array requesting module 460 based on active display adjustment pixel array data request information 495. In yet other embodiments, shared pixel array data request command 469 may request only the pixel array data that was updated based on the shared graphical object input command.

In response to receiving received drawing stroke graphical object input command 461, and in response to determining that system 401 would rather receive corresponding pixel array data from device 100 than generate its own pixel array data from received drawing stroke graphical object input command 461, pixel array requesting module 460 may generate a shared pixel array data request command 469 that may request only the pixel array data that updated canvas 501 based on the drawing stroke graphical object input command 319 that was also provided to system 401 as received drawing stroke graphical object input command 461. For example, such a shared pixel array data request command 469 may request only the pixel array data that was generated to update screen 500g of FIG. 4G to screen 500h of FIG. 4H.

For example, in response to receiving received drawing stroke graphical object input command 461 that may have the following representative syntax: "COMMAND: CLASS=GRAPHICAL OBJECT INPUT; TYPE=DRAWING STROKE; STYLE=CIRCULAR PEN; COLOR=///; EFFECT=NONE; START:P15; END:P16", pixel array requesting module 460 may generate a shared pixel array data request command 469 that may have the following representative syntax: "COMMAND: CLASS=PIXEL ARRAY DATA REQUEST; TYPE=DRAWING STROKE; STYLE=CIRCULAR PEN; COLOR=///; EFFECT=NONE; START:P15; END:P16". This shared pixel array data request command 469 may be provided by pixel array requesting module 460 to communications circuitry 206 of second device 200, which may then provide the shared pixel array data request command to communications circuitry 106 of first device 100 via communications media 55, and communications circuitry 106 may provide the shared pixel array data request command as received pixel array data request command 371 to graphical display system 301.

Received pixel array data request command 371 may be received by graphical display system 301 at pixel array sharing module 370, which may be configured to acquire the portion of pixel array data 389 requested by received command 371. For example, pixel array sharing module 370 may be configured to receive both combined pixel array data 389 from pixel array combining module 388 and received pixel array data request command 371 from communications circuitry 106, and then to generate shared pixel array data 379. Following the example in which shared pixel array data request command 469 may request only the pixel array data that was generated to update screen 500g of FIG. 4G to screen 500h of FIG. 4H, shared pixel array data 379 may be the portion of combined pixel array data 389 that was provided to pixel array combining module 388 by pixel array generating module 380 as new drawing stroke graphical object generated pixel array data 385, which may have been generated by pixel array generating module 380 in response to processing a new drawing stroke graphical object input command 319 defining new drawing stroke graphical object 580.

Such shared pixel array data 379 may be provided by pixel array sharing module 370 to communications circuitry 106 of first device 100, which may then provide the shared pixel array data to communications circuitry 206 of second device 200 via communications media 55, and communications circuitry 206 may provide the shared pixel array data as received pixel array data 487 to graphical display system 401. Received pixel array data 487 may be provided to pixel array combining module 488 of graphical display system 401. Pixel array combining module 488 may be configured to combine any pixel array data 485 generated internally by pixel array generating module 480 of graphical display system 401 with any received pixel array data 487 received from any external entity (e.g., graphical display system 301 of first device 100) in order to generate combined pixel array data 489. This combined pixel array data 489 may then be received by active display defining module 490, and active display defining module 490 may pass at least a portion of combined pixel array data 489 on to display 212 as active pixel array data 499.

Following the example in which received pixel array data 487 is the pixel array data for updating canvas 601 with drawing stroke graphical object 680, pixel array combining module 488 may combine this data with the other pixel array data defining canvas 601 (e.g., the pixel array data defining graphical objects 630, 640, 650, 660, and 670) and may generate combined pixel array data 489. Next active display defining module 490 may only pass the portion of this combined pixel array data 489 defining the portion of canvas 601 currently actively displayed on display 212 (e.g., zoomed-in canvas portion 601z') on to display 212 as active pixel array data 499. An example of such active pixel array data 499 may be displayed by screen 600h of FIG. 4H.

Although not shown, in some embodiments, a user's interaction with first device 100 for generating a new graphical object on canvas 501 may adjust the actively displayed portion of canvas 601 on second device 200. For example, as a user of first device 100 generates input information 311 for defining the trail path of drawing stroke graphical object 580 between points P15 and P16 on canvas 501 (e.g., by dragging a cursor of mouse input component 110 along canvas 501), when the user's interaction extends beyond point P17 towards P16 such that the trail path extends beyond outline 602, system 1 may be configured to automatically move outline 602 with the trail path. This may allow for the new graphical object being created to be shown by the actively displayed portion of canvas 601 on second device 200 (e.g., as opposed to the example of FIG. 4H, in which only a portion of new drawing stroke graphical object 680 may be presented in actively displayed portion 601z' of canvas 601 on screen 600h). However, in other embodiments, outline 602 may only be moved along canvas 501 in response to a user of first device 100 directly interacting with outline 602 (e.g., as described above with respect to FIGS. 4F and 4G). For example, a user of system 1 may interact with outline lock 528 and/or outline lock 628 to adjust the ways in which outline 602 may be moved or otherwise adjusted.

As mentioned, (e.g., with respect to FIGS. 4E and 4F), a user may interact with second device 200 to generate input information for changing the portion of canvas 601 that may be displayed on display 212. As shown by screen 600h of FIG. 4H, for example, a user of second electronic device 200 may provide a multi-touch "pinch" user input gesture on touch screen 211 by imparting a first touch event or gesture from point P18 to point P20 in the direction of arrow g1 on canvas 601, while also imparting a second touch event or gesture from point P19 to point P21 in the direction of arrow g2 on canvas 601, which may change the distance between the set points on display 212 (e.g., the displayed distance between canvas points P18 and P19 as shown on screen 600h may be pinched or reduced to the distance between canvas points P20 and P21 as shown on screen 600h). Any selections or interactions made by the user with respect to identifying the portion of canvas 601 to be actively displayed on display 212 may be received by graphical display system 401 of second electronic device 200 for updating the visible portion of canvas 601 on display 212. For example, when a user identifies points P18-P21 on canvas 601 of screen 600h of FIG. 4H in a pinch gesture, such user interactions may be received by active display adjusting module 420 of graphical command generating module 404 of graphical display system 401 as active display adjustment input information 421, and active display adjusting module 420 may generate one or more active display adjustment input commands 429 representative of these user interactions. These active display adjustment input commands 429 may be processed by active display defining module 490 of graphical command processing module 408 to adjust the portion of pixel array data of canvas 601 (e.g., combined pixel array data 489) that may be actively displayed (e.g., as active pixel array data 499) on display 212.

Figure 4I:
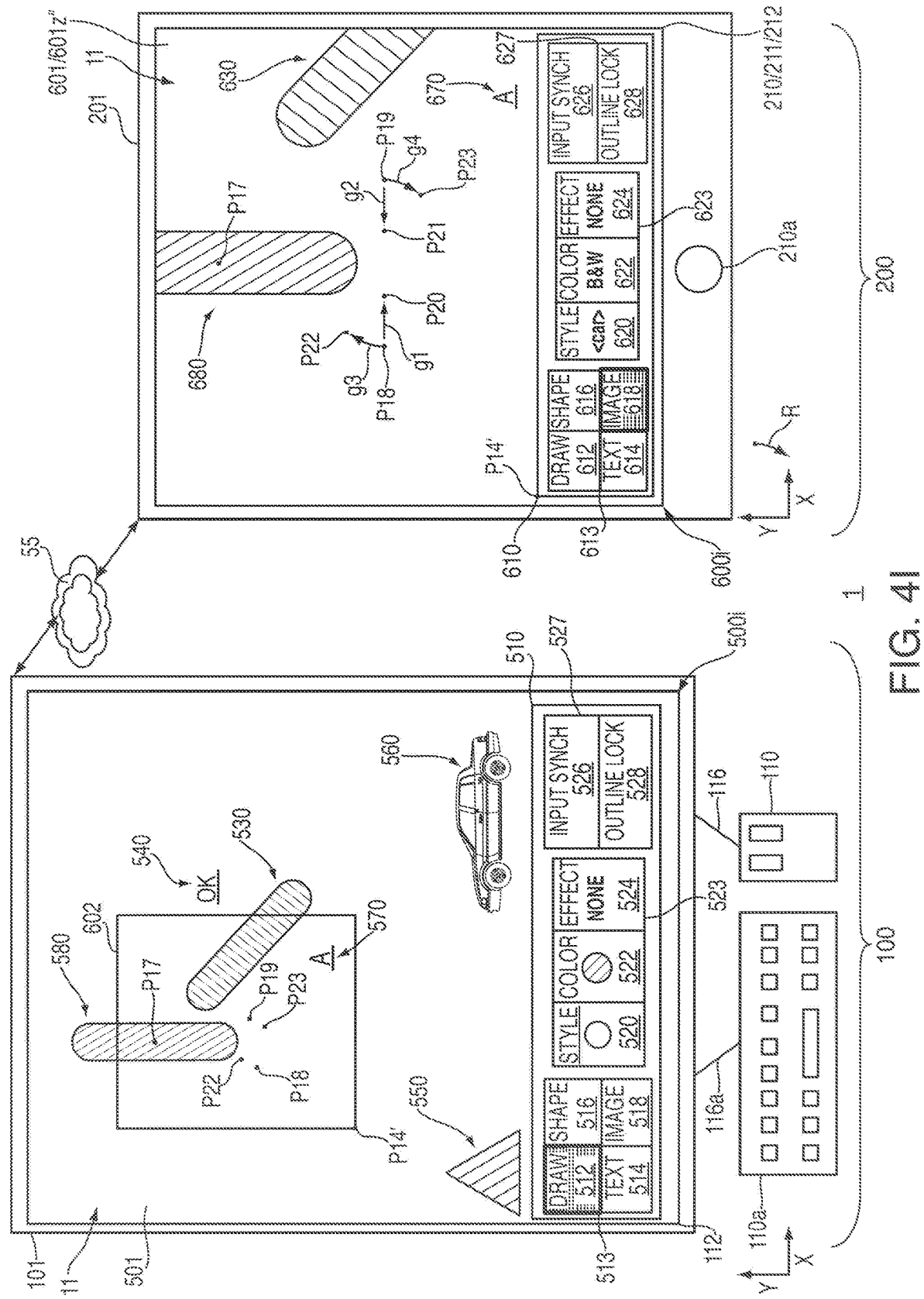

For example, as shown by screen 600*i* of FIG. 4I, in response to a user interacting with second device 200 to identify the adjusted portion of canvas 601 to be actively displayed on display 212 (e.g., pinch gesture points P18-P21 with touch screen I/O component 211), active display adjusting module 420 may receive certain active display adjustment input information 421 and may then generate a particular active display adjustment input command 429 (e.g., an active display adjustment input command with the representative syntax "COMMAND: CLASS=ACTIVE DISPLAY ADJUSTMENT INPUT; ADJUST=PINCH; STARTPOINT1=P18; ENDPOINT1=P20; STARTPOINT2=P19; ENDPOINT2=P21"). Such an active display adjustment input command 429 may then be processed by active display defining module 490 to adjust the portion of combined pixel array data 489 of canvas 601 that may be actively displayed as active pixel array data 499 on display 212, as shown by screen 600*i* of FIG. 4I. For example, as shown in FIG. 4I, a pinched canvas portion 601*z*″ of canvas 601 may be actively displayed by screen 600*i* of display 212. Such a pinch gesture user input may expand the portion of canvas 601 actively displayed by second device 200.

Continuing with the example of FIGS. 4H and 4I, based on the active display adjustment input information 421 received by active display adjusting module 420 of second electronic device 200, active display adjusting module 420 may generate an active display adjustment input command 429 that not only may be received and processed by active display defining module 490 to adjust the portion of combined pixel array data 489 of canvas 601 that may be actively displayed as active pixel array data 499 on display 212 as pinched canvas portion 601*z*″ of screen 600*i* of display 212, but that also may be received and processed (i.e., as received outline moving command 341) by graphical display system 301 of first electronic device 100 to generate at least a portion of new pixel array data that may present an adjusted second device outline 602 at the appropriate position on canvas 501 of screen 500*i* of display 112. Adjusted second device outline 602 may be configured to identify on canvas 501 of screen 500*i* the portion of collaborative artwork 11 on canvas 501 that is currently actively displayed by pinched canvas portion 601*z*″ on screen 600*i* of display 212 (i.e., the pinched portion from points P18/P19 to points P20/P21 of synched canvases 501 and 601).

Alternatively, rather than expanding the portion of canvas 601 actively displayed by second device 200 by interacting with second device 200, a user may alternatively interact with outline 602 on canvas 501 of first device 100 in order to alter the size of the portion of canvas 601 to be actively displayed on display 212. As shown by screen 500*h* of FIG. 4H, for example, a user of first electronic device 100 may select a point P14 on canvas 501 that may include a displayed portion of outline 602 that the user would like to expand to another point on canvas 501 (e.g., to point P14', in the direction of arrow E). A user may interact with first electronic device 100 in any suitable way (e.g., using input component 110 and/or input component 110*a*) to identify point P14 of outline 602 and to instruct device 100 to expand that point of outline 602 from point P14 on canvas 501 to point P14' on canvas 501 in any suitable way. For example, a user may click on that portion of outline 602 and drag it in the direction of arrow E to point P14' (e.g., using mouse input component 110). Although not shown, artist menu 510 may provide a user of first electronic device 100 with input options for appropriately interacting with device 100 to easily adjust the portion of canvas 501 covered by outline 602 on display 112.

Any selections or interactions made by the user of first device 100 for identifying how to adjust outline 602 with respect to canvas 501 may be received by graphical display system 301 of first electronic device 100 for updating outline 602 on canvas 501. For example, when a user identifies initial outline point P14 and expanded outline point P14' on canvas 501 of screen 500*h* of FIG. 4H, such user interactions may be received by outline selecting module 330 of graphical command generating module 304 of graphical display system 301 as outline selecting input information 331, and outline selecting module 330 may generate one or more generated outline moving commands 335 representative of these user interactions (e.g., one or more generated outline moving input commands with the representative syntax "COMMAND: CLASS=OUTLINE MOVEMENT INPUT; ADJUST=EXPAND; FROMPOINT=P14; TOPOINT=P14'"). These generated outline moving commands 335 may be processed by outline moving module 340 of graphical command processing module 308, which may pass generated outline moving commands 335 on to pixel array generating module 380 as master outline moving commands 349 (e.g., if outline moving module 340 does not receive any received outline moving commands 341 of higher priority). Pixel array generating module 380 may then generate appropriate pixel array data for an updated outline 602 to be displayed on display 112. For example, as shown by screen 500*i* of FIG. 4I, in response to a user interacting with first device 100 to identify how to adjust outline 602 with respect to canvas 501 on display 112, such that appropriate outline selecting input information 331 may be provided to outline selecting module 330 for generating the appropriate generated outline moving command 335, and such that the appropriate master outline moving commands 349 may then be provided to pixel array generating module 380 for generating appropriate pixel array data for an updated outline 602 to be displayed on display 112, outline 602 may be moved to a new position on canvas 501.

Continuing with this example, based on the outline selecting input information 331 received by outline selecting module 330 of first electronic device 100, outline selecting module 330 may also generate one or more shared other device active display adjustment input commands 339 that may be received and processed (i.e., as received own active display adjustment input command 491) by graphical display system 401 of second electronic device 200 to adjust the portion of canvas 601 that may be actively displayed on screen 600*g* of display 212. For example, a shared other device active display adjustment input command 339 may be received as received own active display adjustment input command 491 by active display defining module 490 of graphical command processing module 408 of second electronic device 200. Active display defining module 490 may be configured to process received own active display adjustment input command 491 to adjust the portion of combined pixel array data 489 of canvas 601 that may be actively displayed as active pixel array data 499 on display 212, as shown by screen 600*i* of FIG. 4I. For example, as shown in FIG. 4I, an adjusted zoomed-in canvas portion 601*z*″ of canvas 601 (e.g., with new point P14') may be actively displayed by screen 600*i* of display 212. In some embodiments, a shared other device active display adjustment input command 339 may be similar to an associated generated outline moving input command 335 that has also been generated by outline selecting module 330 for particular input information 331 (e.g., a shared other device active display adjustment input command 339 may have the representative syntax "COMMAND: CLASS=OTHER DEVICE ACTIVE DISPLAY ADJUSTMENT INPUT; ADJUST=EXPAND; FROMPOINT=P14; TOPOINT=P14").

When the active display of second device 200 is adjusted, whether in response to an active display adjustment command 429 generated by second device 200 or in response to an active display adjustment command 491 received from first device 100, second device 200 may be configured to access one or more input commands or one or more portions of pixel array data (e.g., from first device 100 or from memory 204 of second device 200) to update the new portion of canvas 601 displayed by the adjusted active display. For example, as mentioned above, pixel array requesting module 460 may be configured to only pass received graphical object input commands 461 that may be processed to update the currently actively displayed portion of canvas portion 601. Therefore, when the currently actively displayed portion of canvas portion 601 is adjusted, canvas 601 may not include all of the graphical content of canvas 501.

Module 460 may be configured only to pass on a particular received command 461 to pixel array generating module 480 for processing as pixel array data 485 when that command may be processed to update the currently actively displayed portion of canvas portion 601. In some embodiments, graphical display system 401 may be configured to store (e.g., in memory 204 of device 200) or otherwise have access to (e.g., from first device 100) any received graphical object input commands 461 or to only those received graphical object input commands 461 that have not already been passed on to module 480 for processing. For example, in response to any active display adjustment command 429 or any active display adjustment command 491 received by module 490 that defines a new actively displayed portion of canvas 601, module 490 may provide request information 495 to module 460. Such request information 495 may instruct module 460 to access and pass on to pixel array generating module 480 any previously received input commands 461 that may be processed to update the new actively displayed portion of canvas portion 601. Such previously received commands 461 may be stored in memory 200 of device 200 and accessed by module 460, or stored by device 100 and provided to device 200 when requested.

Following the above example, the second of two received drawing stroke graphical object input commands 461 for defining drawing stroke graphical object 680 may have the following representative syntax: "COMMAND: CLASS=GRAPHICAL OBJECT INPUT; TYPE=DRAWING STROKE; STYLE=CIRCULAR PEN; COLOR=///; EFFECT=NONE; START:P17; END:P16" and may not have been passed on by module 460 to module 480 when portion 601z' of canvas 601 was actively displayed on display 212. However, when the actively displayed portion of canvas 601 is adjusted to be portion 601z" of FIG. 4I, module 460 may access and pass that second of two received drawing stroke graphical object input commands 461 on to module 480 for generating at least a portion of object 680 on a portion of canvas 601 that is included in canvas portion 601z" but not canvas portion 601z' (e.g., a portion of object 680 between point P17 and point P16). By only processing the input commands necessary to generate the graphical content of canvas 601 that is currently actively displayed, second device 200 may preserve certain resources (e.g., processing resources or power resources). In some embodiments, pixel array requesting module 460 may only be configured to selectively pass certain received graphical object input commands 461 on to pixel array generating module 480 when a certain operating condition of device 200 is met (e.g., the battery of second device 200 is below a certain threshold).

Alternatively, when a new portion of canvas 601 is included as an actively displayed portion of canvas 601 on display 212, second device 200 may rather receive shared pixel array data for updating that portion of canvas 601 instead of or in addition to processing received input commands. For example, upon receiving information 495 indicative of a new actively displayed portion of canvas 601 on display 212, pixel array requesting module 460 may determine that second electronic device 200 does not currently have enough processing power or capabilities for enabling pixel array generating module 480 to process accessible input commands 461 for properly updating the new actively displayed portion of canvas 601 (e.g., graphical display system 401 may determine that second device 200 is trying to conserve its power supply 208 or is otherwise unable to process or access such input commands). In some embodiments, in response to such a determination, pixel array requesting module 460 may instead send a command to graphical display system 301 of first device 100 instructing graphical display system 301 to transmit new pixel array data (e.g., as shared pixel array data) to graphical display system 401 (e.g., as received pixel array data) that may be the pixel array data of the new actively displayed portion of canvas 601.

For example, in response to determining that system 401 would rather receive corresponding pixel array data from device 100 than generate its own pixel array data from received graphical object input commands in order to ensure that the current actively displayed portion of canvas 601 is synched or otherwise similar to canvas 501, pixel array requesting module 460 may generate a shared pixel array data request command 469. Such a shared pixel array data request command 469 request the pixel array data for the portion of canvas 501 associated with the new portion of canvas 601 that is actively displayed (e.g., the portion of canvas 601z" of FIG. 4I that is not a portion of canvas 601z' of FIG. 4H, which may be determined by pixel array requesting module 460 based on active display adjustment pixel array data request information 495. In yet other embodiments, shared pixel array data request command 469 may request only the pixel array data of the new canvas portion that has been updated by input commands since that canvas portion was last displayed by display 212.

This shared pixel array data request command 469 may be provided by pixel array requesting module 460 to communications circuitry 206 of second device 200, which may then provide the shared pixel array data request command to communications circuitry 106 of first device 100 via communications media 55, and communications circuitry 106 may provide the shared pixel array data request command as received pixel array data request command 371 to graphical display system 301. Received pixel array data request command 371 may be received by graphical display system 301 at pixel array sharing module 370, which may be configured to acquire the portion of pixel array data 389 requested by received command 371 and then to generate shared pixel array data 379. Such shared pixel array data 379 may be provided as received pixel array data 487 to graphical display system 401, and received pixel array data 487 may be provided to pixel array combining module 488 of graphical display system 401 as at least a portion of the appropriate pixel array data for the newly displayed portion of canvas 601 on display 212.

As another example, a user may interact with second device 200 to generate input information for pulling rather than pinching canvas 601 to change the portion of canvas 601 that may be displayed on display 212. As shown by screen 600i of FIG. 4I, for example, a user of second electronic device 200 may provide a multi-touch "pull" user input gesture on touch screen 211 by imparting a first touch event or gesture from point P20 to point P18 in the opposite direction of arrow g1 on canvas 601, while also imparting a second touch event or gesture from point P21 to point P19 in the opposite direction of arrow g2 on canvas 601, which may change the distance between the set points on display 212 (e.g., the displayed distance between canvas points P20 and P21 as shown on screen 600i may be pulled or expanded to the distance between canvas points P18 and P19 as shown on screen 600i). In response to a user interacting with second device 200 to identify the adjusted portion of canvas 601 to be actively displayed on display 212 (e.g., pull gesture points P18-P21 with touch screen I/O component 211), active display adjusting module 420 may receive certain active display adjustment input information 421 and may then generate a particular active display adjustment input command 429 (e.g., an active display adjustment input command with the representative syntax "COMMAND: CLASS=ACTIVE DISPLAY ADJUSTMENT INPUT; ADJUST=PULL; STARTPOINT1=P20; ENDPOINT1=P18; STARTPOINT2=P21; ENDPOINT2=P19"). Such an active display adjustment input command 429 may then be processed by active display defining module 490 to adjust the portion of combined pixel array data 489 of canvas 601 that may be actively displayed as active pixel array data 499 on display 212, as shown by screen 600h of FIG. 4H. For example, as shown in FIG. 4H, a pulled canvas portion 601z' of canvas 601 may be actively displayed by screen 600h of display 212. Such a pull gesture user input may expand the portion of canvas 601 actively displayed by second device 200.

Continuing with the example of FIGS. 4H and 4I, based on the active display adjustment input information 421 received by active display adjusting module 420 of second electronic device 200, active display adjusting module 420 may generate an active display adjustment input command 429 that not only may be received and processed by active display defining module 490 to adjust the portion of combined pixel array data 489 of canvas 601 that may be actively displayed as active pixel array data 499 on display 212 as pulled canvas portion 601z' of screen 600h of display 212, but that also may be received and processed (i.e., as received outline moving command 341) by graphical display system 301 of first electronic device 100 to generate at least a portion of new pixel array data that may present an adjusted second device outline 602 at the appropriate position on canvas 501 of screen 500h of display 112. Adjusted second device outline 602 may be configured to identify on canvas 501 of screen 500h the portion of collaborative artwork 11 on canvas 501 that is currently actively displayed by pulled canvas portion 601z' on screen 600h of display 212 (i.e., the pulled portion from points P20/P21 to points P18/P19 of synched canvases 501 and 601).

Figure 4J:
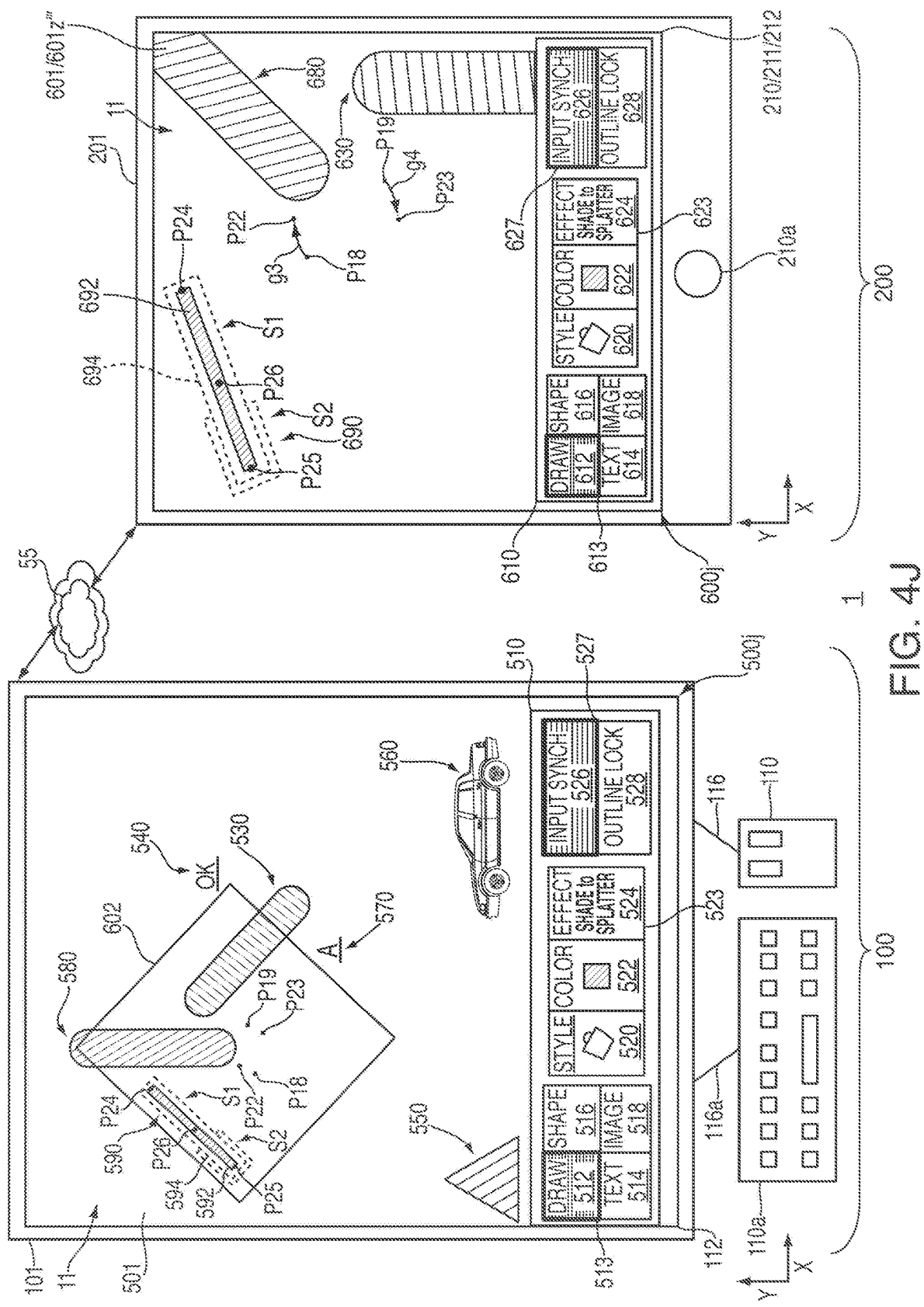

As yet another example, a user may interact with second device 200 to generate input information for rotating rather than pinching or pulling canvas 601 to change the portion of canvas 601 that may be displayed on display 212. As shown by screen 600i of FIG. 4I, for example, a user of second electronic device 200 may provide a multi-touch "rotate" user input gesture on touch screen 211 by imparting a first touch event or gesture from point P18 to point P22 in the direction of arrow g3 on canvas 601, while also imparting a second touch event or gesture from point P19 to point P23 in the direction of arrow g4 on canvas 601, which may change the orientation of display 212 with respect to the segments between the set points. In response to a user interacting with second device 200 to identify the adjusted portion of canvas 601 to be actively displayed on display 212 (e.g., rotate gesture points P18, P19, P22, and P23 with touch screen I/O component 211), active display adjusting module 420 may receive certain active display adjustment input information 421 and may then generate a particular active display adjustment input command 429 (e.g., an active display adjustment input command with the representative syntax "COMMAND: CLASS=ACTIVE DISPLAY ADJUSTMENT INPUT; ADJUST=ROTATE; STARTPOINT1=P18; ENDPOINT1=P22; STARTPOINT2=P19; ENDPOINT2=P23"). Such an active display adjustment input command 429 may then be processed by active display defining module 490 to adjust the portion of combined pixel array data 489 of canvas 601 that may be actively displayed as active pixel array data 499 on display 212, as shown by screen 600j of FIG. 4J. For example, as shown in FIG. 4J, a rotated canvas portion 601z''' of canvas 601 may be actively displayed by screen 600j of display 212. Such a rotate gesture user input may rotate the portion of canvas 601 actively displayed by second device 200.

It is to be understood that a user may interact with second device 200 to rotate the actively displayed portion of canvas 601 in a counter-clockwise direction, rather than the clockwise direction shown with respect to FIGS. 4I and 4J. It is also to be understood that a rotate gesture user input for changing the portion of canvas 601 that may be displayed on display 212 may be achieved in any other suitable way. For example, a user of second device 200 may rotate device 200 within the X-Y plane of FIG. 4I in the direction of arrow R (e.g., with respect to first device 100), and that movement may be detected by sensor 214 of second device 200 and incorporated into active display adjustment input information 421 that may be received and processed by module 420.

Continuing with the example of FIGS. 4I and 4J, based on the active display adjustment input information 421 received by active display adjusting module 420 of second electronic device 200, active display adjusting module 420 may generate an active display adjustment input command 429 that not only may be received and processed by active display defining module 490 to adjust the portion of combined pixel array data 489 of canvas 601 that may be actively displayed as active pixel array data 499 on display 212 as rotated canvas portion 601z''' of screen 600j of display 212, but that also may be received and processed (i.e., as received outline moving command 341) by graphical display system 301 of first electronic device 100 to generate at least a portion of new pixel array data that may present an adjusted second device outline 602 at the appropriate position on canvas 501 of screen 500j of display 112. Adjusted second device outline 602 may be configured to identify on canvas 501 of screen 500j the portion of collaborative artwork 11 on canvas 601 that is currently actively displayed by rotated canvas portion 601z''' on screen 600j of display 212. It is to be understood that any user interaction with first device 100 to move or otherwise change the size or orientation of outline 602 on canvas 501 of display 112 may alternatively be accomplished through appropriate user interaction with second device 200 to pan or otherwise change the size or orientation of the actively displayed portion of canvas 601 on display 212.

Continuing with the example of FIG. 4J, a user of first electronic device 100 may select input synch option 526 of menu 510 and/or a user of second electronic device 200 may select input synch option 626 of menu 610. When input synch options 526 and 626 are selected, system 1 may be configured such that whenever a user interacts with first device 100 to adjust a menu selection of menu 510 or to move a cursor or user position on canvas 501, the same changes may occur on second device 200 as if a user had interacted directly with second device 200, and vice versa. Therefore, as also shown in FIG. 4J, because input synch options 526 and 626 are selected, a user of first electronic device 100 and/or a user of second electronic device 200 may select drawing stroke input option 512/612 for creating a new free-form drawing stroke in artwork 11 on canvases 501/601. Moreover, when a user selects drawing stroke input option 512/612, drawing stroke graphical object style input option 520/620 may allow the user to select a drawing stroke input tool from a group of various pre-defined drawing stroke input tools or stamps (e.g., a "paint brush" drawing stroke input tool, as shown in FIG. 4J), drawing stroke graphical object color input option 522/622 may allow the user to select a color from a group of various pre-defined drawing stroke colors (e.g., a solid color represented by "■", as shown in FIG. 4J), and drawing stroke graphical object effect input option 524/624 may allow the user to select one or more effects to be applied to the drawing stroke from a group of various pre-defined drawing stroke effects (e.g., a "shake to splatter" effect, as shown in FIG. 4J). It is to be understood that additional or alternative pre-defined drawing stroke input tools of various other pre-defined shapes, colors, effects, and other various pre-defined drawing stroke graphical object properties may also be provided by sub-menu 523/623 of menu 510/610 when drawing stroke input option 512/612 is selected.

Any selections made by the user with respect to the options provided by menus 510/610 may be received by graphical display systems 301/401 of electronic devices 100/200 for generating and displaying drawing stroke graphical object content on canvases 501/601. For example, as shown in FIG. 3B, graphical command sharing module 450 may include an input synch register 452. When input synch option 626 is selected (e.g., by a user interaction with menu 610 of second device 200), that selection may generate specific input information 411 that may generate one or more menu generated graphical input commands 419, which may set input synch register 452 in graphical command sharing module 450. When input synch register 452 is set, then graphical command sharing module 450 may be configured to pass certain menu generated graphical input commands 419 on to graphical display system 301 of first device 100 such that similar changes may be made to menu 510 of screen 500j of FIG. 4J (e.g., for presenting shading indicia at the portion of screen 500j identifying input option 512 in menu 510 of display 112 if a user of second device 200 initially selects option 612 in menu 610).

Once options 512/612, 520/620, 522/622, and 524/624 of menus 510/610 have been selected and synchronized for creating a drawing stroke graphical object (e.g., with a paint brush drawing stroke input tool of a particular color and a "shake to splatter" effect), and once the selections have been received by graphical display systems 301/401 and represented on displays 112/212 in menus 510/610, a user may then interact with either first device 100 or second device 200 to generate one or more new drawing stroke graphical objects in artwork 11 on both of canvases 501 and 601 according to the selected options. For example, when a user interacts with second device 200, based on any appropriate drawing stroke graphical object input information 411, which may be generated by the user (e.g., using input component 210 and/or input component 210a) and/or any application running on device 200 (e.g., application 203), graphical input command generating module 410 may be configured to define and generate at least one new drawing stroke graphical object input command 419. This new drawing stroke graphical object input command 419 may then be processed by pixel array generating module 480, and eventually by active display generating module 490 as new active drawing stroke graphical object pixel array data 499 for presentation on display 212.

For example, as also shown by screen 600j of FIG. 4J, a user may interact with graphical display system 401 to generate a new drawing stroke graphical object 690 in artwork 11 on canvas 601. As shown, drawing stroke graphical object 690 may include a straight uniform paint brush stroke body portion 692 extending along a trail path from a starting point P24 on canvas 601 to an ending point P25 on canvas 601 with the selected drawing stroke properties of options 620, 622, and 624. For example, in response to a user defining a trail path for a new drawing stroke graphical object (e.g., by dragging a finger along canvas 601 from point P24 to point P25 with touch screen input component 210), graphical input command generating module 410 may receive certain drawing stroke input information 411 and then generate a particular drawing stroke input command 419. This particular drawing stroke input command 419 may be received by processing module 408 of graphical display system 401 to generate straight uniform paint brush stroke body portion 692 of new drawing stroke graphical object 690 on display 212.

The selected "shake to splatter" input effect may increase the distance that additional drawing stroke graphical object data may be stamped away from body portion 692 of the stamped trail of the paint brush input tool. For example, as shown in FIG. 4J, drawing stroke graphical object 690 may also include a splatter portion 694, which may be additional drawing stroke graphical object data representative of paint brush splatter. Splatter portion 694 may extend a first splatter distance S1 along and away from a first portion of body portion 692 (e.g., adjacent point P24) and that may extend a second splatter distance S2 along and away from another portion of body portion 692 (e.g., adjacent point P25). The splatter distance of splatter portion 694 of drawing stroke graphical object 690 may be determined by any suitable data accessible to second device 200 from any suitable source. For example, in some embodiments, the splatter distance of drawing stroke graphical object 690 may be determined by a detected magnitude of a particular movement of second device 200 at a particular time (e.g., as a user of device 200 may define a trail path for new drawing stroke graphical object 690 by dragging a finger along canvas 601 from point P24 to point P25 with touch screen input component 210, the user may also define one or more suitable splatter distances by shaking device 200 (e.g., as may be detected by sensor 214)).

Based on the selected properties of options 620, 622, and 624, the trail path defined by points P24 and P25, and any received splatter distance data, graphical command generating module 410 may generate a new drawing stroke graphical object input command 419, which may have the following representative syntax: "COMMAND:

CLASS=GRAPHICAL OBJECT INPUT; TYPE=DRAWING STROKE; STYLE=PAINT BRUSH; COLOR=BLACK; START:P24; END:P25; EFFECT=SHAKE TO SPLATTER; SHAKESTART=S1; SHAKEEND=S2". Such a new drawing stroke input command 419 generated by graphical command generating module 410 may then be processed by graphical command processing module 408 (e.g., modules 480, 488, and/or 490) to generate at least a portion of new drawing stroke pixel array data 499 that may present both portions 692 and 694 of new drawing stroke graphical object 690 at the appropriate position on canvas 601 of screen 600j of display 212. It is to be understood that the above representative syntax of new drawing stroke input command 419 for generating new drawing stroke graphical object 690 is merely representative, and that any suitable syntax may be used by application 203 of second electronic device 200 for generating a new drawing stroke input command 419 in response to received drawing stroke input information 411. For example, any effect that may be selected by input options 524/624 for any suitable graphical object may alter that graphical object in any suitable way using any suitable data accessible from any suitable source.

Although only starting point P24 and ending point P25 of the trail of new drawing stroke graphical object 690 may be defined by the exemplary representative syntax of new drawing stroke input command 419, it is to be understood that, in other embodiments, multiple additional points of the path may be defined by the new drawing stroke input information 411. For example, if the new drawing stroke is a straight line (e.g., as is shown in FIG. 4J by the straight line of drawing stroke graphical object 690 between starting point P24 and ending point P25), graphical command generating module 410 may only define a new drawing stroke input command 419 with a starting point and an ending point in order for the new drawing stroke input command 419 to adequately instruct graphical command processing module 408 to generate the appropriate path of the new drawing stroke graphical object on canvas 601. However, if the new drawing stroke is not a straight line (e.g., a drawing stroke that follows a curved or otherwise non-linear path), or if any effect determined by input option 624 is not static along the trail of the drawing stroke, graphical command generating module 410 may define a new drawing stroke input command 419 with multiple additional points along the path between the starting point and the ending point in order for the new drawing stroke input command 419 to adequately instruct graphical command processing module 408 to generate the appropriate path of the new drawing stroke graphical object with the appropriate effect on canvas 601.

In some embodiments, rather than generating a single new drawing stroke input command 419 for a new drawing stroke graphical object to be generated on canvas 601, graphical command generating module 410 may generate multiple new drawing stroke input commands 419, each of which may adequately instruct graphical command processing module 408 to generate a particular portion of the new drawing stroke graphical object on canvas 601. For example, as shown in FIG. 4J, the trail path of drawing stroke graphical object 690 may be defined by starting point P24, ending point P25, and an intermediate point P26, such that graphical command generating module 410 may generate two drawing stroke graphical object input commands 419. Moreover, as shown in FIG. 4J, the splatter distance of drawing stroke graphical object 690 may extend a first splatter distance S1 along the portion of the trail between points P24 and P26, and a second splatter distance S2 along the portion of the trail between points P26 and P25. The first of such two drawing stroke graphical object input commands 419 for defining drawing stroke graphical object 690 may have the following representative syntax: "COMMAND: CLASS=GRAPHICAL OBJECT INPUT; TYPE=DRAWING STROKE; STYLE=PAINT BRUSH; COLOR=BLACK; START:P24; END:P26; EFFECT=SHAKE TO SPLATTER; SHAKESTART=S1; SHAKEEND=S1", while the second of such two drawing stroke graphical object input commands 419 for defining drawing stroke graphical object 690 may have the following representative syntax: "COMMAND: CLASS=GRAPHICAL OBJECT INPUT; TYPE=DRAWING STROKE; STYLE=PAINT BRUSH; COLOR=BLACK; START:P26; END:P25; EFFECT=SHAKE TO SPLATTER; SHAKESTART=S2; SHAKEEND=S2". Each one of these two drawing stroke input commands 419 generated by graphical command generating module 410 may be processed by graphical command processing module 408 to generate at least a portion of new drawing stroke pixel array data 499 that may present new drawing stroke graphical object 690 at the appropriate position on canvas 601 of screen 600j of display 212.

As mentioned, virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. Therefore, at least some graphical object input commands 419 generated by graphical command generating module 410 may be provided to communications circuitry 206 of second electronic device 200 as shared graphical object input commands 459. Continuing with the example of FIG. 4J, based on the selected properties of options 620, 622, and 624, points P24-P26 of the trail path, and the splatter distance(s) along the trail path defined by input information 411 received by second electronic device 200, graphical command generating module 410 may generate at least two new drawing stroke graphical object input commands 419 that not only may be received and processed by pixel array generating module 480 to generate at least a portion of new drawing stroke pixel array data 485 that may present new drawing stroke graphical object 690 at the appropriate position on canvas 601 of screen 600j of display 212, but that also may be received and processed by graphical command sharing module 450. Graphical command sharing module 450 may pass on the new drawing stroke graphical object input commands 419 as shared new drawing stroke graphical object input commands 459 to communications circuitry 206, which may provide shared new drawing stroke graphical object input commands 459 to graphical display system 301 of first device 100 (e.g., as received new drawing stroke graphical object input commands 361) to generate new drawing stroke pixel array data 389 that may present a new drawing stroke graphical object 590 at the appropriate position on canvas 501 of screen 500j of display 112.

Such received new drawing stroke graphical object input commands 361 may be received by pixel array requesting module 360 of graphical display system 301 of first device 100. For example, pixel array requesting module 360 may process the received new drawing stroke graphical object input commands 361 and may pass those received new drawing stroke graphical object input commands 361 on to pixel array generating module 380, such that at least a portion of new drawing stroke pixel array data 399 may be generated to present at least a portion of a new drawing stroke graphical object 590 at the appropriate position on canvas 501 of screen 500*j* of display 112.

In some embodiments, first electronic device 100 may not be provided with a sensor 114 and, therefore, may not be provided with the ability to allow a user to interact with first device 100 to generate appropriate splatter distance data (e.g., as described above with respect to splatter distances S1 and S2 generated by the interaction of a user of second device 200 with sensor 214 of second device 200). Although such a lack of a sensor 114 may prevent a user of first electronic device 100 from generating one or more drawing stroke input commands 319 similar to drawing stroke commands 419 described above that may indicate splatter distance data, such a lack of a sensor 114 may not prevent first electronic device 100 from receiving and processing such drawing stroke commands 419 (e.g., as received new drawing stroke graphical object input commands 361) that indicate splatter distance data for generating new drawing stroke graphical object 590 on display 112.

Alternatively, rather than a user interacting with second device 200 for generating new drawing stroke input information 411 to define new drawing stroke graphical object 690 on canvas 601 and then sharing graphical input commands with first device 100 to create new drawing stroke graphical object 590 on canvas 501, a user may instead interact with first device 100 for generating new drawing stroke input information 311 to define at least a portion of new drawing stroke graphical object 590 on canvas 501. For example, even in such embodiments where first electronic device 100 may not be provided with a sensor 114 configured to allow a user to interact with first device 100 to generate appropriate splatter distance data (e.g., as described above with respect to splatter distances S1 and S2 generated by the interaction of a user of second device 200 with sensor 214 of second device 200), a user may interact with first device 100 to define at least some of the new drawing stroke input information 311 for defining new drawing stroke graphical object 590/690 on canvases 501/601 of artwork 11.

Once options 512/612, 520/620, 522/622, and 524/624 of menus 510/610 have been selected and synchronized for creating a drawing stroke graphical object (e.g., with a paint brush drawing stroke input tool of a particular color and a "shake to splatter" effect), a user may then interact with first device 100 to define at least a portion of a new drawing stroke graphical object in artwork 11 according to the selected options. For example, when a user interacts with first device 100, based on any appropriate drawing stroke graphical object input information 311, which may be generated by the user (e.g., using input component 110 and/or input component 110*a*) and/or any application running on device 100 (e.g., application 103), graphical input command generating module 310 may be configured to define and generate at least one new drawing stroke graphical object input command 319. This new drawing stroke graphical object input command 319 may then be processed by pixel array generating module 380, and eventually by active display generating module 390 as new active drawing stroke graphical object pixel array data 399 for presentation on display 112.

For example, a user may interact with graphical display system 301 to generate a portion of new drawing stroke graphical object 590 in artwork 11 on canvas 501 (e.g., the portion of new drawing stroke graphical object 590 that may be independent from the portion defined by splatter distance data). As shown in FIG. 4J, for example, drawing stroke graphical object 590 may include a straight uniform paint brush stroke body portion 592 extending along a trail path from a starting point P24 on canvas 501 to an ending point P25 on canvas 501, via point P26, with the selected drawing stroke properties of options 520, 522, and 524. For example, in response to a user defining a trail path for a new drawing stroke graphical object (e.g., by dragging a cursor along canvas 501 from point P24, via point P26, to point P25 with mouse input component 110), graphical input command generating module 310 may receive certain drawing stroke input information 311 and then generate a particular drawing stroke input command 319. This particular drawing stroke input command 319 may be received by processing module 308 of graphical display system 301 to generate straight uniform paint brush stroke body portion 592 of new drawing stroke graphical object 590 on display 112.

As mentioned, the selected "shake to splatter" input effect may adjust the distance that additional drawing stroke graphical object data may be stamped away from the body portion of the stamped trail of the paint brush input tool. For example, as shown in FIG. 4J, drawing stroke graphical object 590 may also include a splatter portion 594, which may extend a first splatter distance S1 along and away from a first portion of body portion 592 (e.g., adjacent point P24) and that may extend a second splatter distance S2 along and away from another portion of body portion 592 (e.g., adjacent point P25). The splatter distance of splatter portion 594 of drawing stroke graphical object 590 may be determined by any suitable data accessible to first device 100 from any suitable source. For example, in some embodiments, splatter distance of splatter portion 594 may be determined by a detected magnitude of a particular movement of second device 200 at a particular time (e.g., as a user of device 100 may define body portion 592 of new drawing stroke graphical object 590 by dragging a cursor along canvas 501 from point P24 to point P25 with mouse input component 110, the same or another user may interact with device 200 to define one or more suitable splatter distances by shaking device 200 (e.g., as may be detected by sensor 214)). Therefore, a user may interact with first device 100 to define a first portion of a new graphical object while the same user or a different user may concurrently interact with second device 200 to define another portion of the new graphical object. This may allow a user of first device 100 to leverage the ease with which a mouse input component 110 of device 100 may define a trail or body portion of the new drawing stroke graphical object along canvas 501 while a user of second device 200 may leverage the ease with which portable device 200 equipped with a sensor 214 may be shaken to define one or more splatter distances of the new drawing stroke graphical object.

For example, based on the selected properties of options 520, 522, and 524 of device 100, and based on the trail path defined by points P24, P26, and P25 defined by input information 311, graphical command generating module 310 may generate a single new drawing stroke graphical object input command 319, which may have the following representative syntax: "COMMAND: CLASS=GRAPHICAL OBJECT INPUT; TYPE=DRAWING STROKE; STYLE=PAINT BRUSH; COLOR=BLACK; START:P24; END:P25; EFFECT=SHAKE TO SPLATTER; SHAKESTART=<UNKNOWN>; SHAKEEND=<UNKNOWN>", or two drawing stroke graphical object input commands 319, which may have the following representative syntax: "COMMAND:

CLASS=GRAPHICAL OBJECT INPUT; TYPE=DRAWING STROKE; STYLE=PAINT BRUSH; COLOR=BLACK; START:P24; END:P26; EFFECT=SHAKE TO SPLATTER; SHAKESTART=<UNKNOWN>; SHAKEEND=<UNKNOWN>" and "COMMAND: CLASS=GRAPHICAL OBJECT INPUT; TYPE=DRAWING STROKE; STYLE=PAINT BRUSH; COLOR=BLACK; START:P26; END:P25; EFFECT=SHAKE TO SPLATTER; SHAKESTART=<UNKNOWN>; SHAKEEND=<UNKNOWN>". Such new drawing stroke input commands 319 generated by graphical command generating module 310 may then be processed by graphical command processing module 308 (e.g., modules 380, 388, and/or 390) to generate at least a portion of new drawing stroke pixel array data 399 that may present at least a portion of new drawing stroke graphical object 590 at the appropriate position on canvas 501 of screen 500j of display 112 (e.g., body portion 592 of new drawing stroke graphical object 590).

As mentioned, virtual drawing space application 103 of first electronic device 100 may be synched with virtual drawing space application 203 of second electronic device 200 such that a single work of art (e.g. artwork 11) may be presented on both first device 100 and second device 200, and such that the single work of art may be collaboratively created and/or edited through both user interactions with first device 100 and user interactions with second device 200. Therefore, at least some graphical object input commands 319 generated by graphical command generating module 310 may be provided to communications circuitry 106 of first electronic device 100 as shared graphical object input commands 359. Continuing with the example of FIG. 4J, based on the selected properties of options 520, 522, and 524, and points P24-P26 of the trail path defined by input information 311, graphical command generating module 310 may generate at least two new drawing stroke graphical object input commands 319 that not only may be received and processed by pixel array generating module 380 to present body portion 592 of new drawing stroke graphical object 590 at the appropriate position on canvas 501 of screen 500j of display 112, but that also may be received and processed by graphical command sharing module 350. Graphical command sharing module 350 may pass on the new drawing stroke graphical object input commands 319 as shared new drawing stroke graphical object input commands 359 to communications circuitry 106, which may provide shared new drawing stroke graphical object input commands 359 to graphical display system 401 of second device 200 (e.g., as received new drawing stroke graphical object input commands 461) to generate new drawing stroke pixel array data 489 that may present at least a portion of new drawing stroke graphical object 690 at the appropriate position on canvas 601 of screen 600j of display 212. Such received new drawing stroke graphical object input commands 461 may be received by pixel array requesting module 460 of graphical display system 401 of second device 200. For example, pixel array requesting module 460 may process the received new drawing stroke graphical object input commands 461 and may pass those received new drawing stroke graphical object input commands 461 on to pixel array generating module 480, such that at least a portion of new drawing stroke pixel array data 499 may be generated to present body portion 692 of new drawing stroke graphical object 690 at the appropriate position on canvas 601 of screen 600j of display 212.

As mentioned, first electronic device 100 may not be provided with the ability to allow a user to interact with first device 100 to generate appropriate splatter distance data, such that new drawing stroke graphical object input commands 319 generated and shared as new drawing stroke graphical object input commands 359 by first device 100, and, thus, received new drawing stroke graphical object input commands 461, may not include any known splatter distance data for the new graphical object (e.g., for defining splatter portion 594/694 of graphical object 590/690). Regardless, system 1 may be configured such that second device 200 may process such input commands and may potentially supplement such input commands with known splatter distance data for the new graphical object. For example, in addition to or as an alternative to passing received new drawing stroke graphical object input commands 461 on to pixel array generating module 480, pixel array requesting module 460 may process received new drawing stroke graphical object input commands 461 and instruct graphical command sharing module 450 to share any accessible data that may not have been included in the received new drawing stroke graphical object input commands 461.

For example, in response to receiving and processing a new drawing stroke graphical object input command 461 having the following representative syntax: "COMMAND: CLASS=GRAPHICAL OBJECT INPUT; TYPE=DRAWING STROKE; STYLE=PAINT BRUSH; COLOR=BLACK; START:P24; END:P26; EFFECT=SHAKE TO SPLATTER; SHAKESTART=<UNKNOWN>; SHAKEEND=<UNKNOWN>", pixel array requesting module 460 may instruct graphical command sharing module 450 with a supplemental data request command 465 to provide first device 100 with any known splatter distance data that may be appropriate for the received command 461. In some embodiments, a user of second device 200 may have been shaking device 200 in order to generate certain input information 411 that may cause input command generating module 410 to generate a new drawing stroke graphical object input command 419 that may have the following representative syntax: "COMMAND: CLASS=GRAPHICAL OBJECT INPUT; TYPE=DRAWING STROKE; STYLE=PAINT BRUSH; COLOR=BLACK; START:<UNKNOWN>; END:<UNKNOWN>; EFFECT=SHAKE TO SPLATTER; SHAKESTART=S1; SHAKEEND=S1". In response to receiving a supplemental data request command 465 from module 460 and such a new drawing stroke graphical object input command 419 from module 410, module 450 may be configured to generate a new shared graphical object input command 459 that may have the following representative syntax: "COMMAND: CLASS=GRAPHICAL OBJECT INPUT; TYPE=DRAWING STROKE; STYLE=PAINT BRUSH; COLOR=BLACK; START:P24; END:P26; EFFECT=SHAKE TO SPLATTER; SHAKESTART=S1; SHAKEEND=S1" (e.g., to combine supplemental data request command 465 from module 460 and such a new drawing stroke graphical object input command 419 into new shared graphical object input command 459). Such a new shared graphical object input command 459 may be received by first device 100 as a received input command 361, which may be shared with pixel array generating module 380 for creating and/or updating new drawing stroke graphical object 590 on canvas 501 with appropriately known splatter distance data (e.g., for creating splatter portion 594 of graphical object 590).

Alternatively, in response to receiving a supplemental data request command 465 from module 460 and such a new drawing stroke graphical object input command 419 from module 410, module 450 may be configured to pass the new drawing stroke graphical object input command 419 on as a new shared graphical object input command 459, which may be received by first device 100 as a received input command 361 for creating splatter portion 594 of graphical object 590. Additionally or alternatively, in response to receiving a supplemental data request command 465 from module 460 and such a new drawing stroke graphical object input command 419 from module 410, module 450 may be configured to generate a requested supplemental data command 467 and provide such a requested supplemental data command 467 to module 460. Module 460 may then receive such a requested supplemental data command 467 and may supplement the received input command 461 to provide a supplemented received input command 461 to module 480 for creating new drawing stroke graphical object 690 on canvas 601 and/or updating body portion 692 of new drawing stroke graphical object 690 on canvas 601 with splatter data 694. It is to be understood that graphical display system 301 may also be configured to generate and share supplemental data request commands 365 and requested supplemental data commands 367 that may be similar to supplemental data request commands 465 and requested supplemental data commands 467 of graphical display system 401, and, therefore, each may not be described independently in greater detail.

System 1 may be configured to associate an input command generated by first device 100 with an input command generated by second device 200 in any suitable way such that each device may process at least a portion of each command to generate the same single new graphical object on its respective canvas for artwork 11. In some embodiments, each generated command may include a timestamp such that each device may synch two or more commands with one another. For example, following the above example, a new drawing stroke graphical object input command 319 generated by first device 100 and shared with second device 200 may be time stamped to have the following representative syntax: "COMMAND: CLASS=GRAPHICAL OBJECT INPUT; TYPE=DRAWING STROKE; STYLE=PAINT BRUSH; COLOR=BLACK; START:P24; END:P26; EFFECT=SHAKE TO SPLATTER; SHAKESTART=<UNKNOWN>; SHAKEEND=<UNKNOWN>; TIMESTAMP=T1", and a new drawing stroke graphical object input command 419 generated by second device 200 and shared with first device 100 may be time stamped to have the following representative syntax: "COMMAND: CLASS=GRAPHICAL OBJECT INPUT; TYPE=DRAWING STROKE; STYLE=PAINT BRUSH; COLOR=BLACK; START:<UNKNOWN>; END:<UNKNOWN>; EFFECT=SHAKE TO SPLATTER; SHAKESTART=S1; SHAKEEND=S1; TIMESTAMP=T1". At least based on the commands sharing the same timestamp, or timestamps within a particular threshold time of one another, each device may associate the two commands for defining portions of the same new graphical object. In some embodiments, the two commands may be combined into a single combined command and the single combined command may be processed for generating pixel array data.

Commands may additionally or alternatively be provided with some kind of "action identifier" attached to them. For example, two users on two devices might be drawing strokes at the same time. The action identifier of each command may just be a distinct numerical ID. An action may be assigned an ID when it is initiated (e.g., when a mouse input is initially clicked or a touch screen is initially touched for generating the command). Subsequent actions (e.g., defining additional points along a drawing stroke trail, etc.) may include the same ID so that the receiving device may know which graphical object to associate the command with. After the action is completed (e.g., after the mouse button is released or after the finger touch is lifted), a subsequent action may utilize a new ID. A scheme may be required to make sure that different devices don't generate the same action ID. For example, this could be as simple as prefixing each ID with a number based on the order in which the device connected itself with one or more other devices. Certain actions that are "one shot" and don't require a state to be maintained across multiple network command messages may not need to assign an action ID. For example, such one shot commands may include color change commands, object creation commands, and shake magnitude commands.

In some embodiments, a user may interact with one device to generate one or more input commands, but that device may determine that it would rather leverage the processing capabilities of another device than process the generated commands itself. For example, a user may interact with I/O interface 211 of second device 200 to generate a new graphical object input command 419 using graphical display system 401. However, rather than utilizing its own graphical command processing module 408 for processing this new generated graphical object input command 419 in order to generate the pixel array data for presenting a new graphical object on display 212, graphical display system 401 of second device 200 may instead utilize graphical command processing module 308 of first device 100 for processing this new generated graphical object input command 419.

Figure 4K:
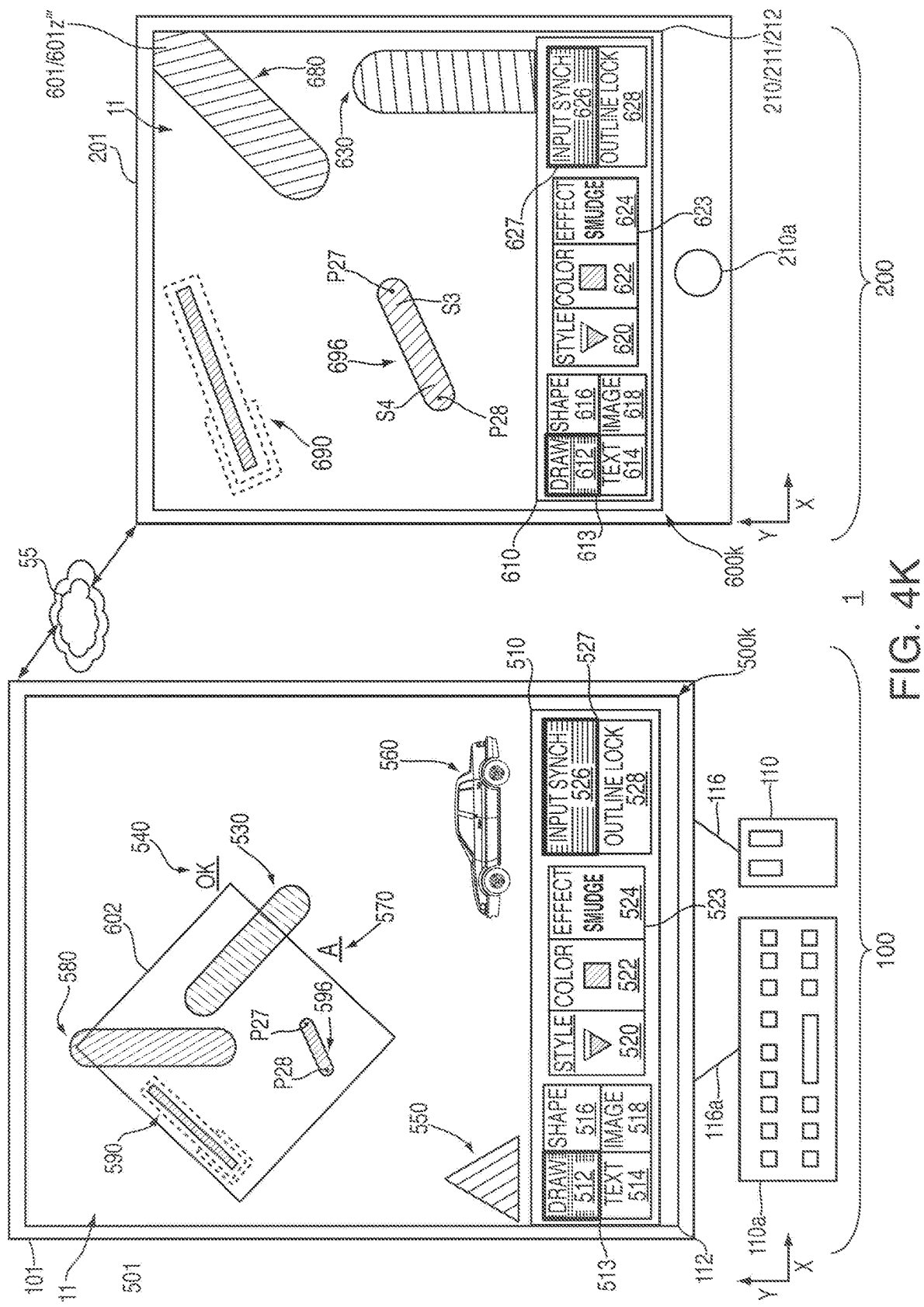

As shown in FIG. 4K, for example, a user of second electronic device 200 may select drawing stroke input option 512/612 for creating a new free-form drawing stroke in artwork 11 on canvases 501/601. Moreover, the user may interact with drawing stroke graphical object style input option 620 to select a drawing stroke input tool from a group of various pre-defined drawing stroke input tools or stamps (e.g., a "pencil" drawing stroke input tool, as shown in FIG. 4K), drawing stroke graphical object color input option 622 to select a color from a group of various pre-defined drawing stroke colors (e.g., a solid color represented by "■", as shown in FIG. 4K), and drawing stroke graphical object effect input option 624 to select one or more effects to be applied to the drawing stroke from a group of various pre-defined drawing stroke effects (e.g., a "smudge" effect, as shown in FIG. 4K). It is to be understood that additional or alternative pre-defined drawing stroke input tools of various other pre-defined shapes, colors, effects, and other various pre-defined drawing stroke graphical object properties may also be provided by submenu 523/623 of menu 510/610 when drawing stroke input option 512/612 is selected.

Once options 612, 620, 622, and 624 of menu 610 have been selected for creating a drawing stroke graphical object (e.g., with a pencil drawing stroke input tool of a particular color and a "smudge" effect), a user may then interact with second device 200 to generate one or more new drawing stroke graphical objects in artwork 11 on both of canvases 501 and 601 according to the selected options. For example, when a user interacts with second device 200, based on any appropriate drawing stroke graphical object input information 411, which may be generated by the user (e.g., using input component 210 and/or input component 210*a*) and/or any application running on device 200 (e.g., application 203), graphical input command generating module 410 may be configured to define and generate at least one new drawing stroke graphical object input command 419. However, this new drawing stroke graphical object input command 419 may not be processed by pixel array generating module 480 for eventually generating new active drawing stroke graphical object pixel array data 499 for presentation on display 212. Instead, for any suitable reason, graphical display system 401 may be configured to determine that it cannot or will not process this new drawing stroke graphical object input command 419. For example, module 480 may determine that second device 200 does not currently have enough processing power or battery power to currently handle the processing of this new drawing stroke graphical object input command 419 for generating the associated pixel array data to be displayed on display 212. As another example, second device 200 may simply not be provided with the adequate processing capabilities to handle certain computations that may be associated with this new drawing stroke graphical object input command 419 (e.g., computations associated with a smudging effect).

For example, as also shown by screen 600*k* of FIG. 4*k*, a user may interact with graphical display system 401 to generate a new drawing stroke graphical object 696 in artwork 11 on canvas 601. As shown, drawing stroke graphical object 696 may include a pencil stroke extending along a trail path from a starting point P27 on canvas 601 to an ending point P28 on canvas 601 with the selected drawing stroke properties of options 620, 622, and 624. For example, in response to a user defining a trail path for a new drawing stroke graphical object (e.g., by dragging a finger along canvas 601 from point P27 to point P28 with touch screen input component 210), graphical input command generating module 410 may receive certain drawing stroke input information 411 and then generate at least a portion of a particular drawing stroke input command 419.

The selected "smudge" input effect may vary the opacity of the graphical object data that may be stamped by the pencil input tool along the stamped trail. For example, as shown in FIG. 4K, drawing stroke graphical object 696 may have a varying opacity along its trail (e.g., graphical object 696 may get darker as it extends from point P27 to point P28 on canvas 601). The opacity of drawing stroke graphical object 696 may be determined by any suitable data accessible to second device 200 from any suitable source. For example, in some embodiments, the opacity of drawing stroke graphical object 696 may be determined by a detected magnitude of pressure exerted on second device 200 at a particular time. As just one example, as a user of device 200 may define a trail path for new drawing stroke graphical object 696 by dragging a finger along canvas 601 from point P27 to point P28 using touch screen input component 210, the user may also vary the opacity of new drawing stroke graphical object 696 by gradually increasing the pressure the user applies on to touch screen input component 210 with his or her finger while it is dragged along the trail path (e.g., as may be detected by sensor 214 or touch screen 211 itself). As shown in FIG. 4K, new drawing stroke graphical object 696 may have a smudge opacity S3 at start point P27 and a smudge opacity S4 at end point P28 that is darker than smudge opacity S3.

Based on the selected properties of options 620, 622, and 624, the trail path defined by points P27 and P28, and any received smudge data, graphical command generating module 410 may generate a new drawing stroke graphical object input command 419, which may have the following representative syntax: "COMMAND: CLASS=GRAPHICAL OBJECT INPUT; TYPE=DRAWING STROKE; STYLE=PENCIL; COLOR=BLACK; START:P27; END: P28; EFFECT=SMUDGE; SMUDGESTART=S3; SMUDGEEND=S4". Such a new drawing stroke input command 419 generated by graphical command generating module 410 may then be provided to pixel array generating module 480 and graphical command sharing module 450. However, this new drawing stroke graphical object input command 419 may not be processed by pixel array generating module 480 for eventually generating new active drawing stroke graphical object pixel array data 499 for presentation on display 212. Instead, for any suitable reason, module 450 and/or 480, or any other suitable portion of system 401 may be configured to determine that system 401 cannot or will not process at least a portion of this new drawing stroke graphical object input command 419.

Based on such a determination, not only may graphical command sharing module 450 be configured to provide this new drawing stroke graphical object input command 419 as shared new drawing stroke graphical object input command 459 to first device 100 (e.g., as received new drawing stroke graphical object input command 361, such that first device may generate the appropriate pixel array data 399 for presenting a new drawing stroke graphical object 596 on canvas 501), but graphical command sharing module 450 may also be configured to generate a requested supplemental data command 467 to pixel array sharing module 460. Such a requested supplemental data command 467 may instruct pixel array sharing module 460 to request at least a portion of the pixel array data generated by first device 100 in response to receiving the new drawing stroke graphical object input command 419 (e.g., as received new drawing stroke graphical object input command 361). This requested pixel array data may be received by second device 200 and provided as at least a portion of canvas 601. Therefore, second device 200 may leverage the processing capabilities of first device 100 to receive the pixel array data for a graphical object defined by an input command originally generated by second device 200.

Although system 1 is only shown to include two electronic devices in FIGS. 1-4K, it is to be understood that system 1 may include three or more electronic devices, each of which may communicate with one another to collaborate on a single work of art. The network architecture of system 1 may be configured in many suitable ways. For example, in some embodiments, when a user interacts with a particular device to generate an input command, that device may broadcast the new input command to all of the synched devices within system 1 it is collaborating with (e.g., system 1 may be decentralized). In another embodiment, when a user interacts with a particular device to generate an input command, that device may share the new input command to a particular "master" device within system 1, and that master device may then share the received input command with any other synched devices within system 1. Such a configuration may reduce the number of communication channels between devices and bandwidth in the system but may increase the latency. In some embodiments, more than one outline may be provided over a canvas of a particular device, such that the current actively displayed portion of a shared artwork on two different devices may be identified on the artwork of a third device.

Figure 5:
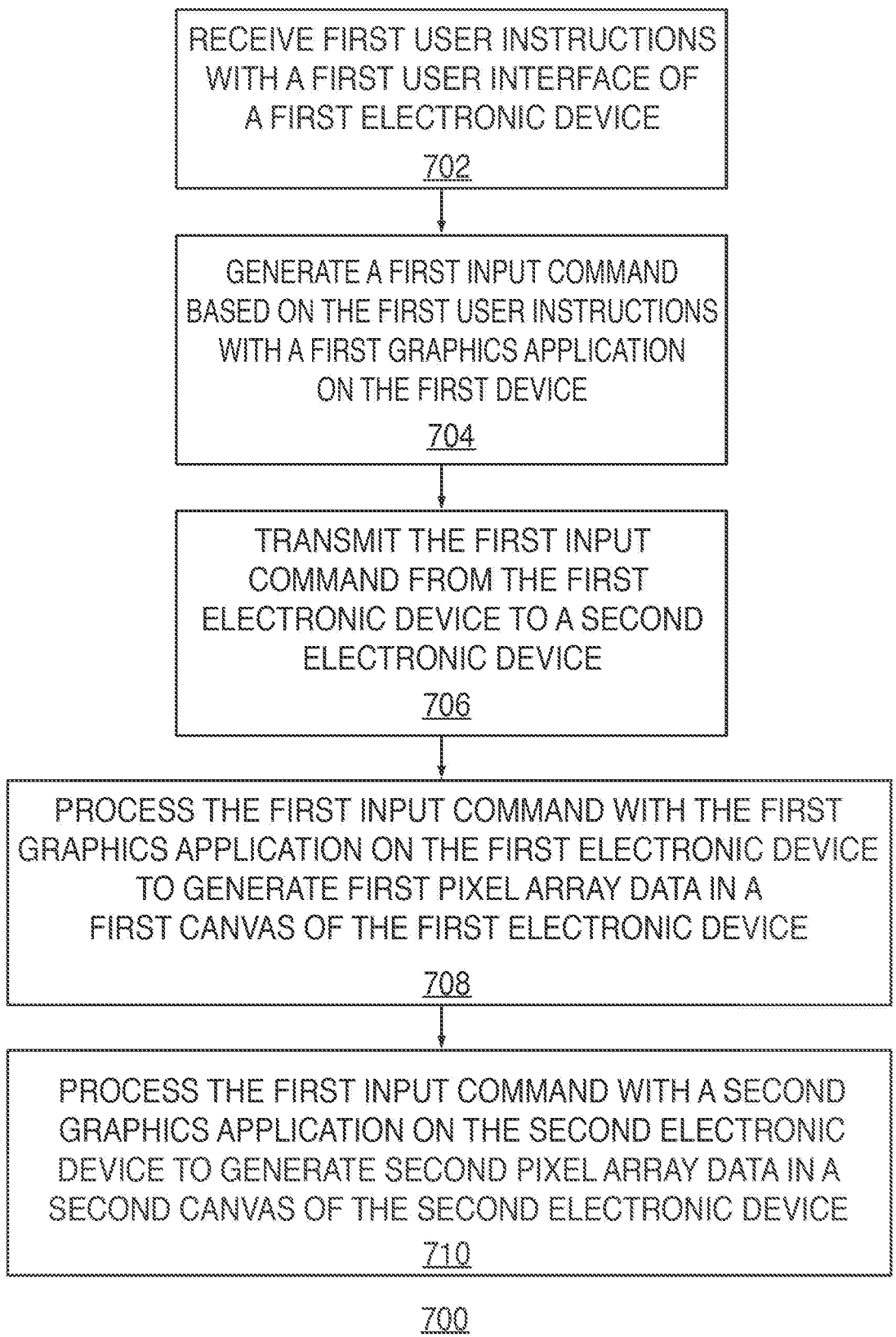
FIGS. 5 and 5A are flowcharts of illustrative processes for managing collaboration on a virtual work of art, in accordance with some embodiments of the invention.

FIG. 5 is a flowchart of an illustrative process 700 for sharing graphical data. Process 700 may begin at step 702 by receiving first user instructions with a first user interface of a first electronic device. For example, as described with respect to FIG. 4B, first device 100 of system 1 may receive input information 303 from a user interacting with input component 110 of first device 100. Next, at step 704, process 700 may include generating a first input command based on the received first user instructions with a first graphics application on the first device. For example, graphics application 103 of first device 100 may generate an input command 305 (e.g., with graphical command generating module 304 of graphical display system 301) based on received input information 303.

Then, at step 706, process 700 may include transmitting the first input command from the first electronic device to a second electronic device. For example, graphical display system 301 of first device 100 may transmit input command 305 as shared input command 305s to second device 200, which may be received as received input command 405r. Process 700 may also include step 708 for processing the first input command with the first graphics application on the first device to generate first pixel array data in a first canvas of the first device. As shown in screen 500b of FIG. 4B, for example, application 103 of first device 100 may process input command 305 to generate pixel array data 309 (e.g., as drawing stroke graphical object 530) in canvas 501 of first device 100. In some embodiments, process 700 may also include step 710 for processing the first input command with a second graphics application on the second device to generate second pixel array data in a second canvas of the second device. As shown in screen 600b of FIG. 4B, for example, application 203 of second device 200 may process received input command 405r to generate pixel array data 409 (e.g., as drawing stroke graphical object 630) in canvas 601 of second device 200.

In some embodiments, the first input command does not include pixel array data. In some embodiments the size of the first pixel array data may be larger than the size of the first input command. For example, the bandwidth required by communications media 55 to share the first pixel array data between first device 100 and second device 200 may be greater than the bandwidth required by communications media 55 to share the first input command between first device 100 and second device 200.

In some embodiments, at least a portion of the transmitting of step 706 may occur at the same time as at least a portion of the processing of the first input command with the first graphics application of step 708. For example, graphical display system 301 may be configured to transmit at least a portion of shared input command 305s at the same time as graphical display system 301 may be configured to process at least a portion of input command 305 with processing module 308. Additionally or alternatively, in some embodiments, at least a portion of the processing of the first input command with the first graphics application of step 708 may occur at the same time as at least a portion of the processing of the first input command with the second graphics application of step 710. For example, graphical display system 301 of first device 100 may be configured to process at least a portion of input command 305 with processing module 308 at the same time as graphical display system 401 of second device 200 may be configured to process at least a portion of shared input command 305s/received input command 405r with processing module 408.

In some embodiments, the first device of process 700 may include more processing capabilities than the second device. In other embodiments, the first user interface of process 700 may include touch input capabilities and the second user interface may not include touch input capabilities. For example, second device 200 may include a touch screen 211 and first device 100 may only include a mouse 110 and a keyboard 110a. In some embodiments, process 700 may also include presenting at least a portion of the first canvas on a first display of the first device and presenting at least a portion of the second canvas on a second display of the second device. In some embodiments, the second display may be larger than the first display (e.g., as shown in FIG. 4A).

In some embodiments, the first graphics application of process 700 and the second graphics application may share a semantic command set. Moreover, in some embodiments of process 700, the pixel array data in the first canvas may be the same as the pixel array data in the second canvas, and the pixel array data in the portion of the first canvas presented on the first display may be different than the pixel array data in the portion of the second canvas presented on the second display. For example, the pixel array data of canvas 501 may be the same as the pixel array data of canvas 601, as each canvas may include the pixel array data of shared artwork 11. However, in some embodiments, only a portion of canvas 601 may be presented on display 212 of second device 200 while the entirety of canvas 501 may be presented on display 112 of first device 100 (see, e.g., FIG. 4F).

In some embodiments, process 700 may also include receiving second user instructions with a second user interface of the second device, generating a second input command based on the received second user instructions with the second graphics application on the second device, transmitting the second input command from the second device to the first device, processing the second input command with the first graphics application on the first device to generate third pixel array data in the first canvas, and processing the second input command with the second graphics application on the second device to generate fourth pixel array data in the second canvas. For example, as described with respect to FIG. 4D, second device 200 of system 1 may receive input information 403 from a user interacting with input component 210 of second device 200. Then graphics application 203 of second device 200 may generate an input command 405 (e.g., with graphical command generating module 404 of graphical display system 401) based on received input information 403. Graphical display system 401 of second device 200 may transmit input command 405 as shared input command 405s to first device 100, which may be received as received input command 305r. As shown in screen 600d of FIG. 4D, for example, application 203 of second device 200 may process input command 405 to generate pixel array data 409 (e.g., as shape graphical object 650) in canvas 601 of second device 200. Moreover, as shown in screen 600d of FIG. 4D, for example, application 103 of first device 100 may process received input command 305r to generate pixel array data 309 (e.g., as shape stroke graphical object 550) in canvas 501 of first device 100. In some embodiments, at least a portion of the transmitting the first input command (e.g., of step 706) may occur at the same time as at least a portion of the transmitting the second input command. Alternatively or additionally, at least a portion of the processing of the first input command on the first device (e.g., of step 708) may occur at the same time as at least a portion of the processing of the second input command on the second device. Moreover, alternatively or additionally, at least a portion of the processing of the first input command on the first device (e.g., of step 708) may occur at the same time as at least a portion of the processing of the second input command on the first device.

It is to be understood that the steps shown in process 700 of FIG. 5 is merely illustrative and that existing steps may be modified or omitted, additional steps may be added, and the order of certain steps may be altered.

Figure 5A:
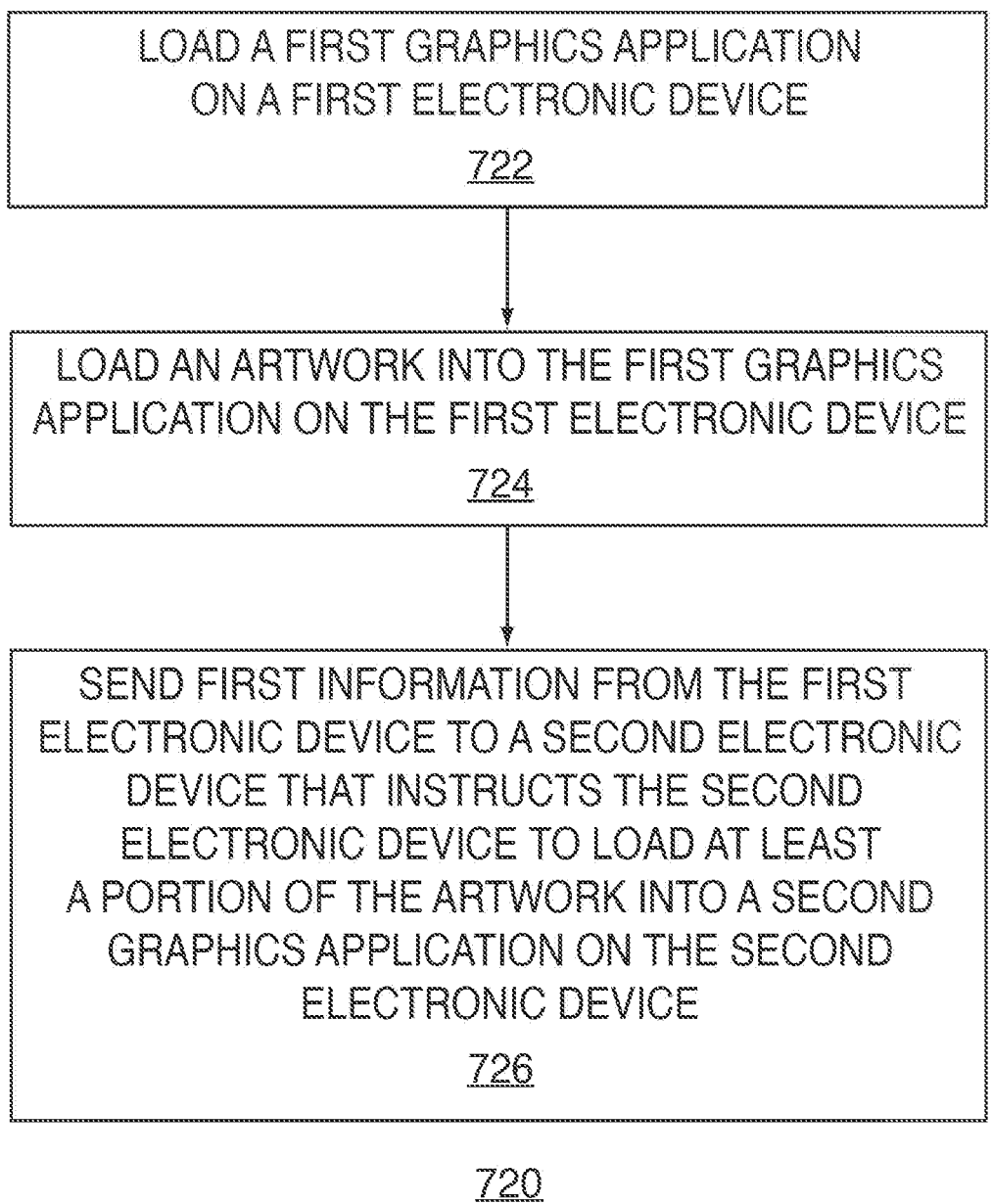

FIG. 5A is a flowchart of an illustrative process 720 for sharing graphical data. Process 720 may begin at step 722 by loading a first graphics application on a first electronic device. For example, first device 100 of system 1 may load a first graphics application 103 from any suitable source (e.g., memory 104 or server 70). Next, at step 724, process 720 may include loading an artwork into the first graphics application on the first electronic device. For example, graphics application 103 of first device 100 may load artwork 11 onto canvas 501 of first device 100.

Then, at step 726, process 720 may include sending first information from the first electronic device to a second electronic device, where the first information is configured to instruct the second electronic device to load at least a first portion of the artwork into a second graphics application on the second electronic device. For example, graphical display system 301 of first device 100 may transmit first information via communications media 55 to second electronic device 200 that may instruct second device 200 to load at least a portion of artwork 11 onto canvas 601 of second device 200.

In some embodiments, prior to the sending of step 726, process 700 may include receiving a first instruction at the first electronic device that defines the first portion of the artwork. For example, such receiving of the first instruction may include receiving the first instruction at the first electronic device from a user of the first electronic device (e.g., a user may define an outline over a portion of the artwork that may be displayed by the first device). As another example, such receiving of the first instruction may include receiving the first instruction at the first electronic device from the second electronic device (e.g., the first instruction may be indicative of the dimensions of a canvas displayed by the second electronic device or a resolution of a display of the second electronic device).

In some embodiments, the first information of process 720 may include pixel array data. In other embodiments, the first information of process 720 may include at least one graphical object input command.

It is to be understood that the steps shown in process 720 of FIG. 5A is merely illustrative and that existing steps may be modified or omitted, additional steps may be added, and the order of certain steps may be altered.

Moreover, the processes described with respect to FIGS. 1-5A, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104, memory 204, and/or server 70 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to electronic device 100 via communications circuitry 106 from server 70 and/or electronic device 200 of FIG. 1 (e.g., as at least a portion of an application 103 and/or 203)). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of either one or both of graphical display system 301 and graphical display system 401 may be provided as a software construct, firmware construct, one or more hardware components, or a combination thereof. For example, either one or both of graphical display system 301 and graphical display system 401 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of either one or both of graphical display system 301 and graphical display system 401 are merely illustrative, and that the number, configuration, functionality, and interconnection of existing modules may be modified or omitted, additional modules may be added, and the interconnection of certain modules may be altered.

At least a portion of one or more of the modules of either one or both of graphical display system 301 and graphical display system 401 may be stored in or otherwise accessible to device 100 and/or device 200 in any suitable manner (e.g., in memory 104 of device 100, in memory 204 of device 200, and/or in server 70 of communications media 55 (e.g., as at least a portion of an application 103 and/or 203)). Any or each module of either one or both of graphical display system 301 and graphical display system 401 may be implemented using any suitable technologies (e.g., as one or more integrated circuit devices), and different modules may or may not be identical in structure, capabilities, and operation. Any or all of the modules or other components of either one or both of graphical display system 301 and graphical display system 401 may be mounted on an expansion card, mounted directly on a system motherboard, or integrated into a system chipset component (e.g., into a "north bridge" chip). Either one or both of graphical display system 301 and graphical display system 401 may include any amount of dedicated graphics memory, may include no dedicated graphics memory and may rely on device memory (e.g., memory 104 and/or memory 204) or network memory (e.g., memory of server 70), or may use any combination thereof.

Either one or both of graphical display system 301 and graphical display system 401 may be a dedicated system implemented using one or more expansion cards adapted for various bus standards. For example, all of the modules may be mounted on different interconnected expansion cards or all of the modules may be mounted on one expansion card. With respect to graphical display system 301, by way of example only, the modules of system 301 may interface with a motherboard or processor 102 of device 100 through an expansion slot (e.g., a peripheral component interconnect ("PCI") slot or a PCI express slot). Alternatively, system 301 need not be removable but may include one or more dedicated modules that may include memory (e.g., RAM) dedicated to the utilization of the module. In other embodiments, system 301 may be a graphics system integrated into device 100. For example, a module of system 301 may utilize a portion of device memory 104 of device 100. One or more of the modules of graphical display system 301 may include its own processing circuitry and/or memory. Alternatively each module of graphical display system 301 may share processing circuitry and/or memory with any other module of graphical display system 301 and/or processor 102 and/or memory 104 of device 100. Similar configurations may be provided for graphical display system 401 with respect to device 200.

One or more Application Programming Interfaces ("APIs") may be used in some embodiments (e.g., with respect to graphical display system 301, graphical display system 401, or any other suitable module or any other suitable portion of any suitable module of graphical display system 301 and/or graphical display system 401 of FIGS. 2-3B). An API may be an interface implemented by a program code component or hardware component (hereinafter "API-implementing component") that may allow a different program code component or hardware component (hereinafter "API-calling component") to access and use one or more functions, methods, procedures, data structures, classes, and/or other services provided by the API-implementing component. An API can define one or more parameters that may be passed between the API-calling component and the API-implementing component.

An API may allow a developer of an API-calling component, which may be a third party developer, to leverage specified features provided by an API-implementing component. There may be one API-calling component or there may be more than one such component. An API can be a source code interface that a computer system or program library may provide in order to support requests for services from an application. An operating system ("OS") can have multiple APIs to allow applications running on the OS to call one or more of those APIs, and a service (e.g., a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (e.g., not exposed) and can provide a subset of the first set of functions and can also provide another set of functions, such as testing or debugging functions which are not in the first set of functions. In other embodiments, the API-implementing component may itself call one or more other components via an underlying API and may thus be both an API-calling component and an API-implementing component.

An API may define the language and parameters that API-calling components may use when accessing and using specified features of the API-implementing component. For example, an API-calling component may access the specified features of the API-implementing component through one or more API calls or invocations (e.g., embodied by function or method calls) exposed by the API and may pass data and control information using parameters via the API calls or invocations. The API-implementing component may return a value through the API in response to an API call from an API-calling component. While the API may defines the syntax and result of an API call (e.g., how to invoke the API call and what the API call does), the API may not reveal how the API call accomplishes the function specified by the API call. Various API calls may be transferred via the one or more application programming interfaces between the calling component (e.g., API-calling component) and an API-implementing component. Transferring the API calls may include issuing, initiating, invoking, calling, receiving, returning, or responding to the function calls or messages. Thus, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list, or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module. It should be understood that the API-implementing component and the API-calling component may be the same or different type of module from each other. API-implementing components may in some cases be embodied at least in part in firmware, microcode, or other hardware logic. In some embodiments, an API may allow a client program to use the services provided by a Software Development Kit ("SDK") library. In other embodiments, an application or other client program may use an API provided by an Application Framework. In such embodiments, the application or client program may incorporate calls to functions or methods provided by the SDK and provided by the API or may use data types or objects defined in the SDK and provided by the API. An Application Framework may, in these embodiments, provide a main event loop for a program that responds to various events defined by the Framework. The API may allow the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, and the like, and the API may be implemented in part by firmware, microcode, or other low level logic that may execute in part on the hardware component.

The API-calling component may be a local component (i.e., on the same data processing system as the API-implementing component) or a remote component (i.e., on a different data processing system from the API-implementing component) that may communicate with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that may be exposed to a different API-calling component.

The API may allow multiple API-calling components written in different programming languages to communicate with the API-implementing component, such that the API may include features for translating calls and returns between the API-implementing component and the API-calling component. However, the API may be implemented in terms of a specific programming language. An API-calling component can, in some embodiments, call APIs from different providers, such as a set of APIs from an OS provider and another set of APIs from a plug-in provider and another set of APIs from another provider (e.g., the provider of a software library) or creator of the another set of APIs.

Figure 6:
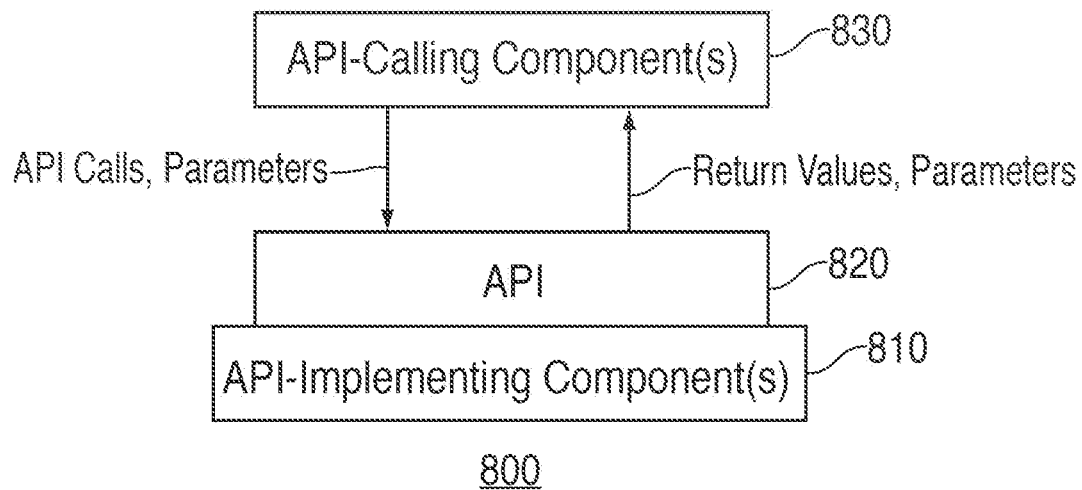
FIG. 6 is a block diagram of an illustrative application programming interface ("API") architecture, in accordance with some embodiments of the invention.

FIG. 6 is a block diagram illustrating an exemplary API architecture 800, which may be used in some embodiments of the invention. As shown in FIG. 6, the API architecture 800 may include an API-implementing component 810 (e.g., an operating system, a library, a device driver, an API, an application program, software, or other module) that may implements an API 820. API 820 may specify one or more functions, methods, classes, objects, protocols, data structures, formats, and/or other features of API-implementing component 810 that may be used by an API-calling component 830. API 820 can specify at least one calling convention that may specify how a function in API-implementing component 810 may receive parameters from API-calling component 830 and how the function may return a result to API-calling component 830. API-calling component 830 (e.g., an operating system, a library, a device driver, an API, an application program, software, or other module), may make API calls through API 820 to access and use the features of API-implementing component 810 that may be specified by API 820. API-implementing component 810 may return a value through API 820 to API-calling component 830 in response to an API call.

It is to be appreciated that API-implementing component 810 may include additional functions, methods, classes, data structures, and/or other features that may not be specified through API 820 and that may not be available to API-calling component 830. It is to be understood that API-calling component 830 may be on the same system as API-implementing component 810 or may be located remotely and may access API-implementing component 810 using API 820 over a network. While FIG. 6 illustrates a single API-calling component 830 interacting with API 820, it is to be understood that other API-calling components, which may be written in different languages than, or the same language as, API-calling component 830, may use API 820.

API-implementing component 810, API 820, and API-calling component 830 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104, memory 204, and/or server 70 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to electronic device 100 via communications circuitry 106 from server 70 and/or electronic device 200 of FIG. 1). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Figure 7:
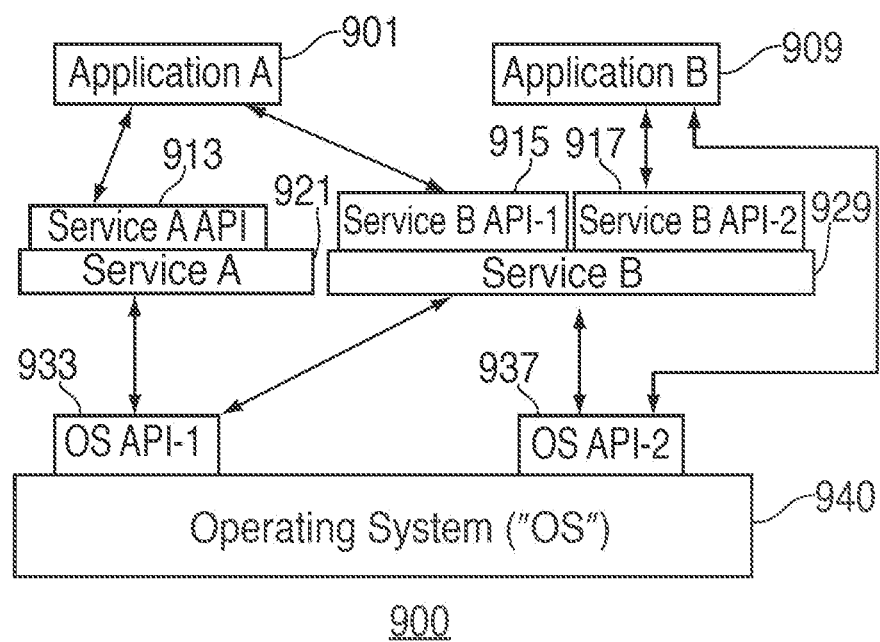
FIG. 7 is a block diagram of an illustrative API software stack, in accordance with some embodiments of the invention.

FIG. 7 is a block diagram illustrating an exemplary software stack 900, which may be used in some embodiments of the invention. As shown in FIG. 7, Application A 901 and Application B 909 can make calls to Service A 921 or Service B 929 using several Service APIs (e.g., Service APIs 913, 915, and 917) and to Operating System ("OS") 940 using several OS APIs (e.g., OS APIs 933 and 937). Service A 921 and Service B 929 can make calls to OS 940 using several OS APIs (e.g., OS APIs 933 and 937).

For example, as shown in FIG. 7, Service B 929 may include two APIs, one of which (i.e., Service B API-1 915) may receive calls from and return values to Application A 901 and the other of which (i.e., Service B API-2 917) may receive calls from and return values to Application B 909. Service A 921, which can be, for example, a software library, may make calls to and receive returned values from OS API-1 933, and Service B 929, which can be, for example, a software library, may make calls to and receive returned values from both OS API-1 933 and OS API-2 937. Application B 909 may make calls to and receive returned values from OS API-2 937.

As mentioned, an input component 210 of device 200 may include a touch input component that can receive touch input for interacting with other components of device 200 via wired or wireless bus 216. Such a touch input component 210 may be used to provide user input to device 200 in lieu of or in combination with other input components, such as a keyboard, mouse, and the like. One or more touch input components may be used for providing user input to device 200. Although the following describes various touch input components 210 that may be used for providing user input to device 200 (e.g., in conjunction with display 212 and/or I/O component 211), the same description may additionally or alternatively be applied to various touch input components 110 that may be used for providing user input to device 100 (e.g., in conjunction with display 112 and/or I/O component 111).

A touch input component 210 may include a touch sensitive panel, which may be wholly or partially transparent, semitransparent, non-transparent, opaque, or any combination thereof. A touch input component 210 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 210 embodied as a touch screen may include a transparent and/or semitransparent touch sensitive panel partially or wholly positioned over, under, and/or within at least a portion of a display (e.g., display 212). In other embodiments, a touch input component 210 may be embodied as an integrated touch screen where touch sensitive components/devices are integral with display components/devices. In still other embodiments, a touch input component 210 may be used as a supplemental or additional display screen for displaying supplemental or the same graphical data as a primary display and to receive touch input.

A touch input component 210 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 210. Software, hardware, firmware, or any combination thereof may be used to process the measurements of the detected touches to identify and track one or more gestures. A gesture may correspond to stationary or non-stationary, single or multiple, touches or near touches on a touch input component 210. A gesture may be performed by moving one or more fingers or other objects in a particular manner on touch input component 210, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 200 may drive a display (e.g., display 212) with graphical data to display a graphical user interface ("GUI"). The GUI may be configured to receive touch input via a touch input component 210. Embodied as a touch screen (e.g., with display 212 as I/O component 211), touch I/O component 211 may display the GUI. Alternatively, the GUI may be displayed on a display (e.g., display 212) separate from touch input component 210. The GUI may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 210, which may be associated with the graphical elements of the GUI. In other embodiments, the user may perform gestures at one or more locations that are independent of the locations of graphical elements of the GUI. Gestures performed on a touch input component 210 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 200 (e.g., affect a state or mode of a GUI, application, or operating system). Gestures may or may not be performed on a touch input component 210 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. In other embodiments, in which gestures are performed directly on a touch screen, a user may interact directly with objects on the touch screen, with or without a cursor or pointer being displayed on the touch screen. In some embodiments, when input synchs 526 and 626 are selected, system 1 may be configured such that a user's interactions with touch screen 211 of second device 200 may interact directly with objects on touch screen 211, without a cursor or pointer being displayed on touch screen 211, but such interactions with touch screen 211 may control a cursor or pointer displayed on display 112 of first device 100.

Feedback may be provided to the user via bus 216 in response to or based on the touch or near touches on a touch input component 210. Feedback may be transmitted optically, mechanically, electrically, olfactory, acoustically, or the like or any combination thereof and in a variable or non-variable manner.

While there have been described systems, methods, and computer-readable media for manipulating and/or mapping tiles of graphical object data, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms such as "up" and "down," "top" and "bottom," "left" and "right," "length" and "width," "horizontal" and "vertical," and "diagonal," and the like are used herein only for convenience, and that no fixed or absolute directional or orientational limitations are intended by the use of these words. For example, the devices of this invention can have any desired orientation. If reoriented, different directional or orientational terms may need to be used in their description, but that will not alter their fundamental nature as within the scope and spirit of this invention.

Therefore, those skilled in the art will appreciate that the invention can be practiced by other than the described embodiments, which are presented for purposes of illustration rather than of limitation.

What is claimed is:
1. A method, comprising:
at a first electronic device that includes a touch-sensitive display:
while the touch-sensitive display of the first electronic device is operating in a first display state, receiving, from a second electronic device that is currently displaying content associated with an application, an instruction to display the content associated with the application on the touch-sensitive display of the first electronic device; and
in response to receiving the instruction:
ceasing to operate the touch-sensitive display of the first electronic device in the first display state, including ceasing to display a user interface associated with the first display state on the touch-sensitive display of the first electronic device;

displaying a user interface for the application on substantially all of the touch-sensitive display of the first electronic device;

displaying the content within the user interface for the application on the touch-sensitive display of the first electronic device; and displaying a first set of tools for modifying the content displayed within the user interface for the application on the first electronic device that are different than a second set of tools for modifying the content displayed within the application on the second electronic device;

detecting an input that modifies an appearance of the content with the first set of tools while it is displayed on the touch-sensitive display of the first electronic device; and in response to detecting the input:
displaying the content with the modified appearance on the touch-sensitive display of the first electronic device; and automatically, sending, to the second electronic device, information that allows the second electronic device to display the content with the modified appearance.

2. The method of claim 1, wherein:
the content is an image, and
the input that modifies an appearance of the content is a drawing input that adds marks to the content.

3. The method of claim 1, wherein the instruction from the second electronic device causes the first electronic device to load the application from a memory of the first electronic device before displaying the user interface for the application on substantially all of the touch-sensitive display of the first electronic device.

4. The method of claim 1, the input that modifies an appearance of the content while it is displayed on the touch-sensitive display is provided using a finger.

5. The method of claim 1, wherein the first electronic device executes a mobile operating system that is different from an operating system executed by the second electronic device.

6. The method of claim 5, wherein the first electronic device is a tablet device, and the second electronic is a laptop device.

7. The method of claim 1, wherein the instruction to display the content associated with the application on the touch-sensitive display of the first electronic device is received based on user input received at the second electronic device, the user input requesting to share the content with the first electronic device.

8. The method of claim 1, wherein the sending of the information that allows the second electronic device to display the content with the modified appearance includes sending data that enables the second electronic device to synchronously display the content with the modified appearance as the input is modifying the appearance of the content at the first electronic device.

9. The method of claim 1, further comprising:
in response to receiving the instruction, displaying a set of drawing tools that are specific to functions available at the first electronic device.

10. The method of claim 1, wherein the first electronic device receives the instruction directly from the second electronic device.

11. A non-transitory computer-readable storage medium storing executable instructions that, when executed by one or more processors of a first electronic device with a touch-sensitive display, cause the first electronic device to:
while the touch-sensitive display of the first electronic device is operating in a first display state, receive, from a second electronic device that is currently displaying content associated with an application, an instruction to display the content associated with the application on the touch-sensitive display of the first electronic device; and in response to receiving the instruction:
cease to operate the touch-sensitive display of the first electronic device in the first display state, including ceasing to display a user interface associated with the first display state on the touch-sensitive display of the first electronic device;

display a user interface for the application on substantially all of the touch-sensitive display of the first electronic device;

display the content within the user interface for the application on the touch-sensitive display of the first electronic device; and display a first set of tools for modifying the content displayed within the user interface for the application on the first electronic device that are different than a second set of tools for modifying the content displayed within the application on the second electronic device;

detect an input that modifies an appearance of the content with the first set of tools while it is displayed on the touch-sensitive display of the first electronic device; and in response to detecting the input:
display the content with the modified appearance on the touch-sensitive display of the first electronic device; and automatically, send, to the second electronic device, information that allows the second electronic device to display the content with the modified appearance.

12. The non-transitory computer-readable storage medium of claim 11, wherein the first electronic device receives the instruction directly from the second electronic device.

13. The non-transitory computer-readable storage medium of claim 11, wherein the content is an image, and the input that modifies the appearance of the content is a drawing input that adds marks to the content.

14. The non-transitory computer-readable storage medium of claim 11, wherein the instruction received from the second electronic device causes the first electronic device to load the application from a memory of the first electronic device before displaying the user interface for the application on substantially all of the touch-sensitive display of the first electronic device.

15. The non-transitory computer-readable storage medium of claim 11, wherein the input that modifies an appearance of the content while it is displayed on the touch-sensitive display is provided using a finger.

16. The non-transitory computer-readable storage medium of claim 11, wherein the first electronic device executes a mobile operating system that is different from an operating system executed by the second electronic device.

17. The non-transitory computer-readable storage medium of claim 11, wherein the first electronic device is a tablet device, and the second electronic is a laptop device.

18. The non-transitory computer-readable storage medium of claim 11, wherein the instruction to display the content associated with the application on the touch-sensitive display of the first electronic device is received based on user input received at the second electronic device, the user input requesting to share the content with the first electronic device.

19. The non-transitory computer-readable storage medium of claim 11, wherein sending of the information that allows the second electronic device to display the content with the modified appearance includes sending data that enables the second electronic device to synchronously display the content with the modified appearance as the input is modifying the appearance of the content at the first electronic device.

20. The non-transitory computer-readable storage medium of claim 11, wherein further in response to receiving the instruction, displaying a set of drawing tools that are specific to functions available at the first electronic device.

21. A first electronic device, comprising:
   one or more processors;
   a touch sensitive display; and
   memory storing one or more programs that are configured for execution by the one or more processors, the one or more programs including instructions for:
      while the touch-sensitive display of the first electronic device is operating in a first display state, receiving, from a second electronic device that is currently displaying content associated with an application, an instruction to display the content associated with the application on the touch-sensitive display of the first electronic device; and
      in response to receiving the instruction:
         ceasing to operate the touch-sensitive display of the first electronic device in the first display state, including ceasing to display a user interface associated with the first display state on the touch-sensitive display of the first electronic device;
         displaying a user interface for the application on substantially all of the touch-sensitive display of the first electronic device;
         displaying the content within the user interface for the application on the touch-sensitive display of the first electronic device; and
         displaying a first set of tools for modifying the content displayed within the user interface for the application on the first electronic device that are different than a second set of tools for modifying the content displayed within the application on the second electronic device;
         detecting an input that modifies an appearance of the content with the first set of tools while it is displayed on the touch-sensitive display of the first electronic device; and
      in response to detecting the input:
         displaying the content with the modified appearance on the touch-sensitive display of the first electronic device; and
         automatically, sending, to the second electronic device, information that allows the second electronic device to display the content with the modified appearance.

22. The first electronic device of claim 21, wherein the first electronic device receives the instruction directly from the second electronic device.

23. The first electronic device of claim 21, wherein the content is an image, and the input that modifies the appearance of the content is a drawing input that adds marks to the content.

24. The first electronic device of claim 21, wherein the instruction received from the second electronic device causes the first electronic device to load the application from a memory of the first electronic device before displaying the user interface for the application on substantially all of the touch-sensitive display of the first electronic device.

25. The first electronic device of claim 21, wherein the input that modifies an appearance of the content while it is displayed on the touch-sensitive display is provided using a finger.

26. The first electronic device of claim 21, wherein the first electronic device executes a mobile operating system that is different from an operating system executed by the second electronic device.

27. The first electronic device of claim 21, wherein the first electronic device is a tablet device, and the second electronic is a laptop device.

28. The first electronic device of claim 21, wherein the instruction to display the content associated with the application on the touch-sensitive display of the first electronic device is received based on user input received at the second electronic device, the user input requesting to share the content with the first electronic device.

29. The first electronic device of claim 21, wherein sending of the information that allows the second electronic device to display the content with the modified appearance includes sending data that enables the second electronic device to synchronously display the content with the modified appearance as the input is modifying the appearance of the content at the first electronic device.

30. The first electronic device of claim 21, wherein further in response to receiving the instruction, displaying a set of drawing tools that are specific to functions available at the first electronic device.

* * * * *